(12) United States Patent
Martin et al.

(10) Patent No.: US 12,063,581 B2
(45) Date of Patent: Aug. 13, 2024

(54) EMERGENCY REGISTRY FOR EMERGENCY MANAGEMENT

(71) Applicant: RapidSOS, Inc., New York, NY (US)

(72) Inventors: Michael John Martin, Long Island City, NY (US); Nicholas Edward Horelik, Long Island City, NY (US); Reinhard Ekl, New York, NY (US); Michelle Cahn, New York, NY (US); John Paul Lawrence, New York, NY (US)

(73) Assignee: RapidSOS, Inc., New York, NY (US)

( * ) Notice: Subject to any disclaimer, the term of this patent is extended or adjusted under 35 U.S.C. 154(b) by 0 days.

(21) Appl. No.: 16/684,366

(22) Filed: Nov. 14, 2019

(65) Prior Publication Data

US 2020/0100084 A1  Mar. 26, 2020

Related U.S. Application Data

(63) Continuation of application No. 16/209,892, filed on Dec. 4, 2018, now Pat. No. 10,701,542.

(60) Provisional application No. 62/595,005, filed on Dec. 5, 2017.

(51) Int. Cl.
| | |
|---|---|
| *H04W 4/90* | (2018.01) |
| *H04W 4/021* | (2018.01) |
| *H04W 4/029* | (2018.01) |
| *H04W 4/21* | (2018.01) |

(52) U.S. Cl.
CPC ............ *H04W 4/90* (2018.02); *H04W 4/021* (2013.01); *H04W 4/029* (2018.02); *H04W 4/21* (2018.02)

(58) Field of Classification Search
CPC ......... H04W 4/90; H04W 4/029; H04W 4/21; H04W 4/021
USPC ...................................................... 455/404.2
See application file for complete search history.

(56) References Cited

U.S. PATENT DOCUMENTS

| | | | |
|---|---|---|---|
| 5,379,337 | A | 1/1995 | Castillo et al. |
| 5,479,482 | A | 12/1995 | Grimes |
| 5,563,931 | A | 10/1996 | Bishop et al. |
| 5,596,625 | A | 1/1997 | Leblanc |
| 5,710,803 | A | 1/1998 | Kowal et al. |
| 5,742,666 | A | 4/1998 | Alpert |
| D405,774 | S | 2/1999 | Yui |
| 6,014,555 | A | 1/2000 | Tendler |

(Continued)

FOREIGN PATENT DOCUMENTS

| | | |
|---|---|---|
| CA | 2662606 A1 | 10/2009 |
| CA | 2697986 A1 | 9/2010 |

(Continued)

OTHER PUBLICATIONS

PCT/US2020/046857 International Search Report and Written Opinion dated Nov. 18, 2020.

(Continued)

*Primary Examiner* — Chuck Huynh
(74) *Attorney, Agent, or Firm* — Fitch, Even, Tabin & Flannery LLP

(57) ABSTRACT

A method for providing an alternate communication pathway for emergency data to an emergency service provider (ESP) is disclosed. In some embodiments, one or more processors of said emergency assistance system (EAS) implement the method for using social media content to detect and facilitate emergency communications.

18 Claims, 19 Drawing Sheets

(56) References Cited

U.S. PATENT DOCUMENTS

| | | |
|---|---|---|
| D425,499 S | 5/2000 | Millington |
| 6,133,853 A | 10/2000 | Obradovich et al. |
| 6,167,255 A | 12/2000 | Kennedy et al. |
| 6,249,674 B1 | 6/2001 | Verdonk |
| 6,252,943 B1 | 6/2001 | Johnson et al. |
| 6,256,489 B1 | 7/2001 | Lichter et al. |
| 6,262,655 B1 | 7/2001 | Yoshioka et al. |
| 6,292,687 B1 | 9/2001 | Lowell et al. |
| 6,363,138 B1 | 3/2002 | Aprile |
| 6,459,782 B1 | 10/2002 | Bedrosian et al. |
| 6,477,362 B1 | 11/2002 | Raith et al. |
| 6,502,030 B2 | 12/2002 | Hilleary |
| 6,510,315 B1 | 1/2003 | Arnson |
| D471,227 S | 3/2003 | Gray |
| 6,556,816 B1 | 4/2003 | Gafrick et al. |
| 6,571,092 B2 | 5/2003 | Faccin et al. |
| 6,574,323 B1 | 6/2003 | Manuel et al. |
| 6,587,545 B1 | 7/2003 | Antonucci et al. |
| 6,594,666 B1 | 7/2003 | Biswas et al. |
| 6,600,812 B1 | 7/2003 | Gentillin et al. |
| 6,628,933 B1 | 9/2003 | Humes |
| 6,680,998 B1 | 1/2004 | Bell et al. |
| 6,707,421 B1 | 3/2004 | Drury et al. |
| 6,731,610 B2 | 5/2004 | Sajikawa et al. |
| 6,993,118 B2 | 1/2006 | Antonucci et al. |
| 7,031,663 B2 | 4/2006 | Heinonen et al. |
| 7,054,611 B2 | 5/2006 | Eisner et al. |
| 7,058,385 B2 | 6/2006 | Lauper |
| 7,084,775 B1 | 8/2006 | Smith |
| 7,177,400 B2 | 2/2007 | Eisner et al. |
| 7,224,773 B2 | 5/2007 | Croak et al. |
| 7,271,704 B2 | 9/2007 | McSheffrey et al. |
| 7,277,705 B2 | 10/2007 | Casaccia et al. |
| 7,313,402 B1 | 12/2007 | Rahman |
| 7,324,801 B2 | 1/2008 | Droste et al. |
| D564,530 S | 3/2008 | Kim |
| 7,349,706 B2 | 3/2008 | Kim et al. |
| D565,586 S | 4/2008 | Shin |
| 7,409,044 B2 | 8/2008 | Leduc |
| 7,409,428 B1 | 8/2008 | Brabec et al. |
| 7,436,938 B2 | 10/2008 | Savaglio et al. |
| 7,437,143 B1 | 10/2008 | Williams |
| 7,469,138 B2 | 12/2008 | Dayar et al. |
| 7,483,519 B2 | 1/2009 | Binning |
| 7,519,351 B2 | 4/2009 | Malone, III |
| 7,519,372 B2 | 4/2009 | MacDonald et al. |
| 7,548,158 B2 | 6/2009 | Titus et al. |
| D596,192 S | 7/2009 | Shotel |
| 7,565,131 B2 | 7/2009 | Rollender |
| 7,646,854 B2 | 1/2010 | Anderson |
| 7,671,903 B2 | 3/2010 | Kawamura |
| 7,676,215 B2 | 3/2010 | Chin et al. |
| 7,684,782 B2 | 3/2010 | Ashley, Jr. et al. |
| 7,848,733 B2 | 12/2010 | Bull et al. |
| 7,937,067 B2 | 5/2011 | Maier et al. |
| 7,949,326 B2 | 5/2011 | Gallagher et al. |
| 8,009,810 B2 | 8/2011 | Seidberg et al. |
| 8,024,330 B1 | 9/2011 | Franco |
| 8,027,658 B2 | 9/2011 | Suryanarayana et al. |
| 8,041,335 B2 | 10/2011 | Khetawat et al. |
| 8,041,341 B1 | 10/2011 | Malackowski et al. |
| 8,045,954 B2 | 10/2011 | Barbeau et al. |
| 8,068,881 B2 | 11/2011 | Schrager |
| 8,102,972 B2 | 1/2012 | Poremba |
| 8,126,424 B2 | 2/2012 | Piett et al. |
| 8,150,367 B1 | 4/2012 | Malladi et al. |
| 8,165,560 B2 | 4/2012 | Stenquist |
| 8,165,562 B2 | 4/2012 | Piett et al. |
| 8,185,087 B2 | 5/2012 | Mitchell, Jr. et al. |
| 8,195,121 B2 | 6/2012 | Dunn et al. |
| 8,219,135 B2 | 7/2012 | De Amorim et al. |
| D666,209 S | 8/2012 | Cranfill |
| 8,244,205 B2 | 8/2012 | Wu |
| 8,249,546 B1 | 8/2012 | Shah et al. |
| 8,249,547 B1 | 8/2012 | Fellner |
| D667,426 S | 9/2012 | Randall |
| 8,289,953 B2 | 10/2012 | Ray et al. |
| 8,306,501 B2 | 11/2012 | Moodbidri et al. |
| 8,326,260 B1 | 12/2012 | Bradish et al. |
| 8,369,488 B2 | 2/2013 | Sennett et al. |
| 8,396,970 B2 | 3/2013 | Black et al. |
| 8,401,565 B2 | 3/2013 | Sandberg et al. |
| 8,417,090 B2 | 4/2013 | Fleming |
| 8,417,212 B2 | 4/2013 | Cepuran et al. |
| 8,442,481 B2 | 5/2013 | Maier et al. |
| 8,442,482 B2 | 5/2013 | Maier et al. |
| D683,751 S | 6/2013 | Carpenter |
| D684,185 S | 6/2013 | Van Dongen |
| 8,472,973 B2 | 6/2013 | Lin et al. |
| 8,484,352 B2 | 7/2013 | Piett et al. |
| 8,489,062 B2 | 7/2013 | Ray et al. |
| D688,692 S | 8/2013 | Tanghe |
| 8,509,729 B2 | 8/2013 | Shaw |
| 8,516,122 B2 | 8/2013 | Piett et al. |
| 8,538,370 B2 | 9/2013 | Ray et al. |
| 8,538,468 B2 | 9/2013 | Daly |
| 8,588,733 B2 | 11/2013 | Ferguson et al. |
| 8,594,015 B2 | 11/2013 | Dunn et al. |
| 8,606,218 B2 | 12/2013 | Ray et al. |
| D697,081 S | 1/2014 | Van Dongen |
| 8,625,578 B2 | 1/2014 | Roy et al. |
| 8,626,112 B2 | 1/2014 | Ray et al. |
| 8,630,609 B2 | 1/2014 | Ray et al. |
| 8,644,301 B2 | 2/2014 | Tamhankar et al. |
| 8,649,806 B2 | 2/2014 | Cuff et al. |
| 8,682,279 B2 | 3/2014 | Rudolf et al. |
| 8,682,281 B2 | 3/2014 | Dunn et al. |
| 8,682,286 B2 | 3/2014 | Dickinson et al. |
| D701,879 S | 4/2014 | Foit |
| 8,712,366 B2 | 4/2014 | Greene et al. |
| D704,205 S | 5/2014 | Greisson |
| D704,207 S | 5/2014 | Lee |
| D705,261 S | 5/2014 | Holz |
| 8,747,336 B2 | 6/2014 | Tran |
| 8,751,265 B2 | 6/2014 | Piett et al. |
| 8,755,767 B2 | 6/2014 | Maier et al. |
| 8,760,290 B2 | 6/2014 | Piett et al. |
| 8,761,721 B2 | 6/2014 | Li |
| 8,792,867 B1 | 7/2014 | Negahban et al. |
| 8,811,935 B2 | 8/2014 | Faccin et al. |
| 8,825,687 B2 | 9/2014 | Marceau et al. |
| 8,848,877 B2 | 9/2014 | Seidberg et al. |
| 8,866,606 B1 | 10/2014 | Will et al. |
| 8,868,028 B1 | 10/2014 | Kaltsukis |
| 8,880,021 B2 | 11/2014 | Hawkins |
| 8,890,685 B1 | 11/2014 | Sookman et al. |
| 8,903,355 B2 | 12/2014 | Biage et al. |
| 8,918,075 B2 | 12/2014 | Maier et al. |
| 8,948,732 B1 | 2/2015 | Negahban et al. |
| D724,617 S | 3/2015 | Shin |
| D725,141 S | 3/2015 | Izotov |
| 8,971,839 B2 | 3/2015 | Hong |
| 8,983,424 B2 | 3/2015 | Binning |
| 8,984,143 B2 | 3/2015 | Serra et al. |
| D727,930 S | 4/2015 | Kim |
| 9,008,078 B2 | 4/2015 | Kamdar et al. |
| 9,014,657 B2 | 4/2015 | Rohde et al. |
| 9,019,870 B2 | 4/2015 | Khan et al. |
| 9,020,462 B2 | 4/2015 | Hodgson et al. |
| D728,601 S | 5/2015 | Angelides |
| D729,837 S | 5/2015 | Kang |
| 9,071,643 B2 | 6/2015 | Saito et al. |
| D734,358 S | 7/2015 | Rehberg |
| 9,077,676 B2 | 7/2015 | Price et al. |
| 9,078,092 B2 | 7/2015 | Piett et al. |
| 9,094,816 B2 | 7/2015 | Maier et al. |
| D735,750 S | 8/2015 | Chou |
| D736,808 S | 8/2015 | Soegiono |
| D736,822 S | 8/2015 | Tursi |
| D737,849 S | 9/2015 | Tursi |
| D738,392 S | 9/2015 | Shin |
| D738,897 S | 9/2015 | Soegiono |
| D739,413 S | 9/2015 | Shin |
| 9,129,219 B1 | 9/2015 | Robertson et al. |

(56) References Cited

U.S. PATENT DOCUMENTS

| | | |
|---|---|---|
| 9,167,379 B1 | 10/2015 | Hamilton et al. |
| D744,505 S | 12/2015 | Wilberding |
| D745,023 S | 12/2015 | Kwon |
| 9,244,922 B2 | 1/2016 | Marceau et al. |
| D749,095 S | 2/2016 | Herstad |
| D749,097 S | 2/2016 | Zou |
| D750,109 S | 2/2016 | Schaedle |
| 9,258,680 B2 | 2/2016 | Drucker |
| D751,098 S | 3/2016 | Lim |
| D751,585 S | 3/2016 | Kaufthal |
| 9,277,389 B2 | 3/2016 | Saito et al. |
| D755,830 S | 5/2016 | Chaudhri |
| D757,074 S | 5/2016 | Iwamoto |
| 9,351,142 B2 | 5/2016 | Basore et al. |
| D759,063 S | 6/2016 | Chen |
| D759,078 S | 6/2016 | Iwamoto |
| D759,687 S | 6/2016 | Chang |
| 9,369,847 B2 | 6/2016 | Borghei |
| D760,735 S | 7/2016 | Cheng |
| D761,270 S | 7/2016 | Kaplan |
| 9,384,491 B1 | 7/2016 | Briggs et al. |
| 9,390,625 B2 | 7/2016 | Green et al. |
| 9,402,159 B1 | 7/2016 | Self et al. |
| D762,688 S | 8/2016 | Scalisi |
| D764,513 S | 8/2016 | Kim |
| D765,097 S | 8/2016 | Harvell |
| 9,408,051 B2 | 8/2016 | Finney et al. |
| 9,420,099 B1 | 8/2016 | Krishnan et al. |
| 9,426,638 B1 | 8/2016 | Johnson |
| D765,698 S | 9/2016 | Kwon |
| 9,497,585 B1 | 11/2016 | Cooley et al. |
| 9,503,876 B2 | 11/2016 | Saito et al. |
| D773,523 S | 12/2016 | Kisselev |
| D776,702 S | 1/2017 | Huang |
| D777,757 S | 1/2017 | Kisselev |
| 9,544,260 B2 | 1/2017 | Cuff et al. |
| 9,544,750 B1 | 1/2017 | Self et al. |
| 9,591,467 B2 | 3/2017 | Piett et al. |
| 9,609,128 B2 | 3/2017 | Dahan et al. |
| D783,049 S | 4/2017 | Kisselev |
| 9,629,185 B1 | 4/2017 | Gluckman et al. |
| 9,635,534 B2 | 4/2017 | Maier et al. |
| D787,543 S | 5/2017 | Qiu |
| 9,648,479 B2 | 5/2017 | Michaelis et al. |
| 9,659,484 B1 | 5/2017 | Mehta et al. |
| 9,693,213 B2 | 6/2017 | Self et al. |
| 9,734,721 B2 | 8/2017 | Stenneth et al. |
| 9,736,670 B2 | 8/2017 | Mehta et al. |
| D797,132 S | 9/2017 | Rhodes |
| D797,790 S | 9/2017 | Martin |
| 9,756,169 B2 | 9/2017 | Mehta et al. |
| D800,748 S | 10/2017 | Jungmann |
| 9,794,755 B1 * | 10/2017 | South ............... H04W 4/021 |
| 9,805,430 B2 | 10/2017 | Miasnik et al. |
| D805,544 S | 12/2017 | Ganapathiraju |
| 9,838,858 B2 | 12/2017 | Anand et al. |
| 9,877,177 B2 | 1/2018 | Lesage et al. |
| 9,924,043 B2 | 3/2018 | Mehta et al. |
| 9,942,739 B2 | 4/2018 | Bozik et al. |
| 9,986,404 B2 | 5/2018 | Mehta et al. |
| 9,992,655 B2 | 6/2018 | Anand et al. |
| 9,994,218 B2 | 6/2018 | Pal et al. |
| 9,998,507 B2 | 6/2018 | Mehta et al. |
| 10,002,375 B1 | 6/2018 | Scythes et al. |
| D829,222 S | 9/2018 | Choi |
| 10,089,854 B2 | 10/2018 | Hender et al. |
| 10,136,294 B2 | 11/2018 | Mehta et al. |
| 10,140,482 B2 | 11/2018 | Mehta et al. |
| 10,140,842 B2 | 11/2018 | Mehta et al. |
| 10,142,213 B1 | 11/2018 | Hart et al. |
| 10,142,469 B2 * | 11/2018 | Klaban ............... H04M 11/04 |
| 10,142,816 B2 | 11/2018 | Cavendish et al. |
| D835,151 S | 12/2018 | Martin |
| 10,149,116 B1 | 12/2018 | Kerr et al. |
| 10,165,431 B2 | 12/2018 | Bozik et al. |
| 10,375,558 B2 | 8/2019 | Katz et al. |
| 10,419,915 B2 | 9/2019 | Mehta et al. |
| 10,425,799 B2 | 9/2019 | Anand |
| 10,447,865 B2 | 10/2019 | Mehta et al. |
| 10,524,106 B1 | 12/2019 | Skertich et al. |
| 10,657,799 B2 | 5/2020 | Mehta |
| 10,701,541 B2 | 6/2020 | Mehta |
| 10,701,542 B2 | 6/2020 | Martin |
| 10,708,412 B1 | 7/2020 | Killpack |
| 10,771,951 B2 | 9/2020 | Mehta |
| 10,795,870 B1 | 10/2020 | Kulkarni |
| 10,805,786 B2 | 10/2020 | Pellegrini |
| 10,820,181 B2 | 10/2020 | Horelik |
| 10,861,320 B2 | 12/2020 | Martin |
| 10,922,776 B2 | 2/2021 | Kumar et al. |
| 11,197,145 B2 | 12/2021 | Martin |
| 11,330,664 B1 | 5/2022 | Martin et al. |
| 2001/0036224 A1 | 11/2001 | Demello et al. |
| 2001/0051849 A1 | 12/2001 | Boone |
| 2002/0001367 A1 | 1/2002 | Lee |
| 2002/0027975 A1 | 3/2002 | Oxley |
| 2002/0057678 A1 | 5/2002 | Jiang et al. |
| 2002/0103622 A1 | 8/2002 | Burge |
| 2002/0120698 A1 | 8/2002 | Tamargo |
| 2003/0069035 A1 | 4/2003 | Shurvinton |
| 2003/0109245 A1 | 6/2003 | McCalmont et al. |
| 2003/0195775 A1 | 10/2003 | Hampton et al. |
| 2004/0166828 A1 | 8/2004 | Yosioka |
| 2004/0203572 A1 | 10/2004 | Aerrabotu et al. |
| 2004/0212505 A1 | 10/2004 | Dewing |
| 2004/0229620 A1 | 11/2004 | Zhao et al. |
| 2004/0266390 A1 | 12/2004 | Faucher et al. |
| 2005/0002516 A1 | 1/2005 | Shtivelman |
| 2005/0085215 A1 | 4/2005 | Kokko et al. |
| 2005/0104745 A1 | 5/2005 | Bachelder et al. |
| 2005/0111630 A1 | 5/2005 | Potorny et al. |
| 2005/0151642 A1 | 7/2005 | Tupler et al. |
| 2005/0176403 A1 | 8/2005 | Lalos |
| 2005/0190053 A1 | 9/2005 | Dione |
| 2005/0190892 A1 | 9/2005 | Dawson et al. |
| 2005/0192746 A1 | 9/2005 | King et al. |
| 2005/0220277 A1 | 10/2005 | Blalock et al. |
| 2005/0222829 A1 | 10/2005 | Dumas |
| 2005/0239477 A1 | 10/2005 | Kim et al. |
| 2005/0242944 A1 | 11/2005 | Bankert et al. |
| 2005/0282518 A1 | 12/2005 | D'Evelyn et al. |
| 2005/0285181 A1 | 12/2005 | Yasui et al. |
| 2006/0077053 A1 | 4/2006 | Park et al. |
| 2006/0085275 A1 | 4/2006 | Stokes et al. |
| 2006/0109960 A1 | 5/2006 | D'Evelyn et al. |
| 2006/0154642 A1 | 7/2006 | Scannell, Jr. |
| 2006/0217105 A1 | 9/2006 | Kumar P S et al. |
| 2006/0234726 A1 | 10/2006 | Ashley, Jr. et al. |
| 2006/0293024 A1 | 12/2006 | Benco et al. |
| 2007/0003024 A1 | 1/2007 | Olivier et al. |
| 2007/0030144 A1 | 2/2007 | Titus et al. |
| 2007/0030146 A1 | 2/2007 | Shepherd |
| 2007/0033095 A1 | 2/2007 | Hodgin et al. |
| 2007/0049287 A1 | 3/2007 | Dunn |
| 2007/0053308 A1 | 3/2007 | Dumas et al. |
| 2007/0058528 A1 | 3/2007 | Massa et al. |
| 2007/0060097 A1 | 3/2007 | Edge et al. |
| 2007/0161383 A1 | 7/2007 | Caci |
| 2007/0164872 A1 | 7/2007 | Monroe |
| 2007/0171854 A1 | 7/2007 | Chen et al. |
| 2007/0218895 A1 | 9/2007 | Saito et al. |
| 2008/0019268 A1 | 1/2008 | Rollins |
| 2008/0063153 A1 | 3/2008 | Krivorot et al. |
| 2008/0077474 A1 | 3/2008 | Dumas et al. |
| 2008/0081646 A1 | 4/2008 | Morin et al. |
| 2008/0166990 A1 | 7/2008 | Toiv |
| 2008/0175356 A1 | 7/2008 | Seidberg et al. |
| 2008/0188198 A1 | 8/2008 | Patel et al. |
| 2008/0194238 A1 | 8/2008 | Kwon |
| 2008/0253535 A1 | 10/2008 | Sherry et al. |
| 2008/0274721 A1 | 11/2008 | Stagnetto |
| 2008/0294058 A1 | 11/2008 | Shklarski |
| 2008/0309486 A1 | 12/2008 | McKenna et al. |
| 2009/0041206 A1 | 2/2009 | Hobby et al. |

(56) References Cited

U.S. PATENT DOCUMENTS

| | | |
|---|---|---|
| 2009/0077045 A1 | 3/2009 | Kirchmeier et al. |
| 2009/0094602 A1 | 4/2009 | Ziskind et al. |
| 2009/0134982 A1 | 5/2009 | Robertson et al. |
| 2009/0186596 A1 | 7/2009 | Kaltsukis et al. |
| 2009/0214000 A1 | 8/2009 | Patel et al. |
| 2009/0233573 A1 | 9/2009 | Gray |
| 2009/0257345 A1 | 10/2009 | King |
| 2009/0258913 A1 | 10/2009 | Waddell et al. |
| 2009/0280771 A1 | 11/2009 | Bolin |
| 2009/0284348 A1 | 11/2009 | Pfeffer |
| 2009/0309742 A1* | 12/2009 | Alexander ............ G08B 27/006 340/601 |
| 2009/0311987 A1 | 12/2009 | Edge et al. |
| 2009/0322513 A1 | 12/2009 | Hwang et al. |
| 2010/0002846 A1 | 1/2010 | Ray et al. |
| 2010/0003954 A1 | 1/2010 | Greene et al. |
| 2010/0003964 A1 | 1/2010 | Khare et al. |
| 2010/0093305 A1 | 4/2010 | Reich et al. |
| 2010/0156626 A1 | 6/2010 | Story |
| 2010/0159871 A1 | 6/2010 | Tester |
| 2010/0159976 A1 | 6/2010 | Marocchi et al. |
| 2010/0161727 A1 | 6/2010 | Shaffer et al. |
| 2010/0166153 A1 | 7/2010 | Guleria et al. |
| 2010/0190468 A1 | 7/2010 | Scott et al. |
| 2010/0202368 A1 | 8/2010 | Hans |
| 2010/0238018 A1 | 9/2010 | Kelly |
| 2010/0261448 A1 | 10/2010 | Peters |
| 2010/0262668 A1 | 10/2010 | Piett et al. |
| 2010/0291907 A1 | 11/2010 | Macnaughtan et al. |
| 2010/0293106 A1 | 11/2010 | Rhoads et al. |
| 2010/0317317 A1 | 12/2010 | Maier |
| 2011/0009086 A1 | 1/2011 | Poremba et al. |
| 2011/0029600 A1 | 2/2011 | Theimer |
| 2011/0044444 A1 | 2/2011 | Abramson |
| 2011/0071880 A1 | 3/2011 | Spector |
| 2011/0086607 A1 | 4/2011 | Wang et al. |
| 2011/0103266 A1 | 5/2011 | Andreasen et al. |
| 2011/0111728 A1 | 5/2011 | Ferguson et al. |
| 2011/0134897 A1 | 6/2011 | Montemurro et al. |
| 2011/0151829 A1 | 6/2011 | Velusamy et al. |
| 2011/0153368 A1 | 6/2011 | Pierre et al. |
| 2011/0196724 A1 | 8/2011 | Fenton |
| 2011/0201357 A1 | 8/2011 | Garrett et al. |
| 2011/0263219 A1 | 10/2011 | Hasenfang et al. |
| 2011/0263319 A1 | 10/2011 | Haemaelaeinen et al. |
| 2012/0002792 A1 | 1/2012 | Chang |
| 2012/0028599 A1 | 2/2012 | Hatton et al. |
| 2012/0029970 A1 | 2/2012 | Stiles et al. |
| 2012/0040636 A1 | 2/2012 | Kazmi |
| 2012/0066139 A1 | 3/2012 | Guzman et al. |
| 2012/0092161 A1 | 4/2012 | West |
| 2012/0123806 A1 | 5/2012 | Schumann, Jr. |
| 2012/0144019 A1 | 6/2012 | Zhu et al. |
| 2012/0146809 A1 | 6/2012 | Oh et al. |
| 2012/0157795 A1 | 6/2012 | Chiu et al. |
| 2012/0196557 A1 | 8/2012 | Reich |
| 2012/0196558 A1 | 8/2012 | Reich |
| 2012/0202428 A1 | 8/2012 | Mirbaha et al. |
| 2012/0210325 A1 | 8/2012 | De Lind Van Wijngaarden et al. |
| 2012/0218102 A1 | 8/2012 | Bivens et al. |
| 2012/0256745 A1 | 10/2012 | Piett et al. |
| 2012/0257729 A1 | 10/2012 | Piett et al. |
| 2012/0258680 A1 | 10/2012 | Piett et al. |
| 2012/0289243 A1 | 11/2012 | Tarlow et al. |
| 2012/0295575 A1 | 11/2012 | Nam |
| 2012/0295576 A1 | 11/2012 | Peterson |
| 2012/0309341 A1 | 12/2012 | Ward |
| 2012/0320912 A1 | 12/2012 | Estrada et al. |
| 2013/0005295 A1 | 1/2013 | Park et al. |
| 2013/0012155 A1 | 1/2013 | Forstall et al. |
| 2013/0030825 A1 | 1/2013 | Bagwandeen et al. |
| 2013/0036175 A1 | 2/2013 | Lau |
| 2013/0052983 A1 | 2/2013 | Fletcher et al. |
| 2013/0065569 A1 | 3/2013 | Leipzig et al. |
| 2013/0072144 A1 | 3/2013 | Berger et al. |
| 2013/0082837 A1 | 4/2013 | Cosentino et al. |
| 2013/0084824 A1 | 4/2013 | Hursey |
| 2013/0100268 A1 | 4/2013 | Mihailidis et al. |
| 2013/0102351 A1 | 4/2013 | Mo |
| 2013/0122932 A1 | 5/2013 | Patel et al. |
| 2013/0138791 A1 | 5/2013 | Thomas et al. |
| 2013/0143530 A1 | 6/2013 | Ehrlich |
| 2013/0183924 A1 | 7/2013 | Saigh et al. |
| 2013/0185368 A1 | 7/2013 | Nordstrom et al. |
| 2013/0203373 A1 | 8/2013 | Edge |
| 2013/0203376 A1 | 8/2013 | Maier et al. |
| 2013/0222133 A1 | 8/2013 | Schultz et al. |
| 2013/0226369 A1 | 8/2013 | Yorio et al. |
| 2013/0237175 A1 | 9/2013 | Piett |
| 2013/0237181 A1 | 9/2013 | Ray |
| 2013/0260710 A1 | 10/2013 | H R |
| 2013/0309994 A1 | 11/2013 | Hellwig et al. |
| 2013/0331055 A1 | 12/2013 | McKown et al. |
| 2013/0331058 A1 | 12/2013 | Harvey |
| 2014/0031000 A1 | 1/2014 | Hanover |
| 2014/0045450 A1 | 2/2014 | Ballantyne et al. |
| 2014/0049494 A1 | 2/2014 | Niu |
| 2014/0051379 A1 | 2/2014 | Ganesh et al. |
| 2014/0057590 A1 | 2/2014 | Romero |
| 2014/0059060 A1 | 2/2014 | Yang et al. |
| 2014/0086108 A1 | 3/2014 | Dunn et al. |
| 2014/0086145 A1 | 3/2014 | Ramkumar et al. |
| 2014/0087680 A1 | 3/2014 | Luukkala et al. |
| 2014/0087780 A1 | 3/2014 | Abhyanker et al. |
| 2014/0095425 A1 | 4/2014 | Sipple |
| 2014/0096195 A1 | 4/2014 | Morgan |
| 2014/0113606 A1 | 4/2014 | Morken et al. |
| 2014/0126356 A1 | 5/2014 | Lee et al. |
| 2014/0134969 A1 | 5/2014 | Jin et al. |
| 2014/0142979 A1* | 5/2014 | Mitsunaga ............ G16H 10/60 705/3 |
| 2014/0148117 A1 | 5/2014 | Basore et al. |
| 2014/0148120 A1 | 5/2014 | Buck |
| 2014/0155017 A1 | 6/2014 | Fan et al. |
| 2014/0155018 A1 | 6/2014 | Fan et al. |
| 2014/0164505 A1 | 6/2014 | Daly et al. |
| 2014/0199959 A1 | 7/2014 | Hassan et al. |
| 2014/0213212 A1 | 7/2014 | Clawson |
| 2014/0222462 A1 | 8/2014 | Shakil et al. |
| 2014/0248848 A1 | 9/2014 | Mufti et al. |
| 2014/0253326 A1 | 9/2014 | Cho et al. |
| 2014/0257846 A1 | 9/2014 | Hermiz et al. |
| 2014/0302810 A1 | 10/2014 | Inha et al. |
| 2014/0324351 A1 | 10/2014 | Dannevik et al. |
| 2014/0359008 A1 | 12/2014 | Finney et al. |
| 2014/0368601 A1 | 12/2014 | Decharms |
| 2014/0370836 A1 | 12/2014 | Gladstone |
| 2014/0370839 A1 | 12/2014 | Hatton |
| 2014/0370841 A1 | 12/2014 | Roberts et al. |
| 2015/0011176 A1 | 1/2015 | Zhu |
| 2015/0029836 A1 | 1/2015 | Hans et al. |
| 2015/0031324 A1 | 1/2015 | Zentner et al. |
| 2015/0038102 A1 | 2/2015 | Yoakum et al. |
| 2015/0038109 A1 | 2/2015 | Salahshour |
| 2015/0054639 A1 | 2/2015 | Rosen |
| 2015/0055453 A1 | 2/2015 | Chaki et al. |
| 2015/0055554 A1 | 2/2015 | Sedlacek et al. |
| 2015/0065082 A1 | 3/2015 | Sehgal |
| 2015/0081209 A1 | 3/2015 | Yeh et al. |
| 2015/0081927 A1 | 3/2015 | Xu et al. |
| 2015/0085997 A1 | 3/2015 | Biage et al. |
| 2015/0087259 A1 | 3/2015 | Hinsen |
| 2015/0094095 A1 | 4/2015 | Johnson et al. |
| 2015/0099481 A1 | 4/2015 | Maitre et al. |
| 2015/0109125 A1 | 4/2015 | Kaib et al. |
| 2015/0111524 A1 | 4/2015 | South et al. |
| 2015/0112883 A1 | 4/2015 | Orduna et al. |
| 2015/0137972 A1 | 5/2015 | Nepo et al. |
| 2015/0140936 A1 | 5/2015 | Sachs et al. |
| 2015/0147995 A1 | 5/2015 | Bontu et al. |
| 2015/0163352 A1 | 6/2015 | Ritter |
| 2015/0172897 A1 | 6/2015 | Mariathasan et al. |
| 2015/0181401 A1 | 6/2015 | Dhandu et al. |
| 2015/0201316 A1 | 7/2015 | Khatibi et al. |

(56) References Cited

U.S. PATENT DOCUMENTS

| | | |
|---|---|---|
| 2015/0289121 A1 | 10/2015 | Lesage et al. |
| 2015/0289122 A1 | 10/2015 | Friesen |
| 2015/0296351 A1 | 10/2015 | Tham et al. |
| 2015/0304827 A1 | 10/2015 | Price et al. |
| 2015/0317392 A1 | 11/2015 | Fernandez |
| 2015/0317809 A1 | 11/2015 | Chellappan et al. |
| 2015/0319284 A1 | 11/2015 | Leonessi |
| 2015/0350262 A1 | 12/2015 | Rainisto et al. |
| 2015/0358794 A1 | 12/2015 | Nokhoudian et al. |
| 2015/0365319 A1 | 12/2015 | Finn et al. |
| 2016/0004224 A1 | 1/2016 | Pi |
| 2016/0012702 A1 | 1/2016 | Hart et al. |
| 2016/0026768 A1 | 1/2016 | Singh et al. |
| 2016/0034961 A1 | 2/2016 | May |
| 2016/0057595 A1 | 2/2016 | Ahmed et al. |
| 2016/0065748 A1 | 3/2016 | Li et al. |
| 2016/0088455 A1 | 3/2016 | Bozik et al. |
| 2016/0110991 A1 | 4/2016 | Hunter et al. |
| 2016/0142894 A1 | 5/2016 | Papakonstantinou |
| 2016/0173689 A1* | 6/2016 | Klaban ............. G08B 25/016 455/404.1 |
| 2016/0182707 A1 | 6/2016 | Gabel |
| 2016/0210581 A1 | 7/2016 | Braun |
| 2016/0219084 A1 | 7/2016 | Abiezzi |
| 2016/0219397 A1 | 7/2016 | Mayor et al. |
| 2016/0227589 A1 | 8/2016 | Marshall et al. |
| 2016/0269535 A1 | 9/2016 | Balabhadruni et al. |
| 2016/0307436 A1 | 10/2016 | Nixon |
| 2016/0315923 A1 | 10/2016 | Riscombe-Burton et al. |
| 2016/0316493 A1 | 10/2016 | Davis et al. |
| 2016/0330769 A1 | 11/2016 | Edge |
| 2016/0337831 A1 | 11/2016 | Piett et al. |
| 2016/0345171 A1 | 11/2016 | Kulkarni et al. |
| 2016/0353262 A1 | 12/2016 | Acevedo |
| 2016/0353266 A1 | 12/2016 | Winkler et al. |
| 2016/0363931 A1 | 12/2016 | Yang et al. |
| 2016/0371973 A1 | 12/2016 | Holleczek et al. |
| 2017/0004427 A1 | 1/2017 | Bruchal et al. |
| 2017/0005914 A1 | 1/2017 | Edge et al. |
| 2017/0012815 A1 | 1/2017 | Nekrestyanov et al. |
| 2017/0024088 A1 | 1/2017 | La Pean |
| 2017/0046216 A1 | 2/2017 | Stenneth et al. |
| 2017/0075407 A1 | 3/2017 | Kritt |
| 2017/0078226 A1 | 3/2017 | Daly et al. |
| 2017/0093594 A1 | 3/2017 | Peak |
| 2017/0099579 A1 | 4/2017 | Ryan et al. |
| 2017/0108862 A1 | 4/2017 | Mikkelsen |
| 2017/0124670 A1 | 5/2017 | Becker et al. |
| 2017/0124852 A1 | 5/2017 | Pauws et al. |
| 2017/0140637 A1 | 5/2017 | Thurlow et al. |
| 2017/0142568 A1 | 5/2017 | Saito et al. |
| 2017/0142570 A1 | 5/2017 | Self et al. |
| 2017/0150335 A1 | 5/2017 | Self et al. |
| 2017/0161439 A1 | 6/2017 | Raduchel |
| 2017/0161614 A1 | 6/2017 | Mehta et al. |
| 2017/0180963 A1 | 6/2017 | Cavendish et al. |
| 2017/0180966 A1 | 6/2017 | Piett et al. |
| 2017/0188218 A1 | 6/2017 | Corley et al. |
| 2017/0208543 A1 | 7/2017 | Zhang et al. |
| 2017/0213251 A1 | 7/2017 | Nunally et al. |
| 2017/0238129 A1 | 8/2017 | Maier et al. |
| 2017/0238136 A1 | 8/2017 | Smith |
| 2017/0245113 A1 | 8/2017 | Hooker |
| 2017/0287085 A1 | 10/2017 | Smith et al. |
| 2017/0310827 A1 | 10/2017 | Mehta et al. |
| 2017/0316698 A1 | 11/2017 | Stenneth et al. |
| 2017/0323209 A1 | 11/2017 | Rinzler et al. |
| 2017/0325056 A1 | 11/2017 | Mehta et al. |
| 2017/0331954 A1 | 11/2017 | Kotnis et al. |
| 2017/0359712 A1 | 12/2017 | Meredith et al. |
| 2017/0374538 A1 | 12/2017 | Gellens et al. |
| 2018/0020091 A1 | 1/2018 | Self et al. |
| 2018/0020329 A1 | 1/2018 | Smith |
| 2018/0039737 A1 | 2/2018 | Dempers et al. |
| 2018/0053394 A1 | 2/2018 | Gersten |
| 2018/0053401 A1 | 2/2018 | Martin et al. |
| 2018/0077282 A1 | 3/2018 | Herron et al. |
| 2018/0077553 A1 | 3/2018 | Gideon, III |
| 2018/0089718 A1 | 3/2018 | Raisi |
| 2018/0150928 A1 | 5/2018 | Dejewski et al. |
| 2018/0160267 A1 | 6/2018 | Immendorf et al. |
| 2018/0176271 A1 | 6/2018 | Laurent |
| 2018/0242133 A1 | 8/2018 | Anand et al. |
| 2018/0262544 A1 | 9/2018 | Mehta et al. |
| 2018/0310159 A1 | 10/2018 | Katz et al. |
| 2018/0352408 A1 | 12/2018 | Baer et al. |
| 2019/0020993 A1 | 1/2019 | Nguyen |
| 2019/0073894 A1 | 3/2019 | Mehta et al. |
| 2019/0104395 A1 | 4/2019 | Mehta et al. |
| 2019/0130719 A1 | 5/2019 | D'Amico |
| 2019/0149661 A1 | 5/2019 | Klaban |
| 2019/0166244 A1 | 5/2019 | Ravichandran |
| 2019/0166480 A1 | 5/2019 | Rauner |
| 2019/0172335 A1 | 6/2019 | Johnston-Mitchell |
| 2019/0174288 A1 | 6/2019 | Bozik et al. |
| 2019/0174289 A1 | 6/2019 | Martin et al. |
| 2019/0205120 A1 | 7/2019 | Sheedy et al. |
| 2019/0230476 A1 | 7/2019 | Qi et al. |
| 2019/0246260 A1 | 8/2019 | Edge et al. |
| 2019/0253861 A1 | 8/2019 | Horelik et al. |
| 2019/0253865 A1 | 8/2019 | Winkler |
| 2019/0261145 A1 | 8/2019 | South et al. |
| 2019/0281165 A1 | 9/2019 | Mehta et al. |
| 2019/0306664 A1 | 10/2019 | Mehta et al. |
| 2019/0320310 A1 | 10/2019 | Horelik et al. |
| 2019/0324825 A1 | 10/2019 | Schwartz et al. |
| 2019/0327597 A1 | 10/2019 | Katz et al. |
| 2019/0335310 A1 | 10/2019 | Anand et al. |
| 2019/0342526 A1 | 11/2019 | Drako et al. |
| 2019/0380020 A1 | 12/2019 | Pellegrini et al. |
| 2020/0015058 A1 | 1/2020 | Wu |
| 2020/0059776 A1 | 2/2020 | Martin et al. |
| 2020/0068374 A1 | 2/2020 | Mehta et al. |
| 2020/0126174 A1 | 4/2020 | Halse et al. |
| 2020/0135005 A1 | 4/2020 | Katz et al. |
| 2020/0221279 A1 | 7/2020 | Mehta |
| 2020/0242138 A1 | 7/2020 | Russ et al. |
| 2020/0258374 A1 | 8/2020 | Mehta et al. |
| 2020/0274962 A1 | 8/2020 | Martin |
| 2020/0314240 A1 | 10/2020 | Leavitt |
| 2020/0314623 A1 | 10/2020 | Pellegrini |
| 2020/0344602 A1 | 10/2020 | Li |
| 2021/0006961 A1 | 1/2021 | King-Berkman et al. |
| 2021/0014659 A1 | 1/2021 | Mehta et al. |
| 2021/0037368 A1 | 2/2021 | Leavitt et al. |
| 2021/0037369 A1 | 2/2021 | Lesage |
| 2021/0110686 A1 | 4/2021 | Slavin et al. |
| 2021/0120394 A1 | 4/2021 | Martin et al. |
| 2021/0127228 A1 | 4/2021 | Baarman et al. |
| 2021/0204108 A1 | 7/2021 | Horelik |
| 2021/0266722 A1 | 8/2021 | Pellegrini |
| 2021/0314757 A1 | 10/2021 | Pellegrini et al. |
| 2021/0383918 A1 | 12/2021 | Martin et al. |
| 2021/0390844 A1 | 12/2021 | Katz et al. |
| 2021/0409928 A1 | 12/2021 | Mehta et al. |
| 2022/0014895 A1 | 1/2022 | Horelik et al. |
| 2022/0027417 A1 | 1/2022 | Katz et al. |
| 2022/0030109 A1 | 1/2022 | Leavitt et al. |
| 2022/0103995 A1 | 3/2022 | Horelik et al. |
| 2022/0131637 A1 | 5/2022 | Pellegrini et al. |
| 2022/0167141 A1 | 5/2022 | Anand et al. |
| 2022/0172599 A1 | 6/2022 | Mehta et al. |
| 2022/0174468 A1 | 6/2022 | Anand et al. |
| 2022/0201458 A1 | 6/2022 | Leavitt et al. |
| 2022/0210272 A1 | 6/2022 | Horelik et al. |
| 2022/0264274 A1 | 8/2022 | Bozik et al. |
| 2022/0272201 A1 | 8/2022 | Mehta et al. |
| 2022/0279331 A1 | 9/2022 | Biegel et al. |
| 2022/0303380 A1 | 9/2022 | Martin et al. |

(56) References Cited

U.S. PATENT DOCUMENTS

| | | | |
|---|---|---|---|
| 2022/0322061 | A1 | 10/2022 | King-Berkman et al. |
| 2022/0353662 | A1 | 11/2022 | Martin et al. |

FOREIGN PATENT DOCUMENTS

| | | | |
|---|---|---|---|
| CA | 2773749 | A1 | 10/2012 |
| CA | 2773881 | A1 | 10/2012 |
| CA | 2790501 | A1 | 3/2013 |
| CA | 2809421 | A1 | 9/2013 |
| CA | 2947936 | A1 | 11/2014 |
| CA | 2646607 | C | 9/2016 |
| CA | 2886535 | A1 | 10/2016 |
| CA | 2697986 | C | 5/2018 |
| CN | 104487976 | A | 4/2015 |
| CN | 104539776 | A | 4/2015 |
| CN | 205220594 | U | 5/2016 |
| CN | 106021508 | A | 10/2016 |
| EP | 2161912 | A2 | 3/2010 |
| JP | H10314133 | A | 12/1998 |
| JP | H1170086 | A | 3/1999 |
| JP | 2003272070 | A | 9/2003 |
| JP | 2006319946 | A | 11/2006 |
| JP | 2006334369 | A | 12/2006 |
| JP | 4107777 | B2 | 6/2008 |
| JP | 2011223285 | A | 11/2011 |
| JP | 2012222443 | A | 11/2012 |
| KR | 20090019606 | A | 2/2009 |
| KR | 20090092900 | A | 9/2009 |
| KR | 20100055746 | A | 5/2010 |
| KR | 101305286 | B1 | 9/2013 |
| KR | 20140052780 | A | 5/2014 |
| KR | 20140093568 | A | 7/2014 |
| KR | 20150097031 | A | 8/2015 |
| KR | 101602482 | B1 | 3/2016 |
| KR | 101612423 | B1 | 4/2016 |
| KR | 20160097933 | A | 8/2016 |
| KR | 20170100422 | A | 9/2017 |
| WO | WO-9723104 | A1 | 6/1997 |
| WO | WO-0022593 | A1 | 4/2000 |
| WO | WO-0165763 | A2 | 9/2001 |
| WO | WO-0167419 | A2 | 9/2001 |
| WO | WO-2004057853 | A2 | 7/2004 |
| WO | WO-2007109599 | A2 | 12/2007 |
| WO | WO-2011060335 | A1 | 5/2011 |
| WO | WO-2012129561 | A1 | 9/2012 |
| WO | WO-2014025563 | A1 | 2/2014 |
| WO | WO-2014063121 | A1 | 4/2014 |
| WO | WO-2014074420 | A1 | 5/2014 |
| WO | WO-2014087157 | A1 | 6/2014 |
| WO | WO-2014176646 | A1 | 11/2014 |
| WO | WO-2015127867 | A1 | 9/2015 |
| WO | WO-2015196155 | A1 | 12/2015 |
| WO | WO-2016044540 | A1 | 3/2016 |
| WO | WO-2016093553 | A1 | 6/2016 |
| WO | 2017001655 | | 1/2017 |
| WO | WO-2017079354 | A1 | 5/2017 |
| WO | WO-2017083571 | A1 | 5/2017 |
| WO | WO-2017100220 | A1 | 6/2017 |
| WO | WO-2017106775 | A1 | 6/2017 |
| WO | WO-2017112820 | A1 | 6/2017 |
| WO | WO-2017189610 | A2 | 11/2017 |
| WO | WO-2017196753 | A1 | 11/2017 |
| WO | WO-2018039142 | A1 | 3/2018 |
| WO | WO-2019113129 | A1 | 6/2019 |
| WO | WO-2020172612 | A1 | 8/2020 |
| WO | WO-2020205033 | A1 | 10/2020 |
| WO | WO-2021034859 | A1 | 2/2021 |
| WO | WO-2021203037 | A1 | 10/2021 |

OTHER PUBLICATIONS

U.S. Appl. No. 16/823,192 Office Action dated Dec. 4, 2020.
U.S. Appl. No. 16/834,914 Office Action dated Dec. 2, 2020.
Abel et al. Semantics + Filtering + Search = Twitcident exploring information in social web streams. HT'12—Proceedings of 23rd ACM Conference on Hypertext and Social Media (10 pgs) (2012).
ArcGIS REST Services Directory. Folder: TIGERWeb. Available at https://tigerweb.geo.census.gov/arcgis/rest/services/TIGERweb. (1 pg.) (Accessed Sep. 2017).
Chowdhury et al. Tweet4act: Using incident-specific profiles for classifying crisis-related messages. Proceedings of the 10th International ISCRAM Conference (pp. 834-839) (2013).
Cipolla et al. A tool for Emergency Detection with Deep Learning Neural Networks. KDWeb (2016) How to predict a disaster. ICAR—National Research Council of Italy—Palermo, Italy (10 pgs).
Homeland Security Science and Technology. Using Social Media for Enhanced Situational Awareness and Decision Support. Virtual Social Medial Working Group and DHS First Responders Group. (44 pgs.) (Jun. 2014).
Marcus et al. TwitInfo: Aggregating and Visualizing Microblogs for Event Exploration. ACM CHI Conference 2011 (10 pgs).
Meier. MatchApp: Next Generation Disaster Response App? iRevolution (12 pgs.) (Feb. 27, 2013).
National Emergency Number Association (Nena) Technical Committee Chairs: NENA Functional and Interface Standards for Next Generation 9-1-1 Version 1.0 (i3). (Dec. 18, 2017). Retrieved from the Internet: URL:https://c.ymcdn.com/sites/nena.site-ym.com/resource/collection/2851C951-69FF-40F0-A6B8-36A714CB085D/NENA_08-002-vl_Functional_Interface_Standards_NG911_i3.pdf [retrieved on Feb. 5, 2018] (121 pgs).
National Emergency Number Association (NENA). Social Networking in 9-1-1 PSAPs Information Document. Available at https://c.ymcdn.com/sites/www.nena.org/resource/resmgr/Standards/NENA-INF-001.1.1-2012_Social (18 pgs) (2012).
PCT/US2015/050609 International Preliminary Report on Patentability dated Mar. 30, 2017.
PCT/US2015/050609 International Search Report and Written Opinion dated Dec. 16, 2015.
PCT/US2016/060189 International Preliminary Report on Patentability dated May 17, 2018.
PCT/US2016/060189 International Search Report and Written Opinion dated Feb. 24, 2017.
PCT/US2016/065212 International Preliminary Report on Patentability dated Jun. 21, 2018.
PCT/US2016/065212 International Search Report and Written Opinion dated Feb. 20, 2017.
PCT/US2016/067366 International Preliminary Report on Patentability dated Jun. 28, 2018.
PCT/US2016/067366 International Search Report and Written Opinion dated Mar. 31, 2017.
PCT/US2016/068134 International Preliminary Report on Patentability dated Jul. 5, 2018.
PCT/US2016/068134 International Search Report and Written Opinion dated Apr. 21, 2017.
PCT/US2017/029465 International Preliminary Report on Patentability dated Nov. 8, 2018.
PCT/US2017/029465 International Search Report and Written Opinion dated Aug. 9, 2017.
PCT/US2017/031605 International Search Report and Written Opinion dated Jul. 31, 2017.
PCT/US2017/047854 International Preliminary Report on Patentability dated Mar. 7, 2019.
PCT/US2017/047854 International Search Report and Written Opinion dated Nov. 28, 2017.
PCT/US2018/028951 International Search Report and Written Opinion dated Aug. 10, 2018.
PCT/US2018/063935 International Search Report and Written Opinion dated Mar. 22, 2019.
PCT/US2019/027538 International Search Report and Written Opinion dated Aug. 2, 2019.
Seattle Real Time Fire 911 Calls. Available at https://catalog.data.gov/dataset/seattle-real-time-fire-911-calls-6cdf3 (3 pgs.) (Accessed Sep. 2017).
Tazaki. Floating Ground: An Architecture for Network Mobility and Ad Hoc Network Convergence. Thesis. Graduate School of Media and Governance Keio University 5322 Endo Fujisawa, Kanagawa, Japan 2520882 (pp. 1-162) (2010).

(56) References Cited

OTHER PUBLICATIONS

U.S. Census Bureau. Developers: Population Estimates APIs. Available at https://www.census.gov/data/developers/data-sets/popest-popproj/popest.html (2 pgs.) (Accessed Sep. 2017).
U.S. Appl. No. 14/794,780 Office Action dated Feb. 2, 2016.
U.S. Appl. No. 14/794,780 Office Action dated Mar. 7, 2017.
U.S. Appl. No. 14/794,780 Office Action dated Nov. 15, 2016.
U.S. Appl. No. 14/856,818 Office Action dated Apr. 12, 2017.
U.S. Appl. No. 15/371,117 Office Action dated Aug. 5, 2019.
U.S. Appl. No. 15/387,363 Office Action dated Jul. 6, 2017.
U.S. Appl. No. 15/387,363 Office Action dated Mar. 15, 2017.
U.S. Appl. No. 15/436,379 Office Action dated Apr. 6, 2017.
U.S. Appl. No. 15/436,379 Office Action dated Nov. 2, 2017.
U.S. Appl. No. 15/436,484 Office Action dated May 8, 2017.
U.S. Appl. No. 15/436,484 Office Action dated Sep. 14, 2017.
U.S. Appl. No. 15/444,133 Office Action dated Apr. 4, 2017.
U.S. Appl. No. 15/444,133 Office Action dated Aug. 17, 2017.
U.S. Appl. No. 15/497,067 Office Action dated Jun. 23, 2017.
U.S. Appl. No. 15/588,343 Office Action dated Feb. 26, 2018.
U.S. Appl. No. 15/589,847 Office Action dated Jun. 23, 2017.
U.S. Appl. No. 15/589,847 Office Action dated Nov. 30, 2017.
U.S. Appl. No. 15/589,847 Office Action dated Nov. 6, 2018.
U.S. Appl. No. 15/667,531 Office Action dated Apr. 5, 2018.
U.S. Appl. No. 15/667,531 Office Action dated Nov. 8, 2017.
U.S. Appl. No. 15/682,440 Office Action dated Jul. 10, 2019.
U.S. Appl. No. 15/880,208 Office Action dated Aug. 7, 2018.
U.S. Appl. No. 15/958,186 Office Action dated Oct. 18, 2018.
U.S. Appl. No. 15/958,398 Office Action dated Oct. 12, 2018.
U.S. Appl. No. 16/150,099 Office Action dated Jun. 25, 2019.
U.S. Appl. No. 16/162,171 Office Action dated Nov. 4, 2019.
U.S. Appl. No. 16/178,476 Office Action dated May 30, 2019.
U.S. Appl. No. 16/209,892 Office Action dated Feb. 8, 2019.
U.S. Appl. No. 16/271,634 Office Action dated Dec. 16, 2019.
U.S. Appl. No. 16/271,634 Office Action dated Jun. 13, 2019.
U.S. Appl. No. 16/378,363 Office Action dated Jul. 19, 2019.
U.S. Appl. No. 16/436,810 Office Action dated Aug. 9, 2019.
U.S. Appl. No. 16/436,810 Office Action dated Dec. 17, 2019.
Weather Company Data For IBM Bluemix APIs. Available at https://twcservice.mybluemix.net/rest-api/ (100 pgs) (Accessed Sep. 2017).
Song. Next Generation Emergency Call System with Enhanced Indoor Positioning, Columbia University. Thesis [online] [retrieved Apr. 20, 2020 from <url:https://scholar.google.co.kr/citations/?user=h_4uUqAAAAAJ&hl=ko > (156 pgs) (2014) < /url: < a > .
PCT/US2020/019341 International Search Report and Written Opinion dated Jun. 29, 2020.
U.S. Appl. No. 15/976,600 Office Action dated Aug. 3, 2020.
U.S. Appl. No. 16/509,296 Office Action dated Sep. 3, 2020.
U.S. Appl. No. 16/740,207 Office Action dated Aug. 17, 2020.
U.S. Appl. No. 16/798,049 Office Action dated Jul. 17, 2020.
U.S. Appl. No. 16/162,171 Office Action dated Sep. 24, 2020.
U.S. Appl. No. 16/384,600 Office Action dated Oct. 2, 2020.
U.S. Appl. No. 16/421,355 Office Action dated Oct. 19, 2020.
Co-pending U.S. Appl. No. 17/065,337, inventors Horelik; Nicholas Edward et al., filed Oct. 6, 2020.
Co-pending U.S. Appl. No. 17/143,819, inventors Pellegrini; William et al., filed Jan. 7, 2021.
Co-pending U.S. Appl. No. 17/332,863, inventors Martin; Michael et al., filed May 27, 2021.
PCT/US2019/036403 International Search Report and Written Opinion dated Oct. 4, 2019.
U.S. Appl. No. 15/976,600 Office Action dated May 13, 2021.
U.S. Appl. No. 16/162,171 Office Action dated Apr. 8, 2021.
U.S. Appl. No. 16/378,363 Office Action dated Feb. 17, 2021.
U.S. Appl. No. 16/384,600 Office Action dated Jun. 9, 2021.
U.S. Appl. No. 16/421,355 Office Action dated May 12, 2021.
U.S. Appl. No. 16/537,377 Office Action dated Apr. 16, 2021.
U.S. Appl. No. 16/798,049 Office Action dated Mar. 8, 2021.
U.S. Appl. No. 17/115,098 Office Action dated Mar. 9, 2021.
Botega et al. Saw-Oriented User Interfaces for Emergency Dispatch Systems. Computer Vision—Eccv 2020 : 16th European Conference, Glasgow, UK, Aug. 23-28, 2020 : Proceedings; Part of The Lecture Notes in Computer Science (Jul. 21, 2015).
U.S. Appl. No. 15/976,600 Office Action dated Jan. 28, 2022.
U.S. Appl. No. 16/421,355 Office Action dated Jan. 7, 2022.
U.S. Appl. No. 16/537,377 Office Action dated Dec. 27, 2021.
U.S. Appl. No. 16/865,170 Office Action dated Feb. 24, 2022.
U.S. Appl. No. 16/865,170 Office Action dated Jul. 9, 2021.
U.S. Appl. No. 16/940,043 Office Action dated Oct. 18, 2021.
U.S. Appl. No. 17/065,337 Office Action dated Nov. 8, 2021.
U.S. Appl. No. 17/143,819 Office Action dated Dec. 6, 2021.
U.S. Appl. No. 16/378,363 Office Action dated Sep. 17, 2021.
U.S. Appl. No. 16/539,946 Office Action dated Oct. 6, 2021.
U.S. Appl. No. 16/936,856 Office Action dated Aug. 16, 2021.
U.S. Appl. No. 17/332,863 Office Action dated Sep. 9, 2021.
U.S. Appl. No. 16/539,946 Office Action dated Jul. 28, 2022.
U.S. Appl. No. 16/684,366 Office Action dated Jul. 1, 2022.
U.S. Appl. No. 17/065,337 Office Action dated Aug. 12, 2022.
U.S. Appl. No. 17/143,819 Office Action dated May 26, 2022.
U.S. Appl. No. 17/196,438 Office Action dated May 10, 2022.
U.S. Appl. No. 17/221,568 Office Action dated May 2, 2022.
U.S. Appl. No. 17/378,045 Office Action dated Jul. 20, 2022.
U.S. Appl. No. 17/448,610 Office Action dated Oct. 5, 2022.
U.S. Appl. No. 17/448,817 Office Action dated Dec. 7, 2022.
U.S. Appl. No. 17/468,392 Office Action dated Nov. 2, 2022.
U.S. Appl. No. 17/479,471 Ex Parte Quayle dated Oct. 14, 2022.
U.S. Appl. No. 17/545,244 Office Action dated Apr. 1, 2022.
U.S. Appl. No. 17/566,859 Office Action dated Mar. 18, 2022.
U.S. Appl. No. 17/671,493 Office Action dated May 10, 2022.
U.S. Appl. No. 17/671,510 Office Action dated Apr. 22, 2022.
U.S. Appl. No. 17/671,510 Office Action dated Aug. 4, 2022.
U.S. Appl. No. 17/856,796 Office Action dated Sep. 13, 2022.
U.S. Appl. No. 17/196,438 Office Action dated Dec. 29, 2022.
U.S. Appl. No. 17/932,993 Office Action dated Jan. 5, 2023.
Co-pending U.S. Appl. No. 16/740,207, filed Jan. 10, 2020.
Co-pending U.S. Appl. No. 16/798,049, filed Feb. 21, 2020.
Co-pending U.S. Appl. No. 16/823,192, filed Mar. 18, 2020.
Co-pending U.S. Appl. No. 16/834,914, filed Mar. 30, 2020.
PCT/US2020/013176 International Search Report and Written Opinion dated May 8, 2020.
Song. Next Generation Emergency Call System with Enhanced Indoor Positioning, Columbia University. Thesis [online] [retrieved Apr. 20, 2020 from < url:https://scholar.google.co.kr/citations/?user=h_4uUqAAAAAJhl=ko > (156 pgs) (2014) < /url: < a > .
U.S. Appl. No. 15/976,600 Office Action dated Jan. 30, 2020.
U.S. Appl. No. 16/162,171 Office Action dated Apr. 9, 2020 .
U.S. Appl. No. 16/384,600 Office Action dated Apr. 2, 2020 .
U.S. Appl. No. 16/421,355 Office Action dated Feb. 4, 2020.
U.S. Appl. No. 16/526,195 Office Action dated Dec. 27, 2019.
U.S. Appl. No. 16/740,207 Office Action dated Mar. 11, 2020.
U.S. Appl. No. 16/378,363 Office Action dated Jan. 14, 2020.
Alba, Alejandro, "11 apps that can save your life in case of an emergency" Jun. 15, 2016, New York Daily News, site visited Apr. 11, 2018: http://www.nydailynews.com/news/world/10-apps-save-life- case-emergency-article-1.2438105.
Chohlaswood et al. Mining 911 Calls in New York City: Temporal Patterns, Detection and Forecasting. AAAI Conference on Artificial Intelligence Workshop (Apr. 2015).
Hodgkiss et al. Spatiotemporal Analysis of 911 Call Stream Data. Proceedings of the 2005 national conference on Digital government research (2005).
In Case of Emergency: Download These Apps Jul. 23, 2013, Design to Improve Life, site visited Apr. 11, 2018: https:// designtoimprovelife.dk/red-cross-mobile-apps/ (1 pg.).
Jasso et al. Prediction of 911 Call vols. For Emergency Event Detection. Proceedings of the 8th Annual International Digital Government Research Conference (2007) .
Just in Case Emergency Communications App Feb. 1, 2013, appereatorpro, site visited Apr. 11, 2018: http:// http://www.appereatorpro.com/just-in-case/ (2 pgs).

(56) References Cited

OTHER PUBLICATIONS

"Make Emergency Calls and Send Text Tips" Dec. 12, 2014, RAVEGuardian, site visited Apr. 11, 2018: http://www.raveguardian.com/emergency-communication/.
Sriramulu et al. Dynamic cost-effective emergency network provision. I-TENDER '17: Proceedings of the First CoNEXT Workshop on ICT Tools for Emergency Networks and Disaster Relief. pp. 37-43 https://doi.org/10.1145/3152896.3152904 (Dec. 2017).
U.S. Appl. No. 15/371,117 Office Action dated Apr. 3, 2020.
U.S. Appl. No. 15/371,117 Office Action dated Dec. 10, 2020.
U.S. Appl. No. 16/289,530 Office Action dated Mar. 8, 2021.
U.S. Appl. No. 16/365,281 Office Action dated Mar. 22, 2021.
U.S. Appl. No. 16/365,281 Office Action dated Sep. 29, 2020.
U.S. Appl. No. 29/590,709 Ex Parte Quayle dated May 1, 2018.
Wickline. Panic app soon to go to schools Jul. 25, 2015, ArkansasOnline, site visited Apr. 11, 2018: http://www.arkansasonline.com/news/2015/Jul. 25/panic-app-soon-go-schools/ (1 pg).
XL-Viewer: Smartphone for Seniors & Disabled Nov. 18, 2015, Disabled World, site visited Apr. 11, 2018: https:// http://www.disabled-world.com/assistivedevices/computer/xl-viewer. Php (2 pgs).

\* cited by examiner

List | Map     Reports & Analytics   Mutual Aid     Search 612     Configuration     User 614

| Action | ID# ▼ | Location ▼ | Timestamp ▼ | Name ▼ | Source ▼ | Type ▼ | Status ▼ | Description ▼ | Urgency ▼ | Confidence ▼ | More |
|---|---|---|---|---|---|---|---|---|---|---|---|
| ○ | 27651 | 123 Main St Apt#4 | 12:19:36 | Jim Smith | Whatsapp 1-332-4529 | Evac | Pending | Flooding waist deep, need drinking water | High | ••• | |
| ○ | 27655 | 38 Beech Road | 12:16:28 | Victoria Mejilla | Facebook(link) | Labor | Unit Dispatched | Contractions 10 minutes apart | High | ••• | |
| ○ | 27821 | 5002 S Lake Houston | 11:04:39 | Jane Snow | Twitter(link) Inset 621 | Evac | Rescue Boat Dispatched | 3 trapped on 2nd floor | High | ••• | |
| ○ | | | | | | En | | EMT inbound to hospital | Medium | ••• | |
| ○ | | | | | | | tched | Fire dispatch in progress | Medium | ••• | |
| ○ | | | | | | | on | Evac in progress | High | ••• | |
| ○ | | | | | | ing | | No power. Need asst. | Low | ••• | |
| ○ | | | | | | | on | Evac in progress | High | ••• | |
| ○ | | | | | | e | | Electrical Fire | Medium | ••• | |
| ○ | 27609 | 8 Northern Lane | 10:24:28 | Hari Reddy | Emergency Registry | Flood | Closed | User resolved | Low | ••• | |

Inset 621:
Name: Jane Snow    Condition: Rising waters outside home. 3 people and one dog; 1 heart patient with limited mobility
Address 5002 S Lake Houston Pkwy, TX 77049
Timestamp 11:04:39   Status Rescue boat dispatched
Gender Female   Confidence 100%; alert & location verified
Age 28   Priority High
Cell # 555-112-1212   Twitter @user1212
Unit Drive #3

ACTION 621:
- Push To CAD
- Message
- Request Update
- Duplicate
- Add Comment
- Cancel Request Load More 616     Feed 620

FIG. 6A

| RAPID SOS 602 | | | | | | | TOOLS 604 ? |
|---|---|---|---|---|---|---|---|
| OTHER TOOLS 606 | CALL CONTROL/ AUDIO CONTROL 607 | | | | | | ALI DISPLAY: 610 |

| OTHER TOOLS 606 | CALL CONTROL/ AUDIO CONTROL 607 | ALI DISPLAY: 610 |
|---|---|---|
| (EG. PSTN CALL, QUERIES,) | READY 611-1 \| RELEASE 611-2 \| DROP 611-3 \| HOLD 611-4 \| ASSIGN 611-5 \| REDIAL 611-6 | ANI: (555)555-5555 |
| | | REP: MICHAEL MARTIN |
| | | DATE: 07/23/2017 |
| | ENHANCED DATA 614 | TIME : 02:20:00 |
| | | NAME: JAMES ANDERSON |
| | | ADDRESS: 234 STREET |
| | PHONE #         LAST LOCATION UPDATE | CITY: NEWYORK |
| | (555)555-5555      02:22:00 | STATE: NEWYORK |
| | | ESN: 111 |
| | PROBABLE ADDRESS:  234 STREET, NEWYORK, NY 10017 | COS: WP+2 |
| | LIKELIHOOD: 90% | LAT: 40.154536 |
| | PROFILE PIC: | LONG: 60.154536 |
| | NAME: JAMES ANDERSON | RADIUS: 2 MILE |
| | GENDER: MALE | CONFIDENCE: 90% |
| | STATUS: SINGLE | ALTITUDE:   RADIUS: |
| | LAST STATUS: 07/23/2017  02:24:00 | RECENT CALLS 616 |
| | PLATFORM: FB | LIST |
| | URL: HTYPS://WWW.FACEBOOK.COM/JAMESDOC-555 | DATE \| TIME \| CBN \| LOCATION |
| | CONTACT INFO: | |
| | KNOWN PHONE NUMBER: (+1)-555-5555 | |
| | KNOWN EMAIL: JAMES@GMAIL.COM | |
| | MEDICAL INFO: ALLERGIC TO PENICILLIN | |
| | CALLER INFORMATION 618-1 \| LOCATION 618-2 \| SERVICES 618-3 \| SOCIAL MEDIA 618-4 | |

EMERGENCY REGISTRY FOR EMERGENCY MANAGEMENT

This application is a continuation of U.S. application Ser. No. 16/209,892, filed Dec. 4, 2018, issued as U.S. Pat. No. 10,701,542 on Jun. 30, 2020, which claims the benefit of U.S. Provisional Application No. 62/595,005, filed Dec. 5, 2017, each of which are fully incorporated herein by reference.

BACKGROUND OF THE INVENTION

In some emergency situations, traditional communications means can often become congested and overloaded. For example, in Hurricane Harvey, 911 traffic spiked considerably causing 45-minute wait times in some instances. In these disasters it can be particularly challenging for individuals in an emergency to wait for emergency response due to rapidly changing conditions, dying cell phone batteries, rising flood waters, limited cell receptivity, etc.

SUMMARY OF THE INVENTION

With the rise of social media websites, users have become accustomed to sharing various aspects of their lives on such forums. During emergency situations, users may turn to social media for help such as when they are unable to call for emergency help. However, a post on social media may not reach the proper authorities, and the emergency help may not be dispatched. In addition, many emergency dispatch centers (e.g., Public Safety Answering Points (PSAPs)) do not have capacity to distill and view the relevant information about the emergency posted on social media websites.

In some aspects, disclosed herein are systems, methods, media, and devices for transmitting, managing, and updating emergency alerts from social media platforms and/or other web content.

In some aspects, a method for providing an alternate communication pathway for emergency data to an emergency service provider (ESP) is disclosed. In some embodiments, one or more processors of said emergency assistance system (EAS) implements the method comprising: (a) gathering one or more web content published on a social media network by one or more users, wherein said one or more web content comprising an emergency indication comprises the emergency data; (b) distilling the emergency data into an emergency data set associated with at least one emergency, wherein the emergency data set comprises at least one location of the at least one emergency; (c) at least one geofence associated with the ESP from one or more geofence databases, wherein the at least one geofence encloses one or more geographical regions within the jurisdiction of the ESP; (d) generating a processed emergency feed comprising two or more emergency entries, wherein each emergency entry comprises at least a subset of the emergency data set associated with the at least one emergency having a location within the at least one geofence; and (e) displaying a display of the ESP the processed emergency feed comprising the two or more emergency entries. In some embodiments, the processed emergency feed comprises near real-time data that is less than 15 minutes old. In some embodiments, the processed emergency feed comprises recent dynamic data comprising location data and sensor data. In some embodiments, the emergency data that is more than 1 hour old is excluded from the processed emergency feed. In some embodiments, the emergency data set is updated with new or updated web content periodically. In some embodiments, the step of generating the processed emergency feed in (c) comprises using an algorithm to identify duplicate emergency entries and consolidating the duplicate emergency entries within the processed emergency feed using a set of redundancy rules. In further embodiments, the method comprises prompting an ESP user to mark non-unique emergency entries in the processed emergency feed as duplicates. In further embodiments, the method comprises displaying the processed emergency feed on an PSAP personnel display. In some embodiments, the processed emergency feed displays the two or more emergency entries with corresponding priority or urgency. In some embodiments, the processed emergency feed comprises response status for an emergency response for the two or more entries. In some embodiments, the processed emergency feed comprises a verified emergency location that is a current device-based location of an access device used for reporting the emergency. In further embodiments, the method comprises displaying the at least one emergency on an interactive geographical heat map, wherein each emergency entry is configured to display detailed information and emergency response actions upon user selection. In some embodiments, the emergency data set comprises a reporting user that is different from the one or more users who published the one or more web content on the social media network. In some embodiments, the one or more web content is published on a social media network using one or more access devices.

In some aspects, disclosed herein is an emergency assistance system (EAS) for providing an alternate communication pathway for emergency data to an emergency service provider (ESP), the system comprising one or more processors configured for: (a) gathering one or more web content published on a social media network by one or more users, wherein said one or more web content comprising an emergency indication comprises the emergency data and the one or more users are associated with one or more access devices; (b) distilling the emergency data into an emergency data set associated with at least one emergency, wherein the emergency data set comprises at least one location of the at least one emergency; (c) retrieving at least one geofence associated with the ESP from one or more geofence databases, wherein the at least one geofence encloses one or more geographical regions within the jurisdiction of the ESP; (d) generating, by the one or more processors, a processed emergency feed comprising two or more emergency entries, wherein each emergency entry comprises at least a subset of the emergency data set associated with the at least one emergency having a location within the at least one geofence; and (e) displaying the processed emergency feed comprising the two or more emergency entries on an ESP display. In some embodiments, the processed emergency feed comprises near real-time data that is less than 15 minutes old. In some embodiments, the processed emergency feed comprises recent dynamic data comprising location data and sensor data. In some embodiments, the emergency data that is more than 1 hour old is excluded from the processed emergency feed. In some embodiments, the emergency data set is updated with new or updated web content periodically. In some embodiments, the step of generating the processed emergency feed in (c) comprises using an algorithm to identify duplicate emergency entries and consolidating the duplicate emergency entries within the processed emergency feed using a set of redundancy rules. In further embodiments, the method comprises prompting an ESP user to mark non-unique emergency entries in the processed emergency feed as duplicates. In further embodiments, the method comprises displaying the processed emergency feed on an PSAP personnel display. In some embodiments, the processed emergency feed displays the two or more emergency entries with corresponding priority or urgency. In some embodiments, the processed emergency feed comprises response status for an emergency response for the two or more entries. In some embodiments, the processed emergency feed comprises a verified emergency location that is a current device-based location of an access device used for reporting the emergency. In further embodiments, the method comprises displaying the at least one emergency on an interactive geographical heat map, wherein each emergency entry is configured to display detailed information and emergency response actions upon user selection. In some embodiments, the emergency data set comprises a reporting user that is different from the one or more users who published the one or more web content on the social media network. In some embodiments, the one or more web content is published on a social media network using one or more access devices.

In some aspects, disclosed herein is non-transitory computer-readable storage media encoded with a computer program including instructions executable by a processor to create a server application comprising: (a) social media monitoring module for gathering one or more web content published on a social media network by one or more users, wherein said one or more web content comprising an emergency indication comprises emergency data; (b) distilling module for distilling the emergency data into an emergency data set associated with at least one emergency, wherein the emergency data set comprises at least one location of the at least one emergency; (c) geofencing module retrieving at least one geofence associated with the ESP from one or more geofence databases, wherein the at least one geofence encloses one or more geographical regions within the jurisdiction of the ESP; (d) emergency feed module for generating a processed emergency feed comprising two or more emergency entries, wherein each emergency entry comprises at least a subset of the emergency data set associated with the at least one emergency having a location within the at least one geofence; and (e) a display module for displaying the processed emergency feed comprising the two or more emergency entries at the ESP. In some embodiments, the processed emergency feed comprises near real-time data that is less than 15 minutes old. In some embodiments, the processed emergency feed comprises recent dynamic data comprising location data and sensor data. In some embodiments, the emergency data that is more than 1 hour old is excluded from the processed emergency feed. In some embodiments, the emergency data set is updated with new or updated web content periodically. In some embodiments, the step of generating the processed emergency feed in (c) comprises using an algorithm to identify duplicate emergency entries and consolidating the duplicate emergency entries within the processed emergency feed using a set of redundancy rules. In further embodiments, the method comprises prompting an ESP user to mark non-unique emergency entries in the processed emergency feed as duplicates. In further embodiments, the method comprises displaying the processed emergency feed on an PSAP personnel display. In some embodiments, the processed emergency feed displays the two or more emergency entries with corresponding priority or urgency. In some embodiments, the processed emergency feed comprises response status for an emergency response for the two or more entries. In some embodiments, the processed emergency feed comprises a verified emergency location that is a current device-based location of an access device used for reporting the emergency. In further embodiments, the method comprises displaying the at least one emergency on an interactive geographical heat map, wherein each emergency entry is configured to display detailed information and emergency response actions upon user selection. In some embodiments, the emergency data set comprises a reporting user that is different from the one or more users who published the one or more web content on the social media network. In some embodiments, the one or more web content is published on a social media network using one or more access devices.

In some aspects, disclosed herein is a method for providing access to emergency data by an emergency assistance system (EAS), the method comprising: (a) receiving, by one or more processors of said emergency assistance system (EAS), one or more web content published on a social media network by one or more users, said one or more web content comprising an emergency indication; (b) distilling, by the one or more processors, the information into an emergency data set associated with the emergency indication, wherein the emergency data set comprises a user identifier and a current location of a person requiring emergency assistance; (c) receiving, by the one or more processors, a data request from an emergency service provider (ESP); and (d) transmitting, by the one or more processors, return data comprising the emergency data associated with the emergency to the ESP through secure pathways. In some embodiments, the ESP is a public safety answering point (PSAP) that has received an emergency call for reporting emergency assistance. In some embodiments, the emergency data set is provisioned in one or more clearinghouse databases and accessible using the user identifier. In further embodiments, the method further comprises provisioning the emergency data that was gathered from the one or more web content using the user identifier. In further embodiments, the method comprises the provisioned emergency data is available through ALI, NENA, EENA or NG911 databases. In some embodiments, the user identifier comprises a timestamp, a username, a phone number, an account name, an email address, a device number, an IP address of an access device, a social media network identifier, or any combination thereof. In some embodiments, sending an emergency alert to the ESP through an alternative communication pathway that is not a phone line. In further embodiments, the emergency alert is sent to the ESP through the alternative communication pathway using an email address, a chat window, a social media post, or an emergency registry. In some embodiments, the emergency data comprises identifying information for a reporting user that is different from the person requiring emergency assistance. In further embodiments, the method comprises connecting the reporting user to an ESP through an emergency communication session to facilitate provisioning of emergency assistance. In some embodiments, the method comprises generating a processed emergency feed in real-time or near real-time comprising a plurality of emergencies within a defined geographical area. In further embodiments, the method comprises displaying the processed emergency feed on a PSAP display, wherein the processed emergency feed comprises two or more emergency entries. In further embodiments, the processed emergency feed comprises an incident identifier associated with an emergency incident, wherein multiple reports of the emergency incident are consolidated into one emergency entry. In further embodiments, emergency entries within the processed emergency feed are prioritized based on urgency or severity of each emergency entry. In further embodiments, the method comprises displaying the prioritized emergency entries as a heat map. In some embodiments, the processed emergency feed comprises a last current status for an emergency response to the emergency incident. In further embodiments, the processed emergency feed comprises a verified emergency location comprising a current device-based location of an access device used for reporting the emergency incident. In further embodiments, the method comprises displaying the plurality of emergencies on a geographical map as interactive graphical elements that provide detailed information upon user selection. In some embodiments, the method comprises generating the processed emergency feed within a defined time window and displaying the processed emergency feed on an ESP display. In some embodiments, the method comprises initiating an emergency flow when an indication of emergency is detected in step (a), wherein the emergency flow comprises a sequence of emergency communication steps comprising contacting one or more emergency contacts and/or corporate representatives. In some embodiments, the method comprises connecting two or more users to an ESP in a three-way conference bridge for the purpose of requesting emergency assistance. In some embodiment, the current location is obtained within the last 10 seconds to 4 hours.

In some aspects, disclosed herein is an emergency assistance system (EAS) for providing access to emergency data comprising one or more processors configured for: (a) receiving one or more web content published on a social media network by one or more users, said one or more web content comprising an emergency indication; (b) distilling the information into an emergency data set associated with the emergency indication, wherein the emergency data set comprises a user identifier and a current location of a person requiring emergency assistance; (c) receiving a data request from an emergency service provider (ESP); and (d) transmitting return data comprising the emergency data associated with the emergency to the ESP through secure pathways.

In some aspects, disclosed herein is a method for reporting emergencies through an alternative communication pathway by an emergency assistance system (EAS), the method comprising: (a) receiving an indication of an emergency from a user on a social media network; (b) distilling the one or more web content on a social media network regarding the user into a data set associated with the emergency, wherein the data set comprises a current location of the one or more persons requiring emergency assistance; (c) determining an appropriate emergency service provider (ESP) based on the location of the emergency; (d) establishing an emergency communication session with the appropriate ESP and the user; and (e) providing access to the data set to the appropriate ESP with through an alternative communication pathway that is different from a standard communication pathway for reporting emergencies in the jurisdiction of the ESP. In some embodiments, the alternative communication pathway comprises an alternate phone line, an email address, a chat window, a social media post, or an emergency registry. In some embodiments, the alternative communication pathway comprises posting on social media with a specific tag. In some embodiments, the alternative communication pathway allows the user to report an emergency on behalf of the one or more persons requiring emergency assistance. In some embodiments, the alternative communication pathway provides access to the location of the one or more persons requiring emergency assistance directly with an emergency responder responding to the emergency. In some embodiments, the alternative communication pathway establishes an emergency communication session directly between the user and an emergency responder responding to the emergency. In some embodiments, the method comprises assessing strength of cellular connectivity of the user device. In some embodiments, the method comprises identifying alternate channels for reporting the emergency when the strength of the cellular connectivity is poor. In further embodiments, the alternate channels comprise Wi-fi connections, Blue-Tooth connections, shortwave radio connections, intermediate or routing devices, and other communication devices.

In some aspects, disclosed herein is a method for providing an alternative communication pathway for reporting emergencies by an emergency assistance system (EAS), the method comprising: (a) detecting one or more social media posts indicative of an emergency; (b) determining an affected area for the emergency based on the one or more social media posts; (c) identifying a user potentially located within the affected area; (d) transmitting an emergency response message to a communication device associated with the user; (e) receiving confirmation of the emergency response message; and (f) in response to receiving confirmation of the emergency response message, initiating an autonomous communication session with the user through the communication device. In some embodiments, the method further comprises: (a) extracting emergency information from the autonomous communication session; and (b) transmitting the emergency information to an ESP. In further embodiments, the emergency information comprises one or more messages received from the user through the autonomous communication session. In further embodiments, the method comprises extracting emergency information from the autonomous communication session comprises parsing messages submitted by the user through the autonomous communication session. In some embodiments, the method comprises: (a) receiving a location from the communication device; (b) confirming that the location is within the affected area; and (c) transmitting the emergency response message to the communication device in response to confirming that the location is within the affected area. In some embodiments, initiating the autonomous communication session with the user comprises transmitting one or more SMS text messages to the communication device. In further embodiments, the one or more SMS text messages are transmitted to the communication device according to an emergency flow script. In further embodiments, the method comprises adapting the emergency flow script during the autonomous communication session according to responses from the user. In some embodiments, the method comprises (a) wherein the emergency response message comprises a first SMS text message; and (b) wherein confirmation of the emergency response message comprises a second SMS text message received from the user in response to the first SMS text message. In some embodiments, the method comprises: (a) wherein the emergency response message comprises a push notification; and (b) wherein confirmation of the emergency response message comprises user selection of the push notification.

In some aspects, disclosed herein is an emergency assistance system (EAS) for providing an alternative communication pathway for reporting emergencies comprising one or more processors configured for: (a) detecting one or more social media posts indicative of an emergency; (b) determining an affected area for the emergency based on the one or more social media posts; (c) identifying a user potentially located within the affected area; (d) transmitting an emergency response message to a communication device associated with the user; (e) receiving confirmation of the emergency response message; and (f) in response to receiving confirmation of the emergency response message, initiating an autonomous communication session with the user through the communication device.

In some aspects, disclosed herein is a method for sending a request for emergency assistance by an emergency assistance system (EAS), by one or more processors, comprising: (a) detecting one or more web content published on a social media network by one or more users, said one or more web content comprising at least a term indicative of an emergency; (b) determining if the one or more web content constitute an emergency; (c) retrieving information associated with the emergency from a plurality of sources comprising the one or more web content; (d) distilling the information into a data set associated with the emergency, wherein the data set comprises a location of (i) the emergency or (ii) one or more persons requiring emergency assistance; (e) determining, by the one or more processors, an appropriate emergency service provider (ESP) for responding to the emergency; (f) providing access, by one or more processors, to the data set associated with the emergency to the appropriate ESP; and (g) establishing an emergency communication session, by the one or more processors, between the one or more persons and the appropriate ESP, thereby enabling the one or more persons to request emergency assistance. In some embodiments, the information further comprises emergency type, emergency status, identifying information about one or more persons requiring emergency assistance, medical information, contact information, social media activity, an image from the emergency, an audio from the emergency, a video feed from the emergency, location co-ordinates for the emergency, or any combination thereof. In further embodiments, the method comprises providing at least an updated information associated with the emergency, wherein the updated information comprises an updated web content published on a social media network, a change in emergency conditions, an emergency response status, an updated type of emergency, an updated status of emergency, an updated location of emergency, an updated identifying information about one or more persons requiring emergency assistance, an updated medical information, an updated contact information, an updated last social media activity, an updated images from the emergency, an updated audio from the emergency, an updated video feed from the emergency, an updated GPS co-ordinates from the emergency, or any combination thereof. In some embodiments, the method comprises providing updated location data of the one or more persons requiring the emergency assistance to the ESP. In some embodiments, the method comprises transmitting the emergency alert and the current location of the one or more persons requiring the emergency assistance to at least one volunteer responder. In some embodiments, the volunteer responders are selected based on a location of the emergency, a location of the volunteer responders, a type of emergency, skills and qualification of the volunteer responders from one or more databases, or any combination thereof. In some embodiments, the method comprises: distilling the information into additional data set comprising user data, sensor data, health data, and environmental data about the emergency. In some embodiments, the method comprises generating an additional data set comprising image(s), audio, video feed, or any combination thereof from the emergency location. In some embodiments, the additional data set further comprises a weblink, hyperlink or URL link containing information about the emergency to the ESPs. In further embodiments, the additional data set further comprises a weblink, hyperlink or URL link containing an emergency registry associated with the emergency to the ESPs. In some embodiments, the method comprises curating the data set for presenting on a display of a public-safety answering point (PSAP). In some embodiments, the method comprises curating and distilling the data set for display on a monitor of a public-safety answering point (PSAP) personnel, wherein the PSAP personnel is a call taker, a dispatcher, a manager, or a communication specialist. The comprising curating and distilling the data set for display on an emergency responder's device. In some embodiments, the method comprises curating and distilling the data set for display to a PSAP personnel. In some embodiments, the method comprises curating and distilling the data set as an emergency overlay on a map displayed to an emergency resource planner or emergency responder. In some embodiments, the one or more persons comprises a person, an animal or pet, an article, a house, an item, a device, a gadget, an entity, a vehicle, a watercraft or an aircraft. In some embodiments, the step of detecting in (a) comprises receiving an emergency request sent by a user through an emergency reporting user interface. In further embodiments, the emergency request is sent by a user upon a user interaction with one or more emergency or panic buttons on the social media user interface. In some embodiments, the step of determining in (b) comprises reviewing social media posts for hashtags or keywords indicative of the emergency. In some embodiments, the plurality of sources comprises an RSS feed of a web site, a third-party database, a news or weather site, a social networking site, a messaging site, a disaster management site, a government site, a maps or navigation site, a directory, a search site, or any combination thereof. In some embodiments, the keywords are selected from any or combination of "shooter", "fire", "flood", "gun", "violence", "help", "911", "112", "999", "000", "emergency", "protest", "punch", "assault", "heart attack", "medical", "broken", "explosion", "trapped", "sinking", "hurt", "pain", "suffering", "storm", "lighting", "gas", "attack", "poison", "lost", "fell", "fallen", "smashed", "mangled", "earthquake", "tsunami", "ambulance", "police", "EMT", "failure", "FEMA", and "disaster". In some embodiments, the step of detecting in (a) comprises identifying and removing duplicate requests for assistance associated with the emergency. In some embodiments, the step of detecting in (a) comprises evaluating a likelihood of an emergency by evaluating information associated with the one or more web content from the plurality of sources. In some embodiments, the likelihood is evaluated based on updated social media content based on pre-defined keywords indicative of a high likelihood of the emergency. In some embodiments, the step of detecting in (a) comprises crawling content sources comprising social networking sites, broadcasting sites, RSS feeds, geographical data, maps, news and weather sites, directories, or any combination thereof. In some embodiments, said ESP is selected based on the location of the emergency, type of emergency, and the available resources at said ESP. In some embodiments, the one or more web content are detected on an electronic device associated with the one or more users. In some embodiments, the one or more web content are posted by the one or more users, or forwarded by the one or more users. In some embodiments, the information associated with the emergency comprises photo(s), video feed, audio, latitude-longitude co-ordinates, physical address, chat message(s), SMS message(s), status update(s), or any combination thereof. In some embodiments, the data set is transmitted to the ESP if said one or more web content satisfies at least one criterion associated with the emergency, and wherein the at least one criterion comprises a verification of the emergency. In further embodiments, the at least one criterion comprises matching an IP address of one or more mobile device transmitting one or more emergency signals with the emergency received from said one or more users. In some embodiments, the method comprising evaluating an authenticity or veracity of said one or more web content. In some embodiments, the ESP is selected from one or more regional or national emergency resource coordinators that is a federal emergency management agency or state-wide or city-wide disaster management agency. In some embodiments, the EAS comprises one or more databases storing information relating to emergencies occurring as a result of a natural disaster. In some embodiments, a response status for the emergencies occurring is updated based on information from at least one source comprising social media updates, responder or dispatcher updates, or any combination thereof. In further embodiments, an acknowledgement gives the one or more users an option to connect, upon selection of the option, with a 911 authority serving the location of the emergency. In some embodiments, the method comprises detecting a mass emergency based on trending topics or hashtags, volume of social media content, severity of key word sentiment, or any combination thereof. In some embodiments, the method comprises determining one or more locations of the one or more users to determine an affected area of the emergency. In some embodiments, the method comprises determining that there is a mass emergency affecting a group of users within an affected area. In further embodiments, the method comprises dynamically updating the affected area of the emergency based on new social media posts related to the one or more web content published on the social media network. In further embodiments, the method comprises linking the one or more other users in the to the one or more web content published on said social media network. In some embodiments, the method comprises obtaining a phone number for a user of the one or more users and delivering an interactive call to said user enabling to connect with a 911 authority serving the emergency location. In some embodiments, the one or more web content are grouped together based on the location, a time of posting, a content of post, a hashtag, or any combination thereof. In some embodiments, the method comprises receiving a notification from said ESP that the emergency has been verified, and notifying, upon receipt of said notification, one or more other ESPs that said ESP is responding to the emergency. In some embodiments, the one or more other ESPs are determined based at least on the location or the type of emergency. In some embodiments, the method comprises generating an emergency registry for the emergency. In further embodiments, the method comprises delivering an accessible link to the emergency registry to at least one user of the one or more web content published on said social media network. In further embodiments, the method comprises generating a social media post including an accessible link to the emergency registry and delivering the social media post to at least one user of the one or more web content published on said social media network to share on social media. In some embodiments, the method comprises delivering the emergency registry to an emergency responder. In some embodiments, the step of determining that the one or more web content constitute an emergency in (b) initiates an emergency flow that notifies one or more emergency contacts, corporate representatives, or both.

In some aspects, disclosed herein is an emergency assistance system (EAS) configured to send a request for emergency assistance, the system comprising: (a) at least one processor, an operating system configured to perform executable instructions, a memory unit, and a computer program including instructions executable by the at least one processor to create an application comprising: (i) an emergency detection module configured to detect one or more web content published on a social media network by one or more users, said one or more web content comprising at least a term indicative of an emergency; (ii) an emergency determination module configured to determine if the one or more web content constitute an emergency; (iii) an information gathering module configured to retrieve information associated with the emergency from a plurality of sources comprising at least the one or more web content; (iv) a location determination module configured to obtain a location associated with the one or more persons requiring the emergency assistance from the information retrieved; (v) an ESP determining module configured to determine one or more appropriate emergency service providers (ESPs) comprising emergency dispatch centers (EDCs) and responders for responding to the emergency; and (vi) an emergency transmission module configured to transmit a request for the emergency assistance to the ESPs, wherein the request comprises a data set associated with the emergency.

In some aspects, disclosed herein is an access device comprising: (a) at least one processor, a memory, a network element, and a computer program including instructions executable by the at least one processor to create an emergency alert application comprising: (i) a social media monitoring module configured to detect one or more web content by a user, said one or more web content comprising at least a term indicative of an emergency; (ii) a location detection module configured to obtain current location data associated with the user requiring the emergency assistance from the information retrieved; and (iii) an emergency communication module configured to transmit an emergency alert comprising a data set associated with the emergency and the current location data to an emergency assistance system (EAS) for transmission to one or more appropriate recipients for requesting emergency assistance.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure, and wherein:

FIG. 6A depicts an exemplary screenshot of a processed emergency feed on an emergency service provider (ESP) display.

FIG. 7A illustrates a screenshot of an exemplary call-taking display at an EDC.

FIG. 10 illustrates an exemplary user interface for reporting an emergency through an alternate pathway and displaying the emergency data in ALI.

DETAILED DESCRIPTION OF THE INVENTION

Figure 1A:
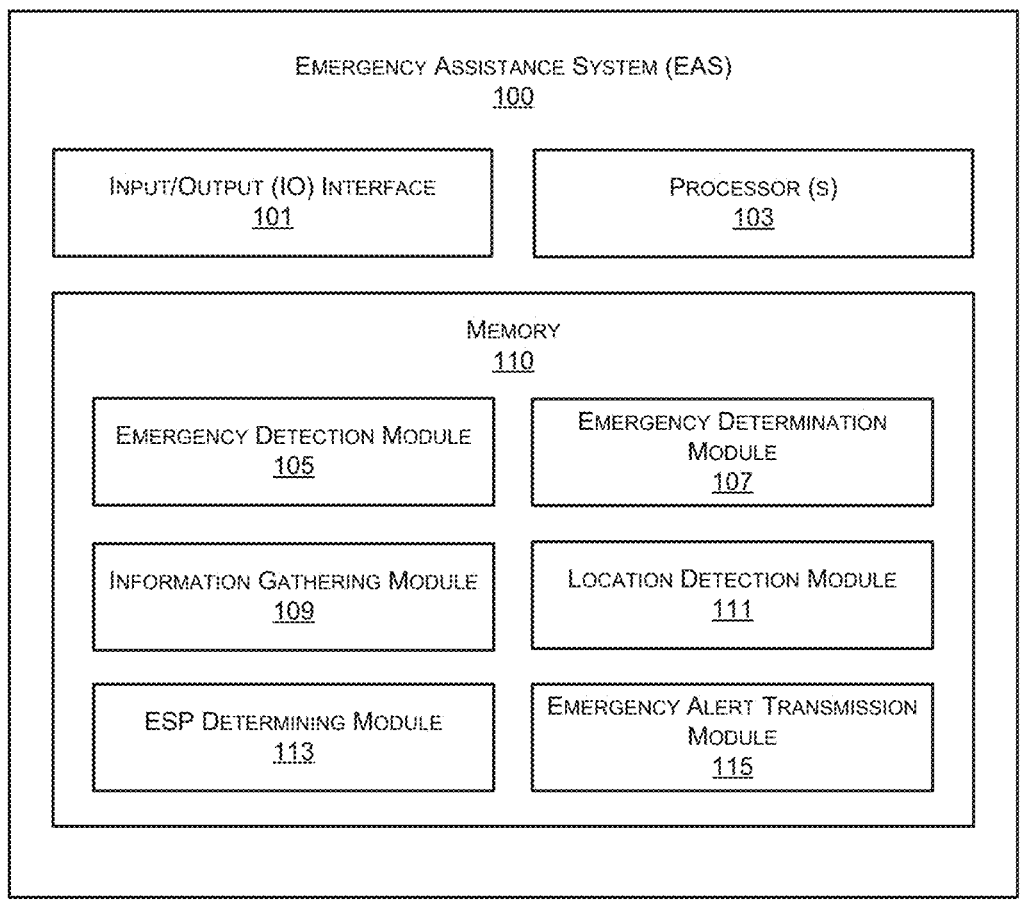
FIGS. 1A, 1B, 1C, and 1D illustrate exemplary components of the emergency assistance system (EAS), access devices, and ESP systems.

One advantage provided by the systems, servers, devices, methods, and media of the instant application is the ability to provide an alternative communication pathway to the emergency services for reporting emergencies. Traditionally, designated emergency numbers provide limited options for making a request for emergency assistance. Also, standard phone calls to emergency numbers are unable to share rich data (e.g., text, images, video) for responding to emergencies. The alternate communication pathway may be used for provisioning of emergency data from various sources such as social media networks for responding to emergencies into ALI or NG911 databases. In addition, the alternate communication pathway may establish an emergency communication session (emergency call or session) with an appropriate ESP for requesting emergency assistance.

Another advantage provided by the systems, servers, devices, methods, and media of the instant application is to detect emergencies reported on social media networks and generate emergency alerts that can be shared with appropriate ESPs. Currently, a user is not able to request emergency help by posting messages on social media networks. However, in some cases, emergency phone lines may be down or the user may be unable to make an emergency call, but able to post on social media. In such cases, it will be helpful to monitor social media networks for one or more web content with indications of an emergency. If there seems to be an emergency situation, an emergency alert can be sent to the appropriate ESP for sending emergency assistance.

Another advantage provided by the systems, servers, devices, methods, and media of the instant application is for providing an emergency feed in real time with information from social media networks and other data sources. In some embodiments, the emergency feed is provided within the geofence of the ESP to protect the privacy, security and integrity of the data.

Another advantage provided by the systems, servers, devices, methods, and media of the instant application is for providing an emergency feed in real time with information from social media networks and other data sources. In some embodiments, ESP users may select specific action items for the emergency such as "Cancel", "Duplicate", "Push to CAD", etc. In some embodiments, the emergency feed is processed to remove redundant entries. If several agencies are responding to large-scale emergency, the emergency feed can provide help with coordination and provide updates.

Another advantage provided by the systems, servers, devices, methods, and media of the instant application is for providing a way to proactively reach out to users who may be in the area of a mass emergencies. A large number of users in the affected area could be contact through social media networks and provided with an alternate communication pathway to report the emergency. Even if the caller is waiting to be connected, an automated messaging system can obtain get the user to input information (e.g., location, nature of emergency, etc.), which can be provided to the emergency call taker when he or she is available.

Another advantage provided by the systems, servers, devices, methods, and media of the instant application is for providing a means for creating an emergency registry. When there is a mass emergency, the standard emergency lines may not be available and there may be significant concern by family and friends about their loved ones who may be in an emergency. An emergency register for that emergency and access provided to various agencies and volunteers involved with relief efforts. In addition to allowing relief agencies keep track of people in the emergency, individuals may be able to find out the status of their loved ones through the registry. Differential access to information may be provided taking into consideration privacy and security considerations.

In some aspect, disclosed herein are electronic devices for carrying out one or more methods described herein. Electronic devices include modern communication devices such as smart phones, tablet computers, wearable communication devices, and smart sensor devices and/or systems. In some embodiments, communication devices are equipped with a variety of features for determining location information of the communication device using, for example, GPS, or triangulation with cellular phone towers. In some embodiments, communication devices comprise memory and/or storage to store data regarding a user of the communication device, for example, health information about the user. In some embodiments, a communication device comprises location services for determining a location of the device. In some embodiments, the communication device comprises a Wi-Fi communication module configured to communicate with one or more nearby Wi-Fi access points. In some embodiments, the communication device comprises a Bluetooth communication module configured to initiate a Bluetooth communication session when one or more nearby Bluetooth beacons is detected. In some embodiments, the communication device comprises a cell tower communication module configured to communicate with one or more cell towers. In some embodiments, the communication device utilizes hybrid device-based location services for determining a location of the device. In some embodiments, the communication device determines location using triangulation and/or received signal strength with at least one cell tower, Wi-Fi access point, Bluetooth beacon, or a combination thereof.

Various terms as used herein are shown below. To the extent a term used is not defined below, it should be given the broadest definition persons in the pertinent art have given that term as reflected in printed publications and issued patents at the time of filing.

The present disclosure relates generally to public safety, and in some embodiments, relates to managing, distributing, and validating emergency alert messages via social media.

In some embodiments, the Emergency Alert System ("EAS") is capable of providing messages indicative of a variety of types of emergency alerts or requests for emergency assistance (e.g. fire, medical, flooding, earthquake, etc.). It is contemplated subscribers or users of the EAS may receive messages pertaining to weather conditions, disasters, AMBER (America's Missing: Broadcast Emergency Response) alerts, and/or alerts issued by the Government, for example. To receive EAS messages, typically, a subscriber registers with a communications network via a mobile switching center (MSC). In some embodiments, a MSC performs functions such as registration, authentication, location updating, handovers, call routing, or any combination thereof. In some embodiments, the EAS is used for sending a request for emergency assistance to an appropriate emergency dispatch center (e.g. a PSAP). In some embodiments, user-generated social media posts containing an emergency indication are detected, and are optionally used to send an emergency alert. In some embodiments, the emergency alert is saved in an emergency registry associated with an emergency. In some embodiments, one or more other users request emergency assistance on behalf of the person in the emergency, optionally via social media.

In some embodiments, the EAS implements an automated process (e.g., using machine-learning algorithms) crawling or scraping social media looking for users in distress and/or obtaining relevant information & directing the information to appropriate dispatch centers. In some embodiments, a curated and distilled feed is provided to PSAP dispatchers (on a side monitor), as a part of the call-taking display (e.g. a social media tab), on a mapping interface (e.g. dispatch manager or common areas of the PSAP), or for emergency responders. In some embodiments, the EAS provides a user interface for users to report emergencies and/or make a proxy emergency call on behalf of the person in the emergency. In some embodiments, the user reporting the emergency is a corporate representative of the social media company. In some embodiments, emergencies detected on social media websites, reported through user interface and other methods are consolidated in an emergency for coordinating the emergency response.

In some embodiments, emergencies are detected by non-traditional media reports (such as social media, blogs, user forums, etc.). For example, the EAS detects indicators of an emergency in the content of the media such as, for example, the use of the key words referenced above in email traffic or detecting makeshift signs, white flags, online markers or other physical or electronic indications that an emergency has occurred.

In some embodiments, crowd-sourced information is used for early detection and monitoring of an on-going emergency. The rationale is that leveraging information from a diversity of sources may yield reliable and quick information. For example, users may indicate that some sort of an emergency has occurred (e.g. via Waze or posting to an online, mobile, or physical message board). Then, the EAS can use statistical indications through applications or services able to track location of individuals detect rapid movement of many people in unison (e.g. away from an explosion or active shooter event). In some embodiments, the EAS proactively requests users in a region around a known emergency to provide information about the emergency via an online form, a mobile app, email, phone call, wireless emergency alert, text messages, or other communication.

In some embodiments, the EMS monitors indirect indications of an emergency. During disasters, information flow often becomes limited due to infrastructure damage, loss of power, and congested communication channels, and emergency management personnel often have challenges understanding the specific conditions in a given region of an emergency (for example—it took time for emergency management personnel to identify all the areas of need in the Hurricane Katrina flooding). Accordingly, in some embodiments, detection of a spike in cellular traffic is treated as an indicator of an emergency. In some embodiments, the EAS monitors flows of certain goods (e.g., bottled water, electric generators, etc.). In some embodiments, the EAS monitors cell phone traffic—spikes in phone traffic (data, calls, texts) in a given region often will indicate that an emergency has occurred. In some embodiments, the EAS monitors traffic to websites likely to be associated with an emergency (e.g., during many emergencies people turn to news to try to learn more—sometimes the volume of traffic on these sites and the location of the IP addresses associated with that traffic could indicate that an emergency has occurred and provide information about the location of the emergency).

In some embodiments, the EAS determines the significance of the emergency that has been detected. In some embodiments, the significance of the emergency is based on indications such as the rate of change of the data, the trust factor of the user of certain key indicators, whether the data meets certain criteria (e.g. spike in cell phone traffic and increase use of word "shooter" in text messages or social media posts), geographic relationship of the posts, awareness of certain environmental conditions (e.g. hurricane is hitting New Orleans—social media post in area known to flood with word "trapped"), etc.

In some embodiments, the EAS packages (e.g. curation, distillation) the data and provides it to the ESPs. In some embodiments, the EAS determines a relevant geographic region impacted by the emergency and the appropriate emergency response data recipient of the emergency data (e.g. a PSAP, police operations center, FEMA, etc.). In some embodiments, the data is formatted in a way that is compatible with existing public safety systems (e.g. in the ALI format for an E911 call) or in a given format for an NG911 environment. In some embodiments, the data is presented in an easy to understand format. In some embodiments, the data is converted to text format and provided to ESPs.

In some embodiments, the EAS employs one or more machine learning algorithms to detect web content from social media websites for indications of an emergency. In some embodiments, trending hashtags or key terms are processed to understand signs that an emergency might be occurring—for example use of Facebook's safety check for users in an area at the same time as a general spurt of social media activity (posting) might be a sign that an emergency is occurring. In this way, early detection of emergencies can allow for emergency management.

In some embodiments, the EAS seeks out and engages with users in an impacted region. In some embodiments, EAS proactively reaches out to users in proximity to an emergency (geography, familial proximity, friendship proximity, etc.) to provide information about the emergency (e.g. videos, descriptions, recording, images, text, etc.). In some embodiments, the EAS seeks out and engages with users in an impacted region by initiating contact such as by sending a communication (e.g., automated phone call, text message, email, social media message or post, etc.).

FIG. 1A illustrates exemplary functional modules of the proposed emergency assistance system (EAS) 100, in accordance with an exemplary embodiment of the present disclosure. In one embodiment, the proposed emergency assistance system (EAS) 100 comprises at least one of an input/output (I/O) interface 101, processor(s) 103, and a memory 110.

Figure 1B:
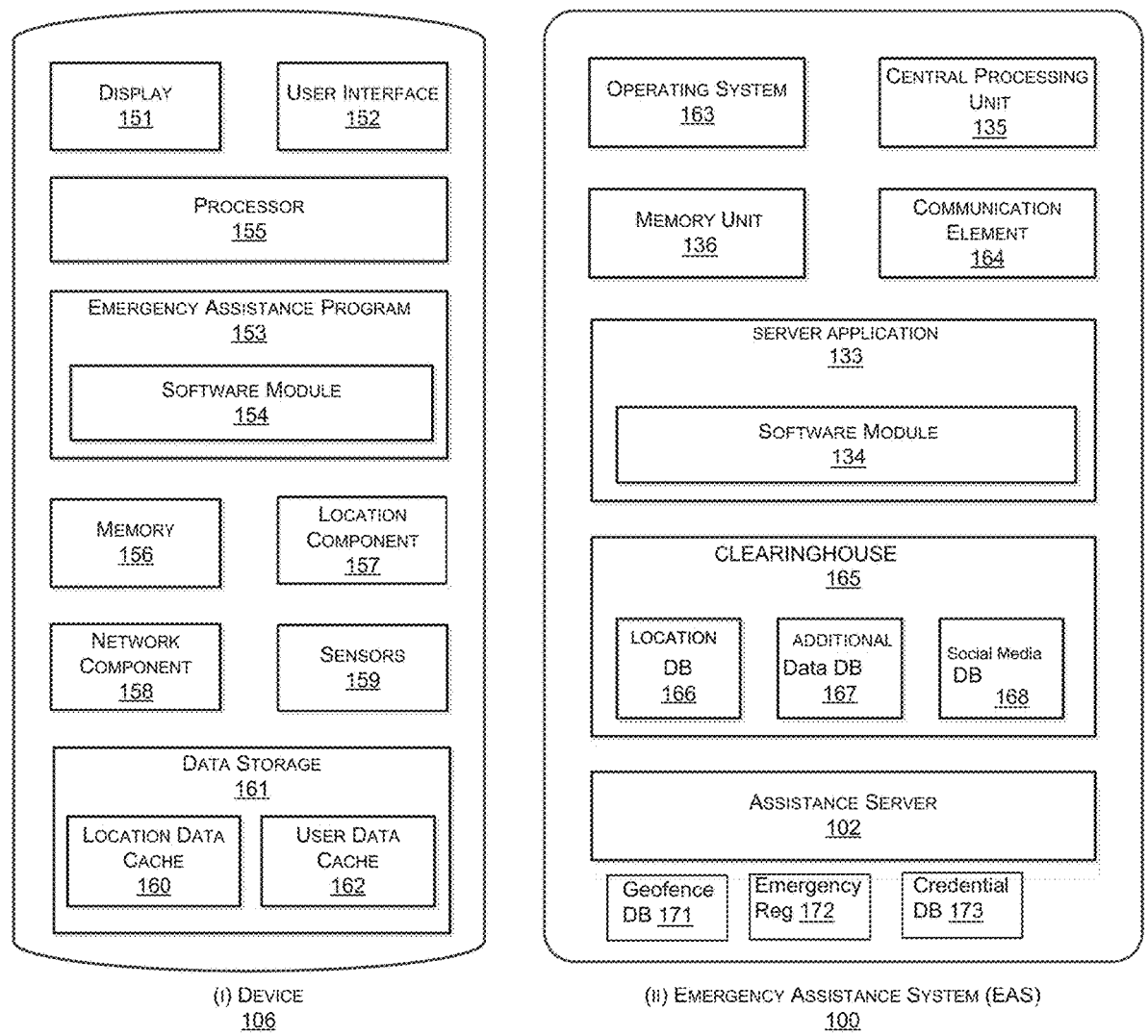

In some embodiments, the I/O interface 101 includes a variety of software and hardware interfaces, for example, a web interface, a graphical user interface, and the like. In some embodiments, the I/O interface 101 allows the emergency assistance system (EAS) 100 to interact with a user directly or through the access devices 106 (FIG. 1B). Further, in some embodiments, the I/O interface 101 enables the emergency assistance system (EAS) 100 to communicate with other computing devices, such as web servers and external data servers (not shown). In some embodiments, the I/O interface 101 facilitates multiple communications within a wide variety of networks and protocol types, including wired networks, for example, LAN, cable, etc., and wireless networks, such as WLAN, cellular, or satellite. In some embodiments, the I/O interface 101 includes one or more ports for connecting a number of devices to one another or to another server.

In some embodiments, the at least one processor 103 is implemented as one or more microprocessors, microcomputers, microcontrollers, digital signal processors, central processing units, state machines, logic circuitries, and/or any devices that manipulate signals based on operational instructions. Among other capabilities, the at least one processor 103 is configured to fetch and execute computer-readable instructions stored in the memory 110.

In some embodiments, the memory 110 includes any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In some embodiments, the memory 110 comprises modules, routines, programs, objects, components, data structures, etc., which perform particular tasks or implement particular abstract data types. In one implementation, the memory 110 includes an emergency detection module 105, an emergency determination module 107, an information gathering module 109, a location determination module 111, an ESP determining module 113, an emergency communication transmission module 115, or any combination thereof.

In an exemplary embodiment, the emergency assistance system (EAS) 100 for sending a request for emergency assistance comprises at least one processor 103, an operating system configured to perform executable instructions, a memory 110 unit, and a computer program including instructions executable by the at least one processor 103 to create an application. The computer program can include the emergency detection module 105 to detect one or more web content, having at least a term indicative of an emergency, published on a social media network by one or more users, the emergency determination module 107 to determine if the one or more web content constitute an emergency, the information gathering module 109 to retrieve information associated with the emergency from a plurality of sources having at least the one or more web content, the location detection module 111 to obtain current location data associated with the one or more persons requiring the emergency assistance from the information retrieved, the ESP determining module 113 to determine one or more appropriate emergency service providers (ESPs) comprising emergency dispatch centers (EDCs) and responders for responding to the emergency, and the emergency alert transmission module 115 to establish an emergency communication session between the person requiring assistance and the appropriate ESP.

FIG. 1B illustrates components of one embodiment of the access device 106 (see (i)) and the Emergency Assistance System 100 (see (ii)) in accordance with an exemplary embodiment of the present disclosure. In some embodiments, the access device 106 comprises an input/output (I/O) interface 152, processor(s) 155, and a memory 156.

In some embodiments, the user interface 152 comprises one or more software and/or hardware interfaces, for example, a web interface, a graphical user interface, and the like. In some embodiments, the user interface 152 allows the access device 106 to interact with a user directly or through any mobile application installed in the device 106. Further, the user interface 152 may enable the access device 106 to communicate with other computing devices, such as web servers and external data servers (not shown). In some embodiments, the user interface 152 facilitates multiple communications within a wide variety of networks and protocol types, including wired networks, for example, LAN, cable, etc., and wireless networks, such as WLAN, cellular, or satellite. In some embodiments, the user interface 152 comprises one or more ports for connecting a number of devices to one another or to another server.

In some embodiments, the at least one processor 155 is implemented as one or more microprocessors, microcomputers, microcontrollers, digital signal processors, central processing units, state machines, logic circuitries, and/or any devices that manipulate signals based on operational instructions. Among other capabilities, the at least one processor 155 is configured to fetch and execute computer-readable instructions stored in the memory 156.

In some embodiments, the memory 156 comprises a computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In some embodiments, the memory 156 comprises at least one of modules, routines, programs, objects, components, data structures, etc., which perform particular tasks or implement particular abstract data types. In one implementation, the memory 156 comprises a social media monitoring module 130, a location detection module 127, and an emergency communication module 129.

In an exemplary embodiment, the access device 106 having at least one processor 155, a memory 156, a network component 158 (e.g., Wi-fi), a location component 157 (e.g., GPS, sensors 159 (including a web-cam and microphone) and an computer program including instructions executable by the at least one processor to create an emergency assistance program 153 (with at least one software module 154).

FIG. 1B also shows a schematic diagram of one embodiment of an emergency assistance system 100 as described herein. In some embodiments, the emergency assistance system 100 comprises one or more of an operating system 163, at least one central processing unit or processor 135, a memory unit 136, a communication element 164, and a server application 133 comprising at least one software module 134. In some embodiments, the emergency assistance system 100 comprises an emergency clearinghouse 165 with one or more databases for storing emergency data (e.g., location database 166, addition data database 167, and social media database 168). In some embodiments, the emergency assistance system 100 comprises a geofence database 171 for provisioning geofences for various ESPs, emergency registry database 172 for storing information regarding one or more emergency registries, and a credentialing database 173 (not shown) for storing credentials for various users of the EAS and/or emergency clearinghouse 165.

Figure 1C:
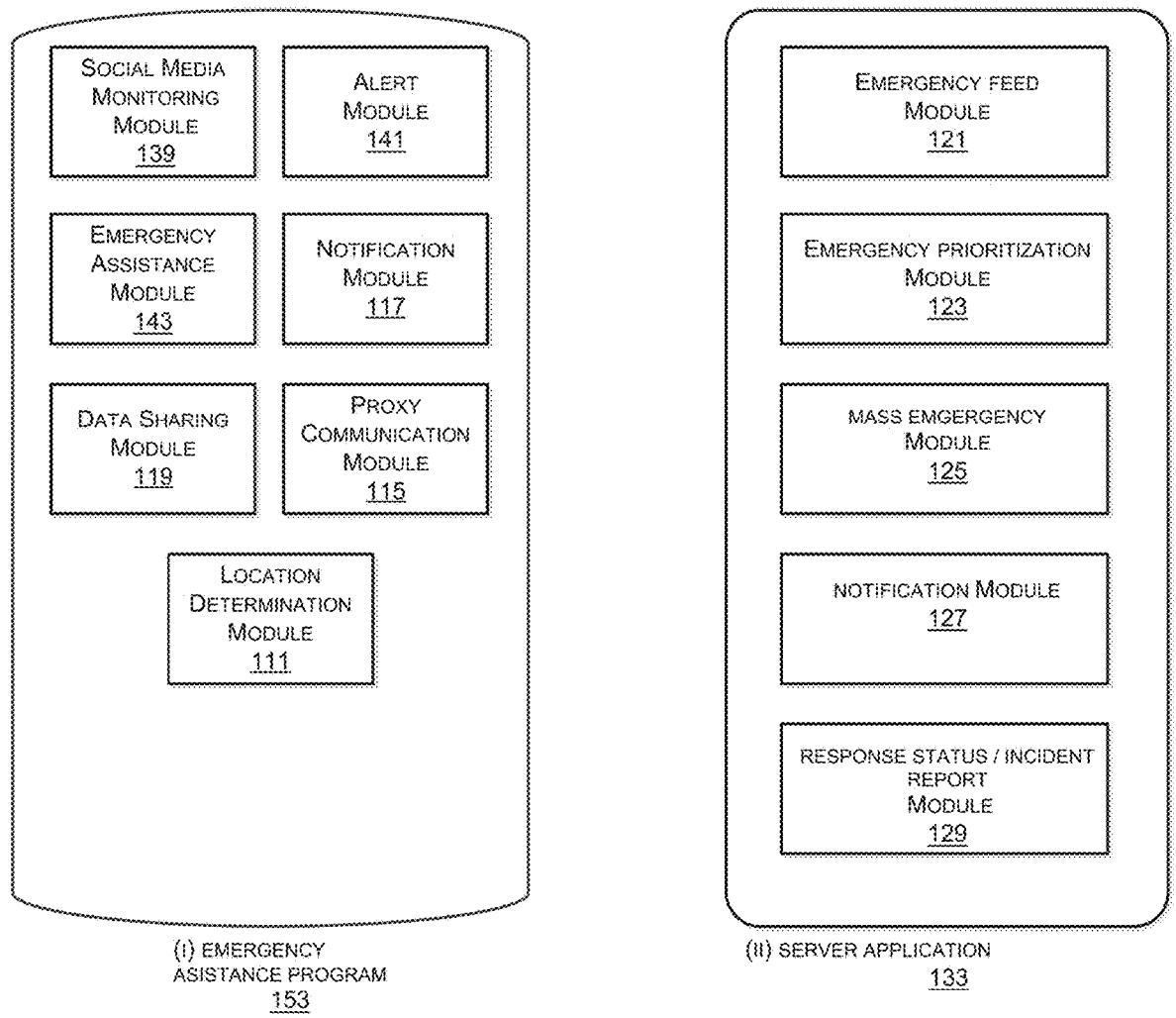

FIG. 1C(i) shows a schematic diagram of one embodiment of an emergency assistance program 153 installed on an access device 106. The emergency assistance program 153 may include the social media monitoring module 139 to detect one or more web content including an emergency indication, a location determination module 111 configured to obtain current location data from the device 106 (e.g., from "location services"); the emergency assistance module 143 for interacting with the EAS for providing one or more alternate communication pathways for reporting emergencies (e.g. a walkie-talkie app); an alert module 141 configured to transmit an emergency alert comprising a data set associated with the emergency to an emergency assistance system (EAS); the data sharing module 119 for sharing location data or other data to the EAS, emergency contacts, emergency responders and others; and the proxy communication module 115 for making emergency call or session on behalf of another person in need of emergency assistance.

In some embodiments, the alert module 141 may be used to transmit device-based location data (e.g. GPS, location services based location, etc.), sensor data (e.g. user heart-rate data) periodically with the EAS (or through the EMS).

FIG. 1C(ii) shows a schematic diagram of one embodiment of an server application 133 installed on an EAS 100 (which may be housed in an emergency management system (EMS), not shown). In some embodiments, the server application 133 comprises one or more software modules 134 selected from a processed emergency feed module 121 for generating and displaying the processed emergency feed, an emergency prioritization module 123 for prioritization of the emergencies, a response status & incident report module 129 to keep track of the response status of emergencies and create incident reports, a mass emergency module 125 to detect mass emergencies and an affected area, a notification module 127 to detect potential users who may be affected by a mass emergency and providing a panic button for connecting to emergency services, or any combination thereof.

Figure 1D:
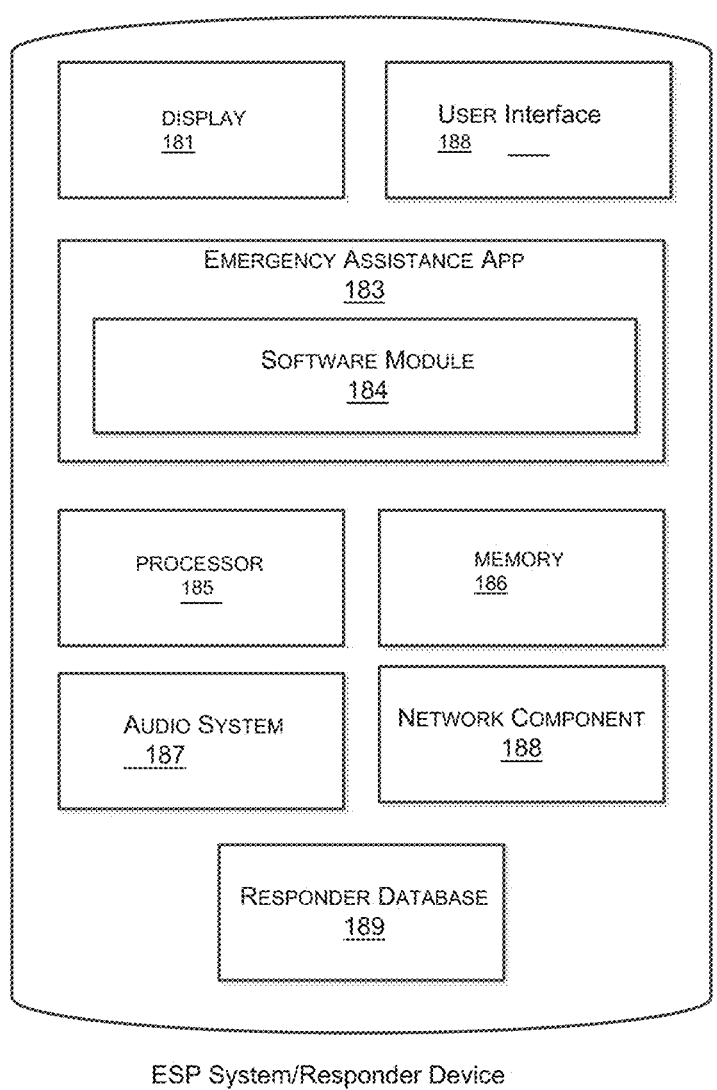

FIG. 1D shows a schematic diagram of one embodiment of an ESP system 180, e.g., a Public Safety Answering Point (PSAP) system, as described herein. In some embodiments, the ESP system 180 comprises one or more of display 181, a user interface 182, at least one central processing unit or processor 185, a memory unit 186, a network component 188, an audio system 187 (e.g. microphone, speaker and/or a call-taking headset) and a computer program such as a ESP Emergency Assistance Application 183. In some embodiments, the PSAP application 183 comprises one or more software modules 184. Although not shown, the ESP system 180 may comprise a call-taking display module 186a, a mapping module 186b, an update module 186c, a mass emergency module 186d, a responders module 186e (e.g. medical assets, police assets, fire response assets, rescue assets, safety assets, an emergency search module, a response status module, a weblink module or any combination thereof.

Figure 3:
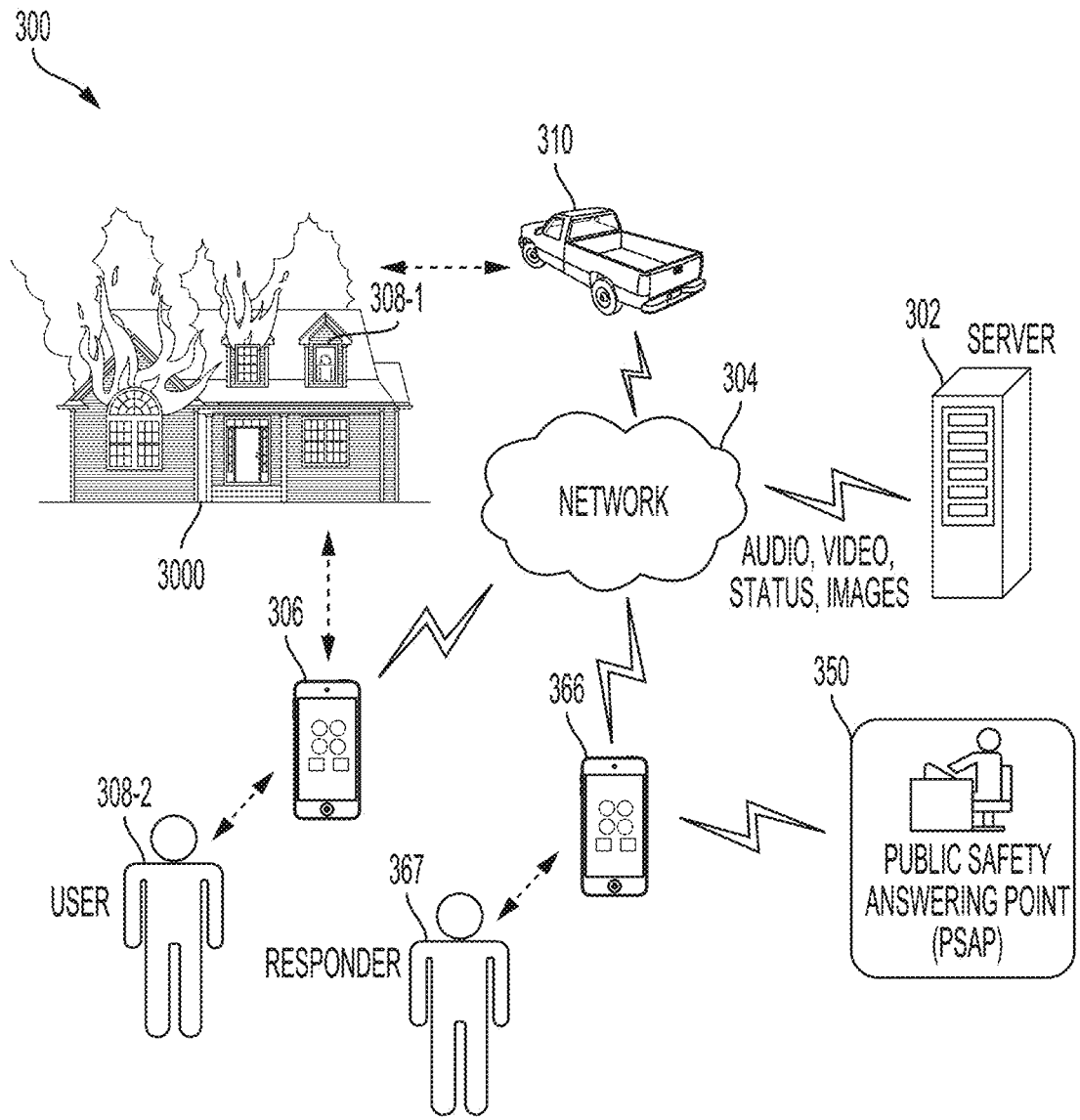
FIG. 3 illustrates an exemplary implementation of the proposed emergency assistance system (EAS).

FIG. 3 illustrate an embodiment of proxy calling where a user (308-2 and/or 310), sends an emergency alert on behalf of a person 308-1 in an emergency (house 3000 on fire). Specifically, user 308-2 may use access device 306 for making a proxy emergency call. In some embodiments, the user 308-1 have authorized the second device 306 to share his or her location with the user 308-2 (e.g. a spouse). In some embodiments, user 308-1 and 308-2, are in a group of family and/or friends who have joined their devices to a group of devices and authorized sharing their location data with each other. In some embodiments, the location of the person 308-1 is obtained based on information in various sources (e.g. location data associated with social media posts, registration address of the house 300).

In some embodiments, the access device 106 includes a computer program 153, such as, for example, a software application 154 as shown in FIG. 1B. In some embodiments, a user (not shown) interacts with the access device 106 using the user interface 152 (e.g., soft keys on a touch screen, press or tap buttons on the front or sides of the device 106). In some embodiments, user and device 106 are located in "zone X", which is a geographical area that is within the jurisdiction of an EDC (not shown), such as a Public Safety Answering Point (PSAP).

It is contemplated that a responder device (e.g. 366 in FIG. 3) such as wireless mobile phone, a radio, a walkie talkie, a vehicle unit, etc. may have components similar to the other access device as shown in FIG. 1B such as display, user interface, processor, memory, location component, network component, data storage, emergency assistance application including software modules. In some embodiments, the application on the responder devices may be similar to application 1833 including a mapping module, an emergency search module, an update module, a response status module, a weblink module or any combination thereof.

Figure 2:
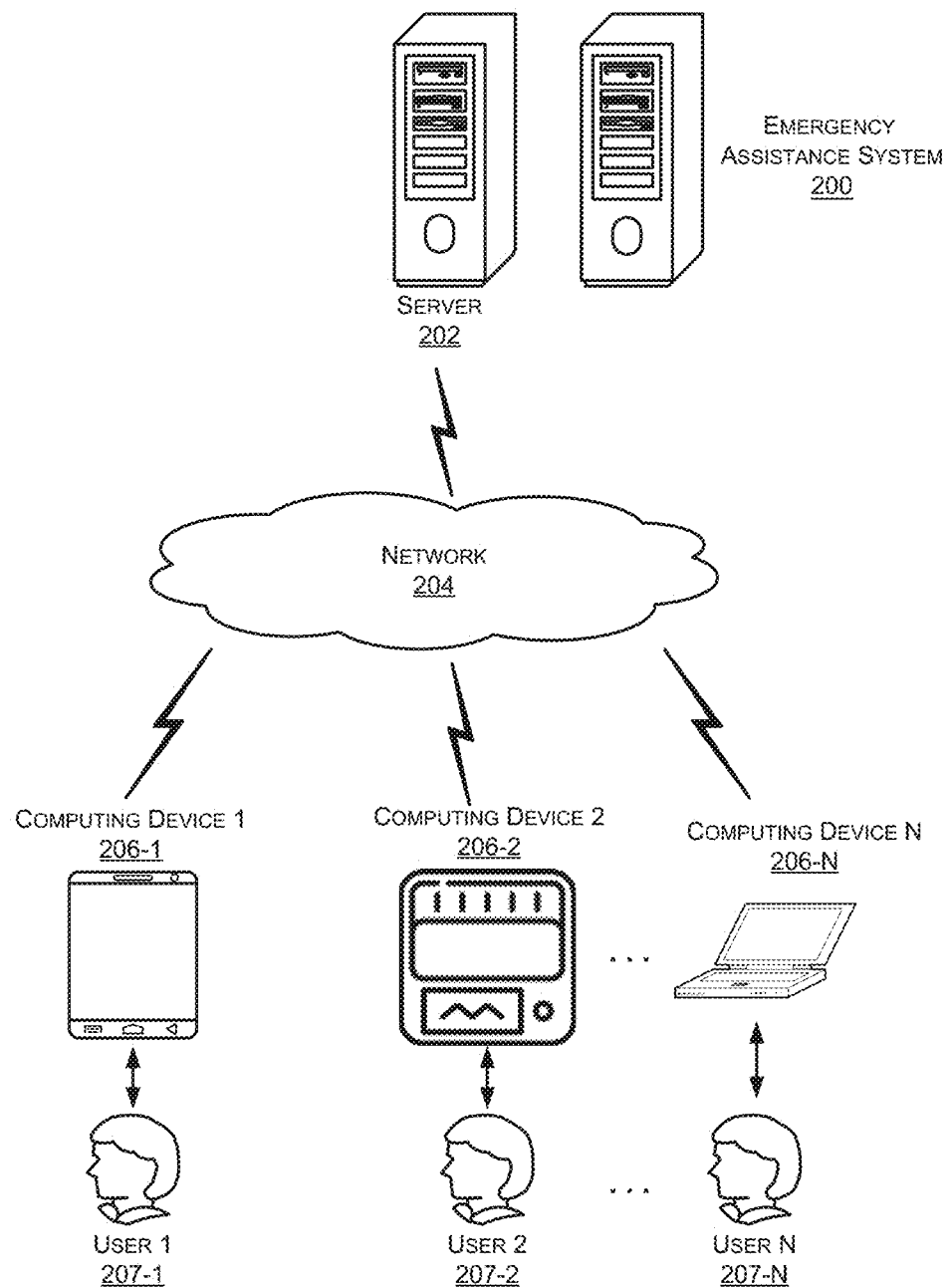
FIG. 2 illustrates how the emergency assistance system (EAS) is accessed by various users.

FIG. 2 illustrates a network implementation of an embodiments of the emergency assistance system (EAS) 200. It would be appreciated that aspects of the present disclosure can be applied to a variety of network architectures within the scope of the present disclosure.

In an aspect, the network architecture of the present disclosure comprises an emergency assistance system (EAS) connected with one or more communication devices (e.g., wireless mobile phones, computers, vehicular consoles, smart home devices, digital assistants, smart speakers, Internet of Things (IoT) devices. In an exemplary embodiment, the network architecture of the present disclosure comprises a plurality of auxiliary or intermediary network devices such as wireless routers, wireless mobile phones, etc., that as access devices for the Network 204 (e.g. the Internet).

In some embodiments, a user (e.g., 207-1, 207-2, . . . 207-N) communicates with the network devices using access device(s) (e.g., 206-1, 206-2, . . . 206-N) that optionally includes a human-to-machine interface with network connection capability that allows access to a network. For example, the access device may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, the access device may include a cellular or other broadband network transceiver radio or interface and may be configured to communicate with a cellular or other broadband network using the cellular or broadband network transceiver radio. In some embodiments, the access device may not include a cellular network transceiver radio or interface.

Users may interact with the network devices using an application, a web browser, a proprietary program, or any other program executed and operated by the access device. In some embodiments, the access device communicates directly with the network devices (e.g., communication signal). For example, the access device may communicate directly with network devices using Zigbee™ signals, Bluetooth™ signals, WiFi™ signals, infrared (IR) signals, UWB signals, WiFi-Direct signals, BLE signals, sound frequency signals, or the like. In some embodiments, the access device communicates with the network devices via the gateways and/or a cloud network.

Local area network may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, Ethernet, powerline, Ethernet over coaxial cable, digital signal line (DSL), or the like). The wired and/or wireless networks may be implemented using various routers, access points, bridges, gateways, or the like, to connect devices in the local area network. For example, the local area network may include at least one gateway. In some embodiments, a gateway provides communication capabilities to network devices and/or access device via radio signals in order to provide communication, location, and/or other services to the devices. In some embodiments, the gateway is directly connected to the external network and provides other gateways and devices in the local area network with access to the external network. The gateway may be designated as a primary gateway.

The network access provided by a gateway may be of any type of network familiar to those skilled in the art that can support data communications using any of a variety of commercially-available protocols. For example, gateways may provide wireless communication capabilities for the local area network using particular communications protocols, such as WiFi™ (e.g., IEEE 802.11 family standards, or other wireless communication technologies, or any combination thereof). Using the communications protocol(s), the gateways may provide radio frequencies on which wireless enabled devices in the local area network can communicate. A gateway may also be referred to as a base station, an access point, Node B, Evolved Node B (eNodeB), access point base station, a Femtocell, home base station, home Node B, home eNodeB, or the like.

Gateways may include a router, a modem, a range extending device, and/or any other device that provides network access among one or more computing devices and/or external networks. For example, gateway may include a router or access point or a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy and may direct the packet to the next network or device in the transmission path of the packet. The data packet may be forwarded from one gateway to another through the computer networks until the packet is received at the intended destination.

In some embodiments, FIG. 2 indicates a network implementation of the emergency assistance system (EAS) 200. Although the present subject contemplates that the emergency assistance system (EAS) 200 is implemented as an application on a server 202, it may be understood that the emergency assistance system (EAS) 200 may also be implemented in a variety of computing systems, such as a laptop computer, a desktop computer, a notebook, a workstation, a server, a network server, a cloud-based environment and the like. It would be appreciated that the emergency assistance system (EAS) 100 may be accessed by multiple users 207-1, 207-2 . . . 207-N (collectively referred to as users 207, and individually referred to as the user 207 hereinafter), through one or more computing devices 206-1, 206-2 . . . 206-N (collectively referred to as computing devices 206 hereinafter), or applications residing on the computing devices 206. In an aspect, the emergency assistance system (EAS) 100 can be operatively coupled to a website and so be operable from any Internet enabled computing device 206. Examples of the computing devices 206 include, but are not limited to, a portable computer, a personal digital assistant, a handheld device, and a workstation. The computing devices 206 are communicatively coupled to the emergency assistance system (EAS) 100 through a network 204.

In one implementation, the network 204 is a wireless network, a wired network or a combination thereof. The network 204 can be implemented as one of the different types of networks, such as intranet, local area network (LAN), wide area network (WAN), the internet, and the like. Further, the network 204 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 204 can include a variety of network devices, including routers, bridges, servers, computing devices, storage devices, and the like.

FIG. 3 illustrates an exemplary implementation of the emergency assistance system (EAS), in accordance with an exemplary embodiment of the present disclosure. In some embodiments, as shown in FIG. 3, a house 3000 is on fire and has one person 308-1 seeking emergency assistance from one or more emergency service providers (ESPs) such as but not limited to fire brigade services, medical emergency services and the like.

A user 308-2 having an access device 306 (e.g. a phone) or a user driving a car 310 (e.g. a smart car having communication capabilities) passing by the locality notices the fire posts a message about the emergency on a social media website (such as but not limited to Facebook, Twitter, Google Plus, YouTube, Spoke, NextDoor, Snap, LinkedIn, etc.) via the internet 304.

In some embodiments, a server 302 housing the EAS (not shown) is configured to detect one or more web content with a at least a term indicative of an emergency published on a social media network by users. The user 308-2 may also share the hashtags having a word or phrase (also referred to as a "keyword") preceded by a hash sign (#), where the keyword is indicative of an emergency. In some embodiments, the keywords may be used in the body of the message and detected by the EAS as indicative of an emergency. The keywords may be selected from any or combination of "shooter", "fire", "flood", "gun", "violence", "help", "911", "112", "999", "000", "emergency", "protest", "punch", "assault", "heart attack", "medical", "broken", "explosion", "trapped", "sinking", "hurt", "pain", "suffering", "storm", "lighting", "gas", "attack", "poison", "lost", "fell", "fallen", "smashed", "mangled", "earthquake", "tsunami", "ambulance", "police", "EMT", "failure", "FEMA", and "disaster". For example, the user 308-2 may have posted a message: "Saw a house on fire on 29$^{th}$ Street. Emergency! #911."

In some embodiments, user 308-2 includes or updates the social media post by sharing images, audio files, video feed from the emergency. For example, user 308-2 may post an image or video of the house on fire. The EAS may include such an image or video or a link to the same in the processed emergency feed for the PSAP (see FIG. 6A) and/or for responder devices. The EAS will determine if the one or more web content constitute an emergency by analyzing the emergency data including the social media post, other posts, etc., using natural language processing or other machine-learning techniques.

In some embodiments, the EAS retrieves information associated with the emergency from a plurality of sources comprising the one or more web content. Data sources provide a number of information sources whereby posts may be found. Data sources may be social media websites or networks, including but not limited to, Facebook, Twitter, Google Plus, YouTube, Spoke and LinkedIn. Additional data sources include, but are not limited to RSS feeds, blogs, comments on websites and websites themselves. In some embodiments, the server 302 monitor's data sources for terms and/or phrases in accord with rules to detect one or more web content published on a social media network by one or more users having are at least a term indicative of an emergency.

In an exemplary embodiment, the data sources are at least one of a social media network, news outlet website, government or non-governmental agency website, educational institution, corporation, individual or other source of information.

In some embodiments, the server 302 retrieves web content with indication of emergency from data sources and determines if the one or more web content constitute an emergency. In an exemplary implementation, to determine if the one or more web content constitute an emergency, a rules database may be used that provides instructions as to what posts to consider based on, but not limited to, keywords, source of the post, phrases, geographic location, time/date or other information, and known or suspected identity of the user. In another embodiment, rules may incorporate one or more secondary sources of information including, but not limited to, sources of weather, satellite, seismic, wave/tsunami, civil disturbances, traffic and utility data. In an exemplary embodiment, the information retrieved and identified form different data sources are distilled into a data set associated with the emergency. In some embodiments, the data set comprises a (i) location of the emergency or (ii) one or more persons requiring emergency assistance. In some embodiments, the data set comprises a current location of the one or more persons requiring emergency assistance, the type or nature of the emergency, user identifier (phone number, email addresses, social media usernames or handles, login IDs, physical addresses, x-y coordinates, IP address BSSID, SSID or MAC address, etc.) and additional data. In some embodiments, the emergency data set comprising user data, sensor data, health data, and environmental data about the emergency. In some embodiments, the EAS generates an additional data set comprising image(s), audio, video feed, or any combination thereof from the emergency location. In some embodiments, the EAS generates an additional data set comprises a weblink to image(s), audio, video feed, or any combination thereof.

The server 302 upon formation of data set can determine one or more appropriate emergency service providers (ESPs) for providing the emergency assistance. In an example, the ESPs can include emergency dispatch centers (EDCs) 350 and responders 367 for providing the emergency assistance. In some embodiments, the location, type and severity of the emergency may determine the appropriate ESP. The ESPs can include private or public emergency dispatch centers (EDCs), such as a PSAP and emergency responders 367 for providing the emergency assistance.

In some embodiments, the EAS provides access to the data set associated with the emergency to the appropriate ESP. The emergency data may be provisioned available through ALI, NENA, EENA or NG911 databases to credentialed ESPs. Finally, in some embodiments, the ESP establishes an emergency communication session (e.g. a chat session, an emergency call, etc.) between the person in the emergency (here, 308-1) and the appropriate ESP for the purpose of requesting emergency assistance. In some cases, the EAS or EMS establishes and maintains the emergency communication session.

In one aspect, the EAS provides access to emergency data. In some aspects, the EAS receives one or more web content published on a social media network with an emergency indication. The EAS may distil the information into an emergency data set associated with the emergency indication. In some embodiments, the emergency data set includes a user identifier (e.g., a user handle and a social media network name) and a current location of a person requiring emergency assistance. In some embodiments, the EAS (or the EMS) may receive a query or a data request from an emergency service provider (ESP). In some embodiments, the data request may include one or more credentials and/or access tokens. The EAS may check the validity of the credentials before providing a response to the data request. In some embodiments, the EAS transmits relevant return data to the ESP through secure pathways. In some cases, the return data is that there is no location found if there is no current location. In some embodiments, the ESP is a public safety answering point (PSAP) that has received an emergency call for reporting emergency assistance. In some embodiments, the emergency data set is provisioned in one or more clearinghouse databases and accessible using the user identifier (see description in FIG. 4A). In some embodiments, the emergency data that was gathered from the one or more web content is provisioned using the user identifier. In some embodiments, the emergency data is made available through ALI, NENA, EENA or NG911 databases.

In some embodiments, when the emergency indication of emergency is detected, an emergency flow is initiated comprising contacting one or more emergency contacts and/or corporate representatives. In some embodiments, the EAS connects the reporting user to an ESP through an emergency communication session to facilitate provisioning of emergency assistance. In some embodiments, the EAS or EMS connects two or more users to an ESP in a three-way conference bridge for the purpose of requesting emergency assistance. In some embodiments, the EAS or EMS acts as a bridge and maintains the communication links when an emergency communication session is established. In some embodiments, the EAS transmits the emergency alert and the current location of the one or more persons requiring the emergency assistance to at least one volunteer responder.

Volunteer responders may include volunteer firemen, paramedics, etc. In some embodiments, the volunteer responders are selected based on a location of the emergency, a location of the volunteer responders, a type of emergency, skills and qualification of the volunteer responders from one or more databases, or any combination thereof.

The server upon determining the ESPs can transmit a request for the emergency assistance comprising the data set associated with the emergency. In an example, the ESPs can transmit the request to the EDC 350 or responders 367 on their mobile device 366 or to both of them in the essence of time. It may be appreciated that, the EDC 350, depending on the proximity of the responders 367 near the emergency location can transmit the request to attend the emergency.

It may be appreciated that, in order to issue the request to ESPs, the server 302 needs to be sure that the post is authentic and/or the poster or user sharing the post is authentic and is not a prank. In order to confirm the authenticity of the user and/or the authenticity of the post, the server 302 of the present disclosure transmits the data set only if said one or more web content or the user satisfies at least a criterion or set of criteria associated with an emergency state, and wherein the criterion comprises a verification of the emergency.

It is a possible that while other users are posting on social media, the person 308-1 may be unable to make an emergency call. A user may think that the other users have already called emergency already. As a result, monitoring social media web sites for indications of emergencies can be helpful.

Figure 4A:
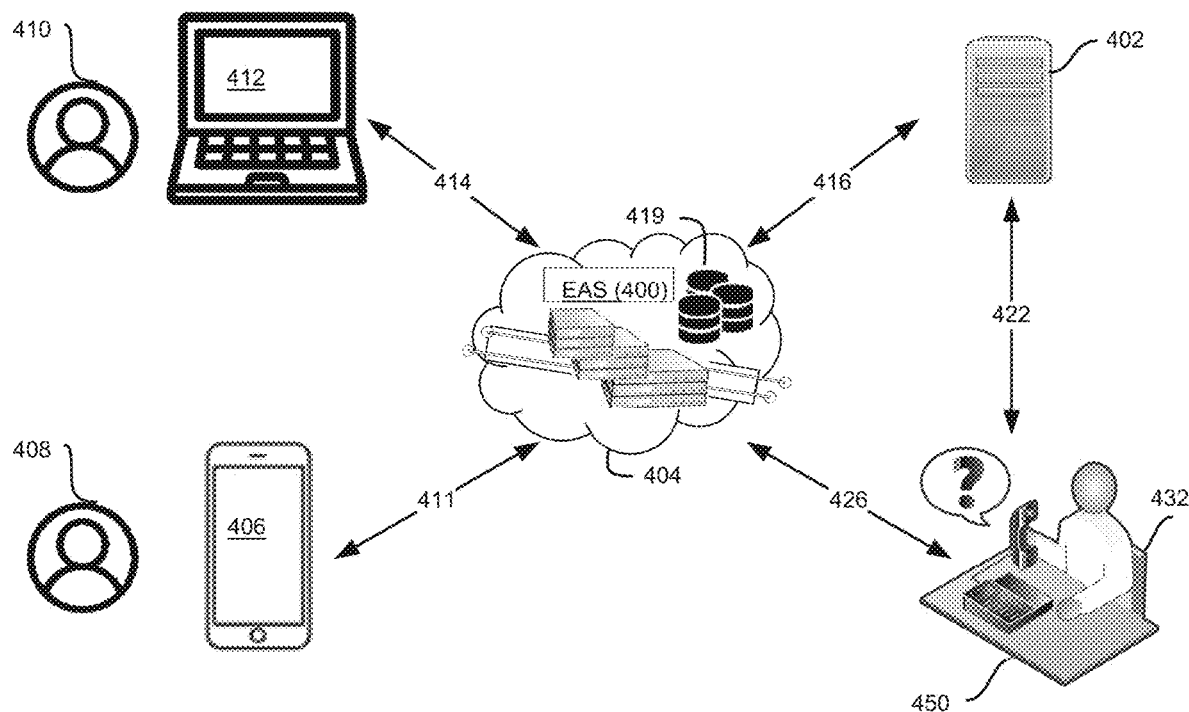
FIG. 4A illustrates how the emergency assistance system (EAS) is used to send a request for assistance to the appropriate emergency dispatch center (e.g. PSAP).

FIG. 4A illustrates how an emergency assistance system (EAS) may be used to send a request for assistance to the appropriate emergency dispatch center 450 (e.g., PSAP). User 410 may be in an emergency situation and unable to get emergency help. For example, a storm may have hit the area and the emergency phone lines may be down or busy. As a result, user 410 posts a message on a social media platform that she needs emergency help and shares her location. User 408 is a user who accesses the same social media platform from a different location. In some embodiments, user 410 may be in user 408's "friend list." When another user 408 sees the post with an indication of emergency, she would like to help her friend, user 410, by calling for emergency help from her phone 406.

In some embodiments, device 406 includes a touch screen (which may function as a display and user interface). The device 406 having device may also include a computer program, which may include one or more modules of an emergency assistance program. Thus, the program may detect or collect information about the user through user 408 device with proper authorization (e.g., EDC 450 or a private dispatch center) for emergency assistance as depicted in FIGS. 5A-5D.

As shown, the devices can connect to the EMS 404 through various wired or wireless connections such as cellular voice network, cellular data network, Wi-fi, Bluetooth®, Internet-based networks, etc. For example, communication links 411, 416 can connect device to the EMS 404, while the communication links 411 or 414 and 416 can connect to the EDC 450 via a gateway 402 In some embodiments, devices associated with the person requiring assistance 410, the reporting user 408, the EAS 400 may collectively analyze the information about the user and environment to determine whether there is an on-going or possible emergency.

In some embodiments, one or more modules of an emergency assistance program one or more modules of an emergency assistance program on the user device 406 may provide emergency data (e.g. current location from the device 406) to the EAS 400 in the EMS 404 where the analysis of social media data is conducted. As shown, the emergency clearinghouse 419 including one or more databases (e.g., Location DB, Additional DB, Social Media DB) may be housed in the EMS 404. In some embodiments, additional components such as the EAS 400 are housed in the EMS 404.

Emergency Clearinghouse

In some embodiments, the emergency management system (EMS) 404 includes a clearinghouse 419 (also referred to as an "Emergency Clearinghouse") for storing and retrieving emergency data. In some embodiments, the clearinghouse 419 includes a location DB 466 (not marked) an additional data DB 467 (not marked) and a social media DB 468 (not marked). In other embodiments, additional data and location data (hereinafter "emergency data") are stored in one or more databases in a distributed manner. In some embodiments, the emergency data is stored in an external or third-party server that is accessible to the EMS 404.

The clearinghouse optionally functions as an interface that receives and stores emergency data from electronic or communication devices that are then retrieved, transmitted, and/or distributed to recipients or requesting parties (e.g., emergency personnel) before, during, or after emergencies. As described above, the clearinghouse optionally receives emergency data from electronic or communication devices such as mobile phones, wearable devices, laptop or desktop computers, personal assistants, intelligent vehicle systems, home security systems, IoT devices, camera feeds, and other sources. As described above and below, emergency data optionally consists of locations or additional data such as medical history, personal information, or contact information. In some embodiments, during an emergency, an emergency service provider ESP (e.g., a PSAP, a public safety service (PSS)) queries the clearinghouse 419 for emergency data pertaining to an emergency (e.g. from a querying device) (not shown). The clearinghouse 419 then identifies relevant emergency data pertaining to the emergency stored within the clearinghouse 419 and transmits the pertinent emergency data to the requesting ESP. Accordingly, in some embodiments, the clearinghouse 419 acts as a data pipeline for ESPs, which can provide reliable emergency data (e.g. accurate location) that is critical for responding to an emergency through secure pathways through industry-acceptable protocols and formats. Accordingly, location data stored within the clearinghouse 419 allows emergency responders to arrive at the scene of an emergency faster, and additional data stored within the clearinghouse 419 allows emergency responders to be better prepared for the emergencies they face.

Figure 7B:
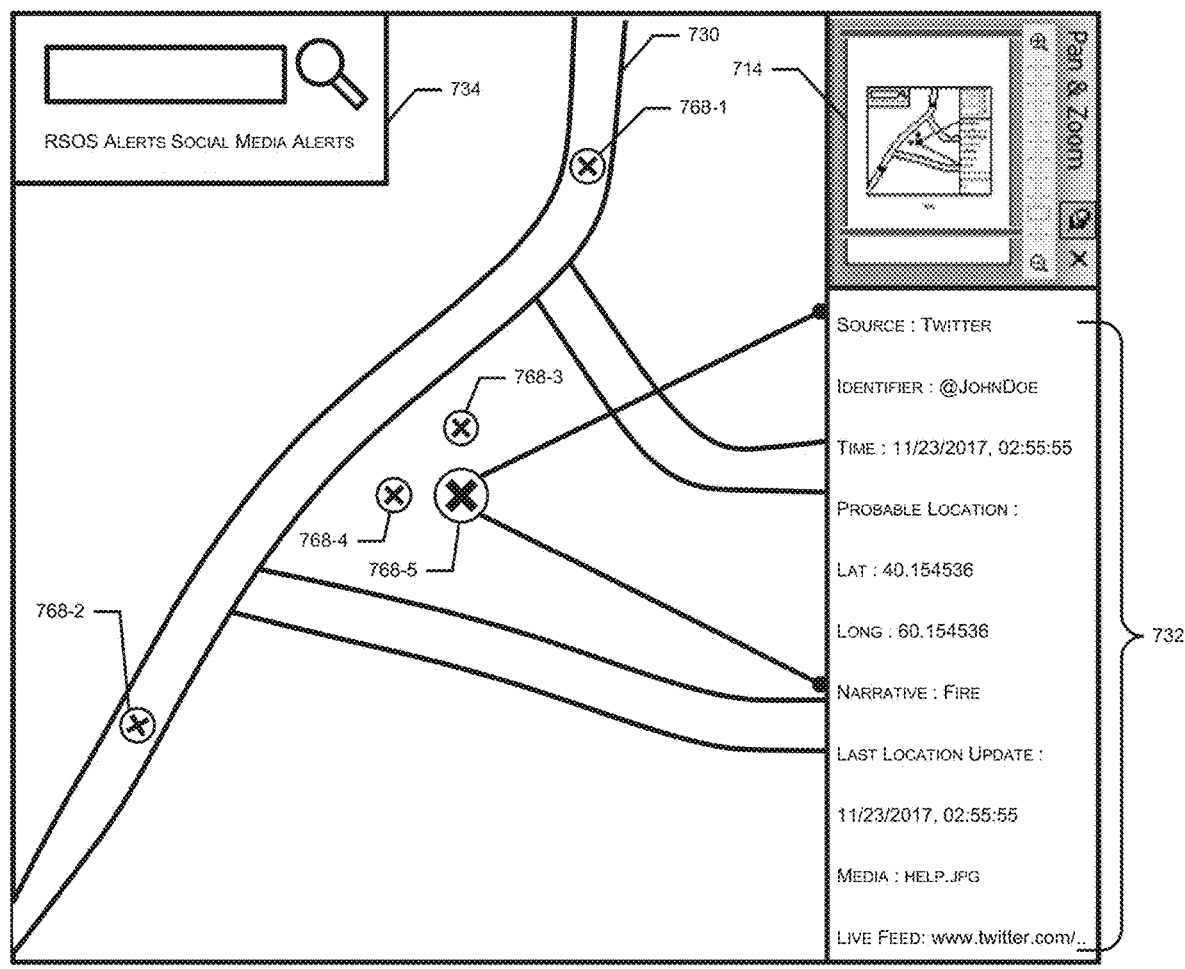
FIG. 7B illustrates a screenshot of an exemplary mapping interface of emergency alerts from social media of a computer system or mobile application at an ESP.

For example, in one embodiment, an emergency alert is triggered by an electronic device 406 (e.g., by pressing a soft button, a physical button, voice command, or gesture) or autonomously based on sensor data (e.g., smoke alarms). In this example, the user then confirms the emergency and/or provides authorization for sending the emergency alert. Emergency data, such as an enhanced location and additional data regarding the user (e.g., the user's medical history) is delivered by the electronic device 406 to the EMS 404 and stored in the clearinghouse 419. In some embodiments, the EMS 404 or clearinghouse 419 formats the emergency data into a format that is compatible with industry standards for storing and sharing emergency data. For example, the emergency data is formatted to be compatible with National Emergency Number Association (NENA)

standards. A requesting party (such as a PSS responding to the request for emergency assistance) then queries the clearinghouse 419 with an emergency data request (such as a HTTP GET request). In some embodiments, the emergency data request is in the form of the Location Information Server (LIS) protocol. In response to the emergency data request, the EMS 404 or clearinghouse 419 sends an appropriate response including relevant emergency data to the requesting party via an encrypted pathway. In some embodiments, the emergency data request is in the form of HTTP-Enabled Location Delivery (HELD) and the response from the EMS 404 or clearinghouse 419 is in the form of Presence Information Data Format Location Object (PIDF-LO). In some embodiments, the emergency data request includes an authorization code (also referred to as an "authorization token") in the body, header, or metadata of the request, and the EMS 120 checks that the authorization code is active before providing a response to the requesting party. In some embodiments, authorization is provided in the "Authorization" header of the emergency data request using HTTP Basic Authentication. For example, in some embodiments, authorization is base64-encoded user name and password for an account associated with the requesting party. In some embodiments, emergency data requests are sent over public networks using API access keys or credentials. In some embodiments, Transport Layer Security (TLS) is used in the requests and responses from the EMS 404 for encryption security. In some embodiments, the call taking module includes a call-handling application, which is provided by a third-party vendor. In some embodiments, an ESP user 432 interacts with the call-handling application to send an emergency data request to the EMS 404. In some embodiments, the response from the EMS 404 is displayed at the ESP display (e.g., as depicted in FIGS. 7A & 7B. In some embodiments, the ESP user 432 can use a web portal on a display to access the emergency response application to send an emergency data request to the clearinghouse 419.

In some embodiments, the electronic device 406 from which the emergency alert was generated is associated with a phone number. An exemplary request from a requesting party for a location of an electronic device 406 associated with the phone number "+1-555-555-5555" is shown below. Although not shown, credentials or an access key associated with the requesting party are optionally provided in the header of the request (which is optionally encrypted for security).

```
<?xml version="1.0"?>
<locationRequest xmlns="urn:ietf:params:xml:ns:geopriv:held">
<locationraType exact="false">
any
</locationType>
<device xmlns="urn:ietf:params:xml:ns:geopriv:held:id">
<uri>tel:+15555555555</uri>
</device>
</locationRequest>
```

An exemplary LIS response from the EMS 120 in a standard format compatible with industry standards, PIDF-LO, is shown below. If the request includes an inactive or expired credential or access key, an error response will be generated.

```
<?xml version="1.0" encoding="utf-8"?>
<held:locationResponse xmlns:gbp="urn:ietf:params:xml:ns:pidf:geopriv10:basicPolicy"
xmlns:gp="urn:ietf:params:xml:ns:pidf:geopriv10"
xmlns:gs="http://www.opengis.net/pidflo/1.0"
xmlns:pidf="urn:ietf:params:xml:ns:pidf"
xmlns:gml="http://www.opengis.net/gml"
xmlns:held="urn:ietf:params:xml:ns:geopriv:held">
<held:locationUriSet expires="2016-11-10 01:31:21.123713">
<held:locationURI>
https://api-sandbox.rapidsos.com/v1/location/lbyr/?ref=c786f6b9-5e06-4611-a1c9-fbf9333e5652
</held:locationURI>
</held:locationUriSet>
<pidf:presence entity="tel:+15555555555">
<pidf:tuple id="vcefda6f4-ec1c-4721-9f41-225d5ff38c09">
<pidf:status>
<gp:geopriv>
<gp:location-info>
<gs:Circle>
<gml:pos>37.4219983 -122.084</gml:pos>
<gs:radius uom="urn:ogc:def:uom:EPSG::9001">
20.0</gs:radius>
</gs:Circle>
<ca:civicAddress xml:lang="en">
<ca:A1>CA</ca:A1>
<ca:A3>Mountain View</ca:A3>
<ca:RD>Amphitheatre</ca:RD>
<ca:STS>Pkwy</ca:STS>
<ca:HNO>1600</ca:HNO>
<ca:PC>94043</ca:PC>
<ca:BLD>Google Bldg 40</ca:BLD>
</ca:civicAddress>
</gp:location-info>
<gp:usage-rules>
<gbp:retransmission-allowed>
false</gbp:retransmission-allowed>
</gp:usage-rules>
</gp:geopriv>
</pidf:status>
<pidf:timestamp>
2016-09-15T23:59:46.778000+00:00
```

-continued

```
   </pidf:timestamp>
  </pidf:tuple>
 </pidf:presence>
</held:locationResponse>
```

In some embodiments, as described above, emergency data includes locations and additional data. In some embodiments, emergency data includes one or more emergency data categories (also referred to as "data categories"). In some embodiments the emergency data categories include: service data reference, full name, email, emergency contacts, addresses, language, occupation, phone numbers, websites, gender, height, weight, ethnicity, profile picture, allergies, medical conditions, medications, disabilities, blood type, medical notes, birthday, and additional comments. In some embodiments, emergency data categories are tagged with tags for specific types of data such as "demographics" or "medical data", "social media data." For example, in some embodiments, gender, height, weight, ethnicity, profile picture (image-url) are tagged as demographic data. In some embodiments, medical data protected under HIPAA and other laws are tagged as "HIPAA" or "private." In some embodiments, medical data includes information on one or more of allergies, medical condition(s) or illness(es), medication(s), disabilities, blood type, medical note(s), and other medical information. In some embodiments, medical information protected under HIPAA are encrypted and/or anonymized. In some embodiments, some data are tagged as "general" or another similar tag, wherein access is not specifically restricted.

In some embodiments, the EAS 400 checks the credentials of the requesting party (e.g., ESP user 432) and returns data based on checks the consent provided by the user 408 for sharing social media data.

An exemplary emergency data request for additional data from a requesting party for an electronic device 406 associated with the phone number "+1-777-999-7777" is shown below. Although not shown, credentials or an access key associated with the requesting party are optionally provided in the header of the request.

http://api-demo.rapidsos.com/v1/adr/?caller_id=17779997777&section=device_info

An exemplary response additional data response from the EMS 404 in a standard format compatible with industry standards, PIDF-LO, is shown below. In some embodiments, if the request includes an inactive or expired access key or set of credentials, an error response will be generated.

```
HTTP/1.1 200 OK
Date: Tue, 01 Dec 2016 23:27:30 GMT
Content-Length: 489
Content-Type: application/EmergencyCallData.DeviceInfo+xml
<dev:EmergencyCallData.DeviceInfo
 xmlns:dev="urn:ietf:params:xml:ns:EmergencyCallData:DeviceInfo">
 <dev:DataProviderReference>d4b3072df.201409182208075@example.org
```

The emergency data may be provisioned in Clearinghouse with a "user identifier", a "device identifier" or an "account identifier." When a requesting party sends a data request with the identifier, the relevant emergency data can be looked up in the Clearinghouse and retrieved. In some embodiments, the user identifier comprises a timestamp, a username, a phone number, a social media network, an account name, an email address, a device number, or an IP address of an access device. In yet further embodiments, users can be looked up in one or more databases using email addresses, social media usernames or handles, login IDs, physical addresses, x-y coordinates, IP address BSSID, SSID or MAC address.

In some embodiments, when the emergency data is stored at a third-party server and receives a request for emergency data from the EMS 404, as a database query, the third-party server formats the requested emergency data and stores this information in an alternate database, and forwards either a response or a reference to the alternate database for accessing the emergency data requested by the EMS 404, which is provided to the EDC 450 over a hybrid analog and/or a data communication channel, depending on the capabilities of EDC 450. In some embodiments, the third-party server stores the emergency data, requested by the EMS 404 or directly by the EDC 450, in the alternate database for a certain period of time after receiving the request for the emergency data regarding a user and any electronic devices 406.

In some embodiments, emergency data (e.g. location data, sensor data, images, video) are deleted after a period of time in the EMS 404 or on a third-party server. In some embodiments, the emergency data expires after a period of time to reduce the risk of breaches. In some embodiments, this period of time is a timer value (e.g., a timer countdown or a set time point) defined by the EMS 450 and the third-party server in conjunction with each other prior to the addition of the requested emergency data to the alternate database at the third-party server. In some embodiments, once the timer value has passed and no new requests for the emergency data pertaining to the particular user and the electronic device 406, or other devices associated with the user, are received by the third-party server, then the third-party server marks the particular alternate database entries to be deleted and waits for another, different, time-out interval. In some embodiments, once this particular second time-out interval has also been completed and no new requests for location data for the particular user or associated electronic devices 406 are received by the third-party server, the third-party server removes the specific marked entries from the alternate database in the next cycle of updates for the alternate database. In some embodiments, after adding the emergency data in the alternate database by the third-party server, the third-party server keeps updating the emergency data in the alternate database on a periodic, or as-needed basis, for the purpose of keeping the emergency data about the user or electronic device 406 current for providing the most recent and accurate emergency data to the EMS 404 and the EDC 450 for the purposes of responding to a request for emergency assistance. In some embodiments, the third-party server is updated by the EMS 404 for all the emergency data pertaining to all users and their associated electronic devices 406 that are served by the EMS 404 at any current time.

In some non-emergency situations, there is a need to access location data, user data, emergency data or sensor data. For example, in some embodiments, a user of an electronic device 406 grants authorization to family members to access location data for the user. Accordingly, when a family member requests location data for a user, access is granted if there is proper authorization.

Figure 10:
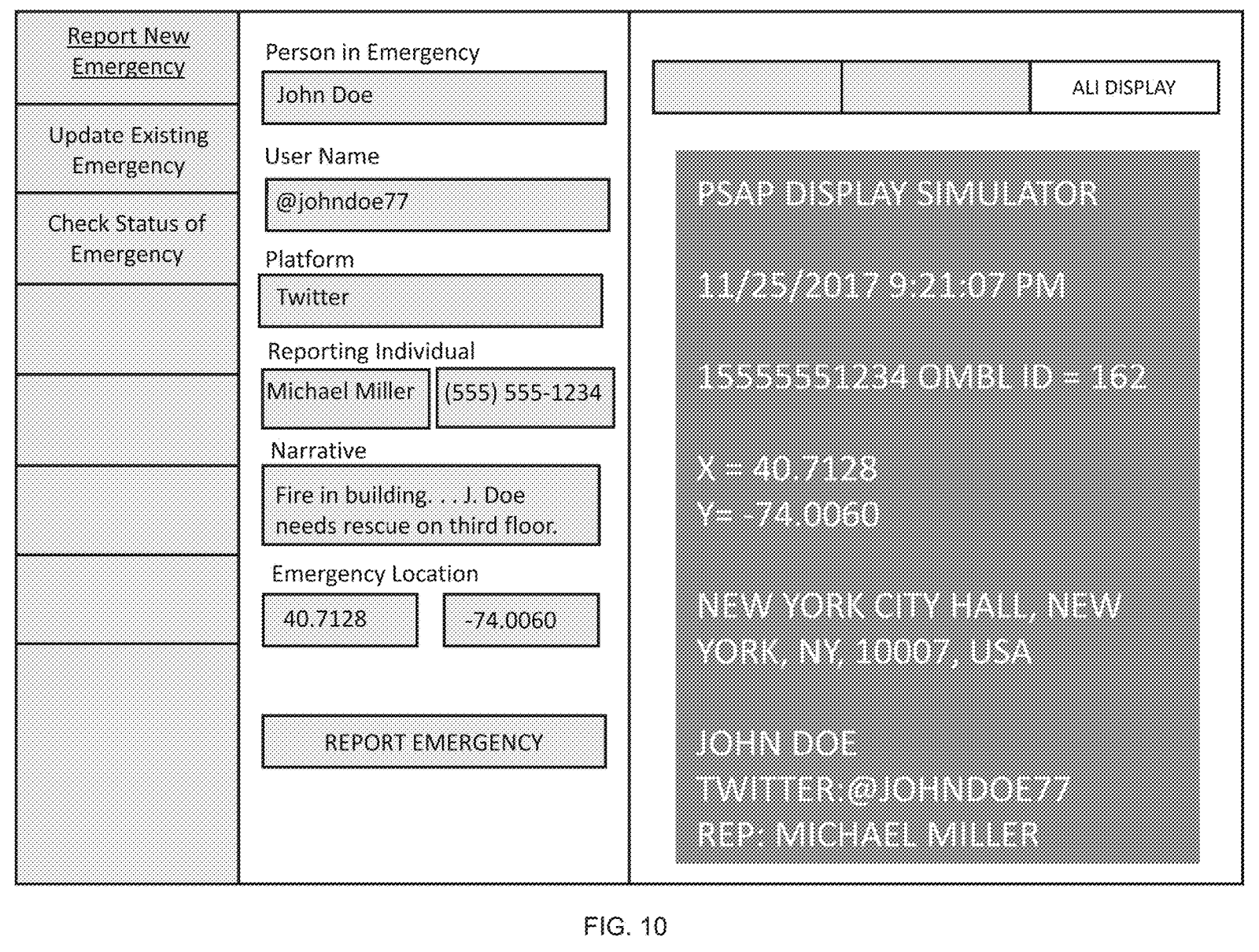

In some embodiments, an employee may be required to share location data with the employer (e.g. through an operations center). In some embodiments, the corporate operations center is notified when the employee is in an emergency. In another example, a taxi operations company requests and obtains location data of one or more fleet members to keep track of its vehicles (e.g., via onboard vehicle console or terminal). In some cases, a corporate representative may make an emergency proxy call on behalf of the employee (as depicted in FIG. 10). In some cases, a corporate representative may participate in an emergency conference bridge with three or more participants (e.g., an employee in an emergency, a corporate representative, a supervisor, EDC user).

In some embodiments, the current location of user for the emergency may be shared with the EDC 450, where a call taker 432, a dispatcher (not shown), a manager (not shown), or other personnel may be informed about the on-going emergency or possible emergency. As shown, a computer system 450 with an emergency assistance program 402 may be accessible to the dispatcher 432 or manager or other emergency personnel at the EDC 450. The computer system (e.g., a ESP/PSAP system with hardware and software components as depicted in FIG. 1D). As shown, the system may include a display or user interface and an emergency assistance program. On the system, emergency personnel may get notification about on-going and possible emergencies and allocation of emergency resources.

In some embodiments, the access device collects data from various devices including user input for analyzing whether there is an on-going or possible emergency for user 408. Based on this analysis, the EAS determines whether or not the user 408 requires emergency assistance.

Responsive to the determination by the EAS that the user 408 is in an, or a potential, threat, and after successfully generating and transmitting a request for emergency assistance to an EMS 404, positive affirmation of receipt of the request by the EMS 404 and/or EDC 450 may be received. Upon receiving a positive affirmation, the EMS 404 may maintain the communication session the EDC 450 and user 408 with updated information and changes to the threat level.

In some embodiments, the EDC 450 may require a human caller to make the emergency call. In some cases, the EAS 400 may offer the option of proxy calling to the reporting user. In some cases, the EAS 400 may call the person in the emergency to see if they would like to be connected to an emergency dispatch center. In some embodiments, the EAS 400 may go through an emergency call flow to find a human caller who will agree to report the emergency to the EDC 450.

Security, Privacy, Trust, Consent & Reliability of Social Media Information

In some embodiments, the information collected by the EAS (e.g. for the Emergency Registry) may be kept confidential and access to the information may be provided differently depending on the authorization of the user or entity requesting the information. For example, some basic information may be provided to close family members and not to distant relatives. In some embodiments, the type of information that is shared may be restricted. For example, medical information, current location information may not be shared while the fact that they have received emergency help may be shared. In some embodiments, the data may be anonymized to protect privacy. To reduce risk of a data breach, the data may be shared through secure and encrypted pathways.

Authorization and credential management may allow differential access to requesting parties. In some embodiments, data is queried over public networks by using API access keys or credentials. In some embodiments, Transport layer Security (TLS) is used in the queries for encryption. In some embodiments, authorization is provided in the "Authorization" header of the query using HTTP Basic Authentication. For example, in some embodiments, authorization is base64-encoded user name and password for the account.

Many social media networks allow users to provide consent for sharing their data with the specific users or make it publicly accessible. In some embodiments, users can also provide consent for sharing their data (e.g. location data) with emergency services when there is an emergency. In some embodiments, the user provides consent for data sharing at the time of registration. In some embodiments, the user provides consent on a post-by-post basis. In some embodiments, the user can be prompted to provide for consent for sharing data (e.g., location data) with emergency responders, emergency personnel and emergency contacts after they have pressed a panic button, as depicted in FIGS. 5A-5D.

Many social media websites, as well as other websites, allow reviews and other comments to be posted by users. Privacy and reliability issues exist with information posted on social media. It is also possible that the publicly available profile provided by the user is blank, anonymous or deliberately misleading. The user's post may be mimicking human activity but in fact be an automated robot, with an assumed biased party directing the robot.

Whether or not a person is who they claim to be, their expertise in a particular area is undetermined even if they have expertise in another area. For example, a user's post could provide a detailed and accurate review of a television set but also provide biased and inaccurate information in a post about a movie or book. It may be because the user has expertise or expert knowledge in one area and not another or it may be because the user has tastes that a reader shares with respect to television sets but not with respect to movies and books. Whatever the reason, it is difficult to rely on on-line public postings for consistent, reliable and useful information, even if such information is in fact accurate and reliable. Thus, it may be necessary to cross-check information from trusted sources.

A verification process may be implemented to establish the veracity of information. In some embodiments, the verification may be through corroboration, e.g. the name of the user is the same from different sources (e.g. the name is same on FB and in an online people directory). In other embodiments, the verification process may involve another user confirming the information by email, text message, etc. regarding the user or the situation.

In an exemplary embodiment, for the verification process, the source of the post is considered. Trust information stores, or stores access information (e.g. links, record addresses, et cetera), regarding the source of information and its trustworthiness. Trust information may be a number of public or private sources of information and/or an aggregation thereof. The level of trust is further associated with a specific skill or role of the employee. Continuing the example above, the employer has provided roles of a number of employees for trust information 106 and one employee is a natural gas pipeline maintenance engineer. The engineer may have, for example, a Twitter account which is used to "Tweet" about any number of topics. However, a post by the engineer expressing concern, or lack of concern, for the smell of gas in a neighborhood may be given a higher degree of trust as compared to a bookkeeper for the same utility company or another member of the public. Similarly, that same pipeline maintenance engineer posting a message about public health matters, or other matters not otherwise known to be in the engineer's field of expertise, may be afforded a different level of trust. The level of trust may simply be a result of knowing who the user posting is, or is not. For example, a post may be from an unknown user. In one embodiment, all unknown users may be considered unreliable. An employee record in trust information for a user may, at least, indicate the user is an adult and has the faculties to maintain employment. Therefore, while the identity or expertise of the employee may not be provided, it would at least be known that the user is not, for example, a child.

In yet another embodiment, processor provides data to trust information. As a user's credibility is determined, trust information is updated. In one embodiment, trust information is updated with respect to specific subject matter associated with the user's posts. In another embodiment, trust information is updated to reflect an overall trustworthiness of a user.

In one embodiment, the source is a factor of trust. For example, a governmental agency, such as the Federal Emergency Management Agency ("FEMA") may be given a higher degree of trust as compared to a television news channel's RSS feed or a social media site. Similarly, certain non-governmental agencies, such as the International Red Cross may be given a trust value higher than other sources.

Figure 4B:
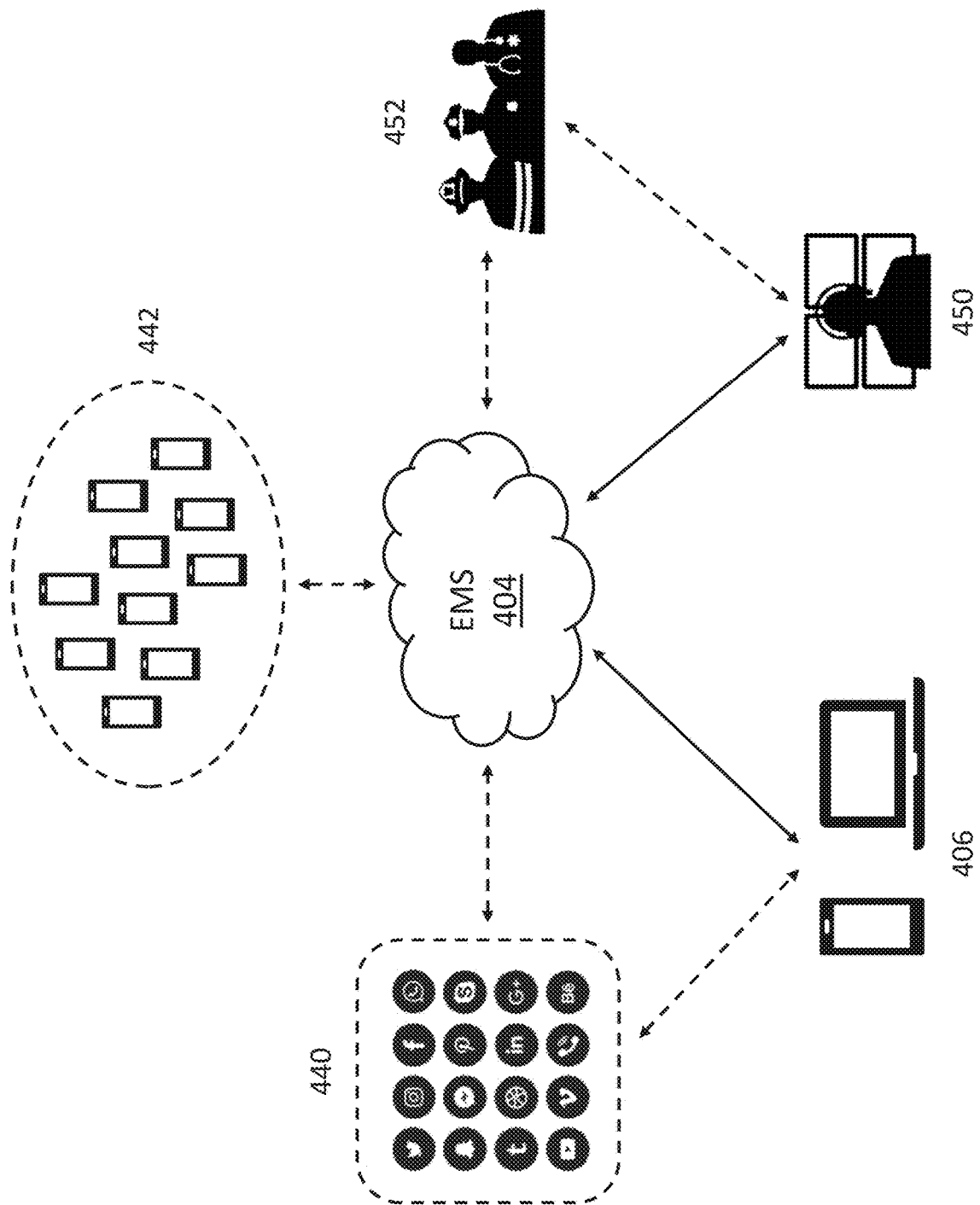
FIG. 4B depicts an emergency assistance system (EAS) for facilitating emergency communications during an emergency.

As depicted in FIG. 4B, the EAS can include an electronic device 406, an emergency management system (EMS) 404, a public safety answering point (PSAP) 450, and one or more emergency responders 452. In some embodiments, the system additionally includes one or more sources of social media data 440 (e.g., a social media feed, such as a stream or feed of Twitter posts). In some embodiments, the system additionally includes a group of electronic devices 442.

In some embodiments, the EMS 404 receives social media data from the one or more sources of social media data 440 and analyzes the social media data for potential emergencies. For example, the EMS 404 can monitor the social media data for social media posts indicative of an emergency, as described above. In response to detecting one or more social media posts indicative of an emergency, the EMS 404 can identify one or more users potentially affected by the emergency, identify communication devices 406 associated with the one or more users, transmit emergency response messages to the communication devices 406, and, in response to receiving confirmation of the emergency response messages, initiate autonomous communication sessions with the one or more users through the communication devices 406, as described below. In some embodiments, a user potentially affected by the emergency is identified based on the one or more social media posts. For example, in some embodiments, the one or more social media posts are posted by a user potentially affected by the emergency. In another example, the EMS 404 generates an affected area for the emergency based on the one or more social media posts and the one or more users potentially affected by the emergency are identified as within or potentially within the affected area. In some embodiments, the affected area comprises a buffer region (e.g. a 2 km buffer around the affected area) and potential users in the buffer region are also contacted with notification messages. The EMS 404 can then initiate autonomous communication sessions with a group of communication devices 442 including a communication device associated with each of the one or more users potentially affected by the emergency. In some embodiments, the EMS 404 receives a location from a communication device associated with a user potentially affected by the emergency and confirms that the location is within the affected area before transmitting an emergency response message to the communication device.

Geofencing Emergency Data

In some embodiments, after receiving an data request from an ESP, the EMS or clearinghouse verifies the temporary access token and account type included in the emergency data request. In some embodiments, as described above, the clearinghouse 419 may receive the emergency data request. After receiving the emergency data request, emergency data associated with the user identifier (e.g. a Twitter handle) may be retrieved from one or more clearinghouse databases. After retrieving the emergency data associated with the user identifier, the clearinghouse 419 can return the emergency data, which can in turn be displayed to the requesting ESP.

In some embodiments, the emergency data associated with the device identifier includes one or more locations (e.g., device-based accurate locations). In some embodiments, the emergency data associated with the user identifier includes a current location. In some embodiments, the current location is received by the clearinghouse 419 by the electronic device 406, wherein the device is associated with the user identifier. In some embodiments, the current location is received by the clearinghouse 419 from a second electronic device associated with the electronic device 408. In some embodiments, the current location is received from a second electronic device communicatively coupled to the electronic device 408. In some embodiments, the emergency data associated with the device identifier includes one or more historical locations. In some embodiments, before returning emergency data associated with a device identifier to the emergency response application, the clearinghouse or EMS determines if a current location included in the emergency data is within a geofence associated with the PSS of the requesting user, as described below. In some embodiments, the clearinghouse only returns the emergency data associated with the device identifier if the current location included in the emergency data is determined to be within the geofence associated with the PSS of the requesting user.

For emergency response, an emergency service provider (public or private entities) may be given jurisdictional authority to a certain geographical region or jurisdiction (also referred to as "authoritative regions"). In some cases, the ESP may have a service area based on policy or practical reasons. Generally, a geofence is a virtual perimeter for a real-world geographic area. A geofence could be dynamically generated—as in a radius around a point location, or a geofence can be a predefined set of boundaries (such as school zones or neighborhood boundaries). The use of a geofence is called geofencing, and one example of usage involves a location-aware device of a location-based service (LBS) user entering or exiting a geofence. Entry or exit from a geofence could trigger an alert to the device's user as well as messaging to the geofence operator. The geofence information, which could contain the location of the device, could be sent to a mobile telephone or an email account.

In the context of emergency services, one or more geofences may correspond to the administrative or authoritative region of an ESP. In many cases, the ESP is a public entity such as a public safety answering points ("PSAP), a PSS (e.g. a police department, a fire department, a federal disaster management agency, national highway police, etc.), which have jurisdiction over a designated area (sometimes, overlapping areas). In some cases, geofence can be an administrative region defined as a result of practical considerations, e.g., a proximal distance from the ESP facility. Geofences are used to define the jurisdictional authority by various methods and in various Geographic Information System (GIS) formats.

Geofences may be defined in various ways. For example, a geofence may include a county boundary, a state boundary, a collection of postal/zip codes, or collection of cell sectors, simple shapes, complex polygons, etc. Geofences may also refer to approximations where the "approximated" geofence encloses an approximation of the authoritative region.

In some embodiments, geofences may be defined by proximal distance from the location of a particular ESP. For example, the geofence may defined to be within a proximal radius from the location of an ESP (a center point). In some embodiments, the geofence maybe defined as a proximal distance along a highway (e.g. 10 miles from the ESP location, etc.).

In some embodiments, a buffer (e.g. +10 km) may be added to the geofence(s) so that results within the buffer zone are also returned. In many cases, ESP agencies have discretion and incentive to respond to emergencies that are beyond their authoritative jurisdiction. In some embodiments, the buffer can range from 0.5 km to 30 km, or 1 km-20 km.

In some embodiments, an administrator of an ESP (e.g. a police department) can submit the complex authoritative jurisdiction as one or more approximate geofence(s) by specifying points. For example, the ESP administrator can submit geofenced region A by specifying two points—the north-west corner and the south-east corner using a drawing tool. In another example, the multiple-sided polygon C can be submitted by specifying the five corners.

Approximating a complex geofenced region has several advantages. The geofence(s) are simple and the calculations can be quicker and less cumbersome for applications where exact calculations are not needed. It is appreciated that a GIS file 673 defining the authoritative jurisdiction may be saved in one or more industry-acceptable formats such as a GIS shape file, a GeoJSON file, KML file, etc.

In some embodiments, provisioning and indexing of geofences are done within the EAS in a geofence database (e.g. 169 in FIG. 1B-ii). Generally, the process includes a geofence submission and a geofence provisioning. An ESP administrator (not shown) may submit a GIS file (e.g. a GIS shape file) for the actual authoritative jurisdiction of the ESP agency or organization, which may be provisioned in a geofence database.

Various embodiments of the geofence database are contemplated. It may be one or more databases that may be searchable using an ESP identifier, credentials, etc. In some embodiments, an emergency location may be searched through several geofences in the database. In some cases, the geofenced region may be shrunk for easy of storage and to simplify calculations.

Mass Casualty Incidents & Mass Emergencies

Mass Casualty Incidents (MCIs) are understood to be incidents or emergencies where the emergency service personnel and equipment are overwhelmed by the number or severity of casualties or injuries. Typically, the MCI designation is based on the resources that are ordinarily available in the locality. With disaster planning (e.g. an extreme weather warning), additional resources that are not ordinarily available in the locality can be used. In many cases, the emergency phone lines may be overwhelmed leading to busy emergency lines, dropped calls or long wait times. ESPs (e.g. PSAPs) may have varying criterion and response plans for MCIs.

Mass emergencies, as used herein, refers to one or more related emergencies that affects a group of people or has a high likelihood of affecting a group of people. In some embodiments, the mass emergency may affect 10-100 people, wherein the 10-100 people may need emergency assistance. In some embodiments, the mass emergency affects more than 25 people, wherein 25 people may need emergency assistance. In some embodiments, the mass emergency may affect less 10 people, but there is a likelihood of high severity.

Social media may be particularly powerful means of communication when emergency services have been overwhelmed or when a large group of people have been affected by one or more emergencies. If the Internet connectivity has not been affected, increase in social media activity can be used for early detection and efficient emergency response during MCIs and mass emergencies. In some embodiments, relevant posts and social media analytics may be an indication of a mass emergency. In particular, mass emergencies may be detecting using analytics such trending topics or hashtags, social media content volume and key word sentiment severity.

In some embodiments, the EAS may provide an alternative communication pathway for reporting emergencies. The method comprises detecting one or more social media posts indicative of an emergency, which may be a mass emergency affecting a group of people in an area. The EAS may determine an affected area for the emergency by visualizing multiple social media posts or other emergency data (e.g., a processed emergency feed depicted in FIG. 6A). Then, the EAS may identify one or more users who may be potentially located within the affected area. The location of user may be based on the location of the last status update, names of places in the user's social media posts, the historical location of the user, the location of the user network, etc. The EAS may transmit an emergency response message to a communication device associated with the user (as depicted in FIGS. 5A-5D. The EAS may receive confirmation of the emergency response message from the user (e.g., the user presses the "I need help" button). In response to receiving confirmation of the emergency response message, the EAS initiates a communication session with the user through the communication device as described below.

In one aspect, the EAS may (a) receiving an indication of an emergency from a user on a social media network. In some embodiments, the user may press a hard button, soft button, voice command or other user input, which indicates that he or she is in an emergency and would like to connect to emergency services (see FIG. 5A for reporting emergency and/or calling emergency contacts). In some embodiments, EAS distils a data set associated with the emergency (also referred to as the emergency data set) from one or more web content on a social media network and/or other data sources. In some embodiments, the data set comprises a current location of the one or more persons requiring emergency assistance. In some embodiments, the current location is less than 5, 10, 15, or 30 minutes old. In some embodiments, the current location is less than 1 hour old. In some embodiments, the current location is less than 24 hours old. In some embodiments, current location is obtained within the last 10 seconds to 4 hours.

In some embodiments, the EAS determines an appropriate ESP based on the location of the emergency, the type of emergency, and status of the ESP. In some embodiments, the current location has to be within the authoritative or administrative jurisdiction of the appropriate ESP(s).

In some embodiments, the EAS may establish an emergency communication session (e.g., emergency call or emergency session) with the appropriate ESP and the user. In some embodiments, the EAS also provides access to the data set to the appropriate ESP with through an alternative communication pathway that is different from a standard communication pathway for reporting emergencies in the jurisdiction of the ESP. In some embodiments, the alternative communication pathway is through ALI or NG911 databases.

In some embodiments, the current location of the user device is obtained, wherein the location is device-based hybrid location of the device. In some embodiments, the current location is obtained from the web content on the social media network. In some embodiments, the current location is obtained from user-provided address. In some embodiments, the user may be prompted to confirm the current location.

In some embodiments, the alternative communication pathway comprises an alternate phone line, an email address, a chat window, a social media post, or an emergency registry. In some embodiments, the alternative communication pathway comprises posting on social media with a specific tag. In some embodiments, the posting on social media is with a hashtag. In some embodiments, the alternative communication pathway allows the user to report an emergency on behalf of the one or more persons requiring emergency assistance. In some embodiments, the alternative communication pathway involves making a proxy call.

In some embodiments, the alternative communication pathway provides access to the location of the one or more persons requiring emergency assistance directly with an emergency responder responding to the emergency. In some embodiments, the data set is displayed on a responder device (see FIGS. 7A & 7B). In some embodiments, the alternative communication pathway establishes an emergency communication session directly between the user and an emergency responder responding to the emergency. As a result, the EAS directly connects the user device with the emergency responder. In some embodiments, the emergency responder is a volunteer responder.

For establishing and maintain an emergency communication session, the EAS may assessing strength of cellular connectivity with the user device. For example, the EAS may take a look at the number of bars. The EAS may also evaluate the cellular data connection or Wi-fi available to the user device. If the strength of the cellular connection is poor, the EAS may provide an alternate communication pathway such as a Wi-fi based service for reporting the emergency. For example, a Wi-fi based walkie-talkie service may be used to communicate the appropriate ESP, other users in the area, volunteer responders, friends or family who are concerned about the user. In some embodiments, the alternate channels comprise Wi-fi connections, Blue-Tooth connections, short-wave radio connections, intermediate or routing devices, and other communication devices.

Figure 5A:
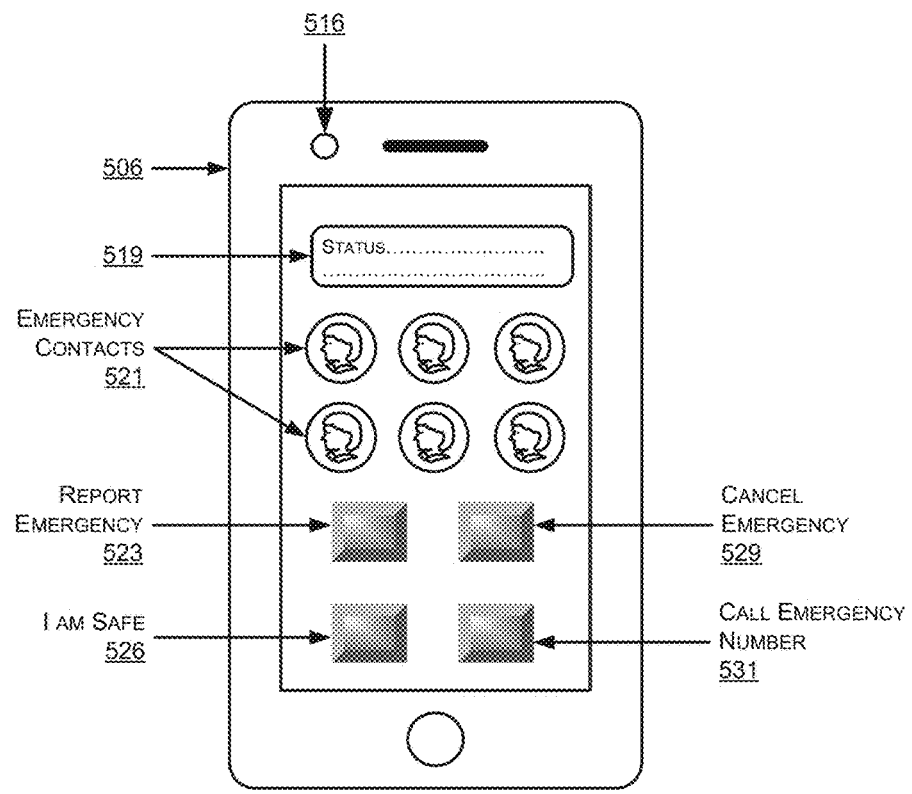
FIGS. 5A-5D illustrate an exemplary user interface showing an emergency or panic button for an exemplary access device.

FIG. 5A illustrates an exemplary user interface showing an emergency/panic button for an exemplary mobile device 506. In some embodiments, the exemplary mobile device 506 having a camera 516 and one or more mobile applications installed on the device 506. The user interface can provide various tabs such as but not limited to status 519 to update the status of a user using the mobile device 506, profiles 521 of plurality of other users, and the like tabs/options.

According to the present disclosure, such user interface can be provided with an emergency/panic button (report emergency) 523 which enables to directly send a signal to the EAS server intimating about the emergency. In this scenario, once the user presses the emergency or panic button 523, a location data along with real-time data such as images of nearby proximity or audio or video of the nearby locality is transmitted to the EAS. Such data would be utilized by the EAS 100 to distill the information into a data set associated with the emergency, wherein the data set comprises a current location of the one or more persons requiring emergency assistance. Upon the data sets are created, the EAS 100 can determine one or more emergency service providers (ESPs) comprising emergency dispatch centers (EDCs) and responders for providing the emergency assistance and transmit a request for the emergency assistance comprising the data set associated with the emergency. Apart from the emergency/panic button (e.g., a "Need Help button") 523, the user interface can also include an "I am safe" button 526 indicative of safety of the user, cancel emergency button 529 and call emergency number 531.

Figure 5B:
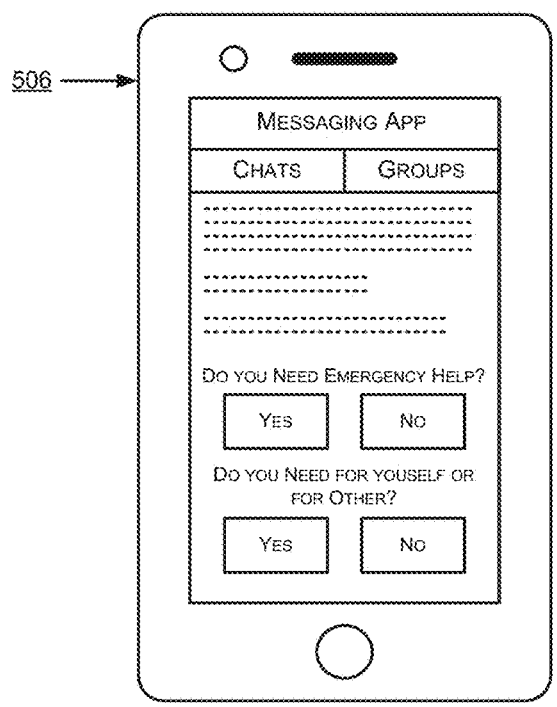

FIG. 5B illustrates another exemplary user interface (UI) of a device 506 providing a facility to report emergency within a messaging app. A user may have sent a private message with an emergency indication (e.g., the words "flood", "too much water", "worried") to one or more devices within his or her contacts. The EAS can detect the message with the emergency indication, determine that there is a likely emergency based on user confirmation, gather data from all sources, generate an emergency data set after obtaining device-based location from the device, find an appropriate ESP and (a) make the emergency data available for the appropriate ESP and/or (b) initiate an emergency communication session (an emergency call) with the ESP. As shown, the EAS may prompt the user to confirm the emergency by indicating that he or she needs emergency help. In some embodiments, a reporting user may be able to report an emergency on behalf of another user of the messaging app.

In one aspect, the EAS proactively reaches out to a large number of users who may be affected by a mass emergency. The EAS may detect one or more social media posts indicative of an emergency, particularly a mass emergency. The EAS may determine an affected area for the emergency based on the one or more social media posts (e.g. as described in FIG. 6B). The EAS may identify a user potentially located within the affected area. In some embodiments, a buffer region beyond the affected area may be included to be over-inclusive. In some embodiments, transmitting an emergency response message to a communication device associated with the user. When a user responds by confirming the emergency response message, the EAS may initiate an autonomous communication session with the user through the communication device as described in FIGS. 5C & 5D. In some embodiments, the EAS extracts emergency information (e.g. current location, type of emergency, name of user) from the autonomous communication session abd transmits the emergency information to an ESP. In this way, the autonomous communication session (also referred to as a ChatBot) can reduce time for responding to the emergency. In some embodiments, the autonomous communication session is through one or more SMS. In some embodiments, the autonomous communication session is through HTTP-based messages. In some embodiments, the autonomous communication session comprises one or more push notifications. In some embodiments, one or more SMS text messages are transmitted to the communication device according to an emergency flow, wherein one or more emergency contacts are contacted. In some embodiments, adapting the emergency flow script during the autonomous communication session according to responses from one or more emergency contacts. For example, if one emergency contact does not answer, the next emergency contact is called.

Figure 5C:
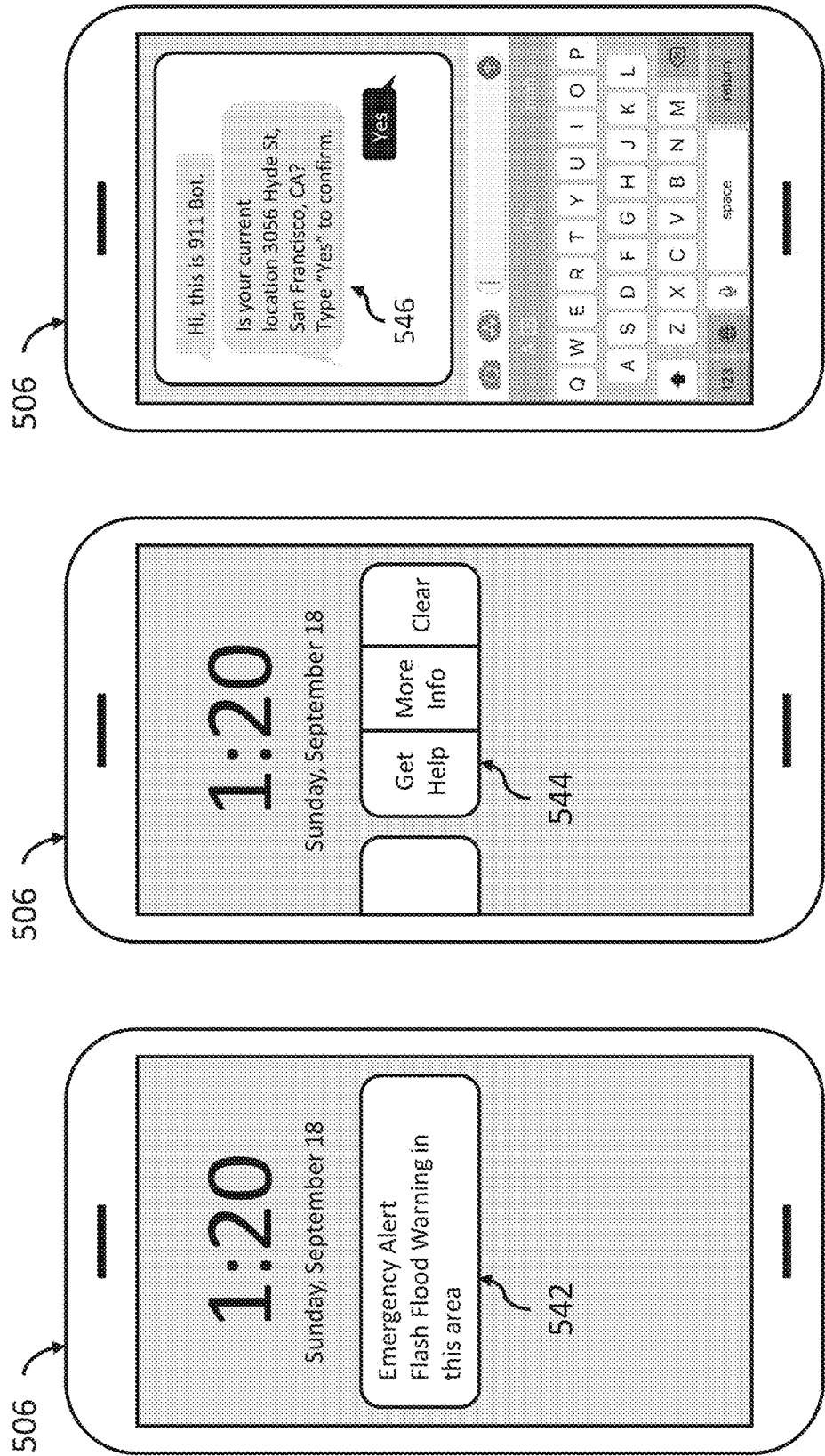

As described above with respect to FIGS. 5A & 5B, in some embodiments, the EAS can initiate autonomous communication sessions with a communication device or a group of communication devices in response to detecting one or more social media posts indicative of an emergency. FIG. 5C illustrates an exemplary emergency response message and autonomous communication session in accordance with one embodiment of the present invention. In some embodiments, as mentioned above, the EMS, in response to detecting an emergency or a potential emergency, can initiate an autonomous communication session with one or more communication devices. In some embodiments, as depicted by FIG. 5C, the EMS can initiate an autonomous communication session by transmitting an emergency response message to a communication device 506. In some embodiments, the emergency response message is a push notification 542. After the emergency response message is transmitted to the communication device 506, a user of the communication device can confirm the emergency response message. For example, in an embodiment in which the emergency response message is a push notification 542, a user can confirm the push notification 542 by swiping the push notification 542 or otherwise selecting the push notification 542, such as by selecting the "Get Help" button 544 depicted in FIG. 5C. Confirming the emergency response message transmits confirmation to the EMS. In some embodiments, after receiving confirmation of the emergency response message, the EMS then initiates the autonomous communication session.

In some embodiments, as depicted by FIG. 5C, the EMS transmits one or more messages to the communication device 506 during the autonomous communication session, such as message 546. In some embodiments, the one or more messages are SMS text messages. In some embodiments, the EMS poses questions to the user of the communication device through the one or more messages. For example, in some embodiments, the EMS can pose questions to the user of the communication device regarding the user's location or the nature of the user's emergency. However, the EMS can pose a question of any nature to the user through the autonomous communication session. In some embodiments, the messages are transmitted to the communication device according to a predetermined script. For example, in some embodiments, the autonomous communication session is preconfigured to begin with two consecutive messages (as depicted by FIG. 5C): 1) "Hi, this is 911 Bot." and 2) "Is your current location [insert location associated with emergency alert]? Type "Yes" to confirm." In this example, after receiving a response from the user, the autonomous communication may be preconfigured to continue by sending a third message to the user asking the user if the they are in a life-threatening situation. In some embodiments, the sequences of messages transmitted to the user during the autonomous communication session is adapted dynamically based on responses received from the user. For example, in some embodiments, if the user indicates that they are in a life-threatening situation, the autonomous communication session may respond by prompting the user to find a safer environment, if possible. If the user indicates that they are not in a life-threatening situation, the autonomous communication session may respond by asking the user for more details regarding the emergency.

Figure 5D:
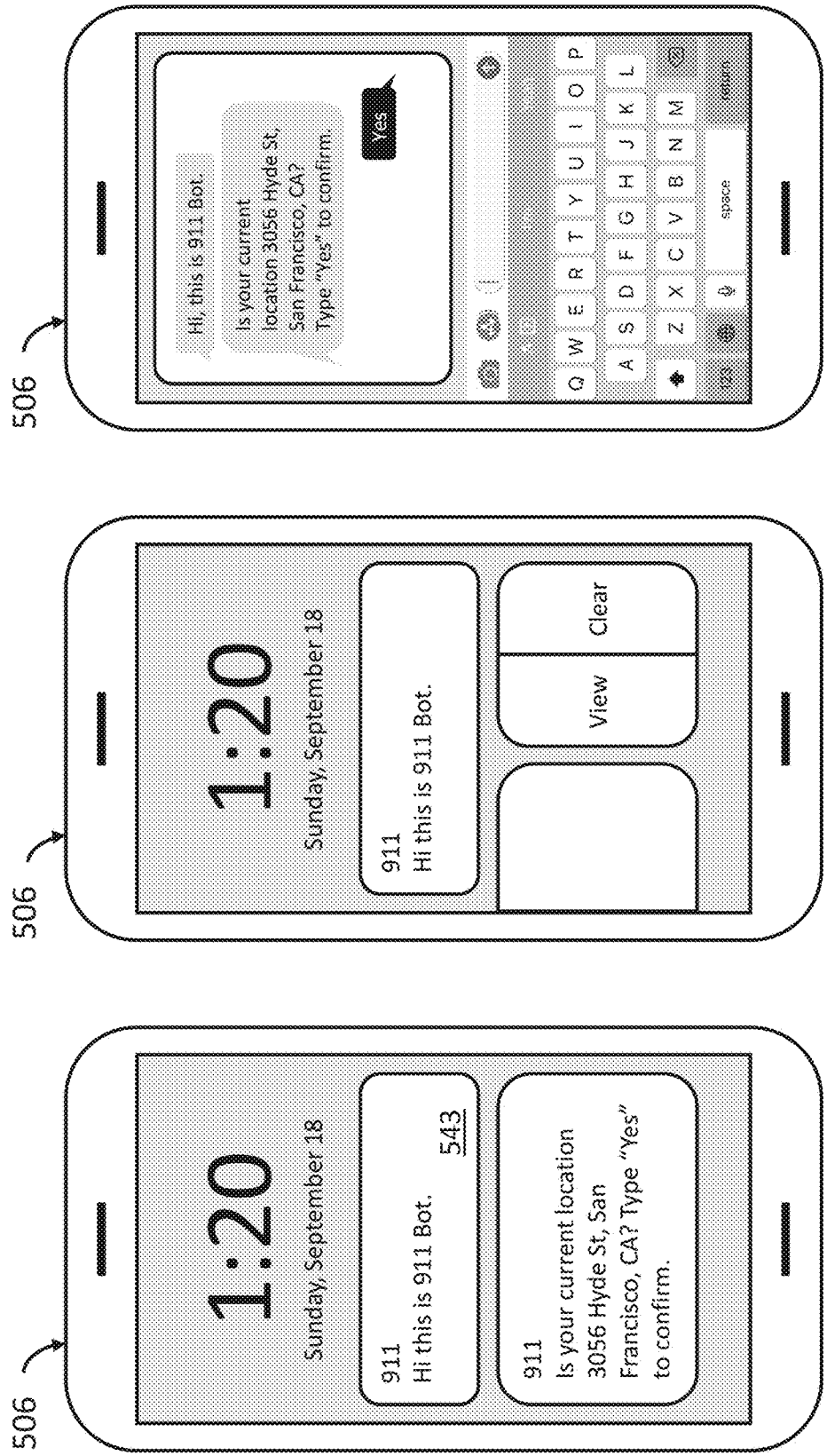

FIG. 5D illustrates an exemplary emergency response message and autonomous communication session in accordance with one embodiment of the present invention. As mentioned above with respect to FIG. 5C, in some embodiments, the EMS, in response to detecting an emergency or a potential emergency, can initiate an autonomous communication session with one or more communication devices. In some embodiments, as depicted by FIG. 5D, the EMS can initiate an autonomous communication session with a communication device 506 by transmitting an emergency response message to the communication device. In some embodiments, the emergency response message is an SMS text message 543. After the emergency response message is transmitted to the communication device 506, a user of the communication device can confirm the emergency response message. For example, in an embodiment in which the emergency response message is an SMS text message, a user can confirm the emergency response message by replying to the SMS text message with another SMS text message. For example, as depicted in FIG. 5D, the emergency response message includes an SMS text message that from 9-1-1 that reads "Is your current location 306 Hyde St., San Francisco, CA? Type "Yes" to confirm." In this example, a user can open the SMS text message and respond with an SMS text message that says "Yes."

FIG. 6A depicts a display of processed emergency feed at an emergency service provider (ESP) by the emergency assistance system (EAS). In some embodiments, EAS will gather one or more web content including an emergency indication that has been published on a social media network by a user. In some embodiments, each emergency is distilled into a data set associated that emergency. The data set includes a current location of a person requiring emergency assistance.

In some embodiments, the EAS provides an alternate communication pathway for emergency data to an ESP. The alternate communication pathway is for emergency data from social media and other sources to reach the appropriate ESP that is responding to the emergency. For example, the EMS may generate a processed emergency feed with web content for a particular ESP (e.g., a PSAP).

In some embodiments, the EAS gathers web content published on a social media network by one or more users including an emergency indication (also referred to as an "emergency post"). The web content may be one or more posts on a social media network by the same or several users. In some embodiments, the social media posts are public and can be viewed by everyone. In some embodiments, the social media posts are private and can be viewed by selected users.

In some embodiments, the EAS distills the web content with emergency indication into an emergency data set that can be shared with one or more ESPs that can provide emergency assistance. In some embodiments, the emergency data set comprises one location for the emergency. The location may be a physical address or x, y coordinates (z coordinates may also be available). In some embodiments, the location of the emergency may be the device-based hybrid location of the access device that generated the emergency post. In some cases, the location of the emergency is the geo-tagged location of the emergency post.

In some embodiments, the emergency data set comprises location of the emergency, a user identifier and an emergency type. In some embodiments, the user identifier is a user name or user handle and social media network identifier. In some embodiments, the emergency type comprises fire, medical, police, home, car, mass emergency, water rescue, etc. In some embodiments, the priority or urgency of the emergency is also included in the data set such as emergent or non-emergent, high-med-low, etc.

In some embodiments, a geofence for the particular ESP is retrieved, wherein the geofence encloses one or more geographical regions under the authoritative or administrative jurisdiction of the ESP. Here, the particular ESP is a 911 authority having the jurisdiction defined by the at least one geofence. In some embodiments, the geofence is retrieved from a geofence database (see 169 in FIG. 1B).

An exemplary processed emergency data feed is shown in FIG. 6A. The logged-in ESP user is depicted in 614. In some embodiments, the processed emergency feed 620 is generated wherein one or more emergency entries 621 are listed. When the ESP user clicks on an entry detailed information regarding the emergency can be viewed in the insert 629. The ESP user can also take one of a several action steps 631 such as "push to CAD", "Message", "Request Update", "Duplicate", "Add Comment", "Cancel Request", "Urgency", "Confidence", "Location verification", etc.

The terms "urgency" and "priority" refer to designations for prioritizing emergency response. Various different designations are contemplated including emergent/non-emergent, ambulance/non-ambulance, high-low priority, etc. In some embodiments, the ESP user may designate the urgency or priority for the emergency entry. In some embodiments, the EAS may designate a likely urgency or priority (e.g., low, medium, high) by analyzing various web content on social media network or other data sources.

In some embodiments, the EAS removes duplicates and consolidates emergency entries in the processed emergency feed as described in FIG. 7B. In some embodiments, the processed emergency feed is generated after obtaining information from other data sources, e.g., a user's other social media or other web content. Other types of processing is also contemplated such as summarization of audio or video content, removal of unverified information or outdated information, removal of other user's private information, removal of personal identifying health information, and any other processing needed to follow applicable laws and regulations.

In some embodiments, emergencies can be searched using the search box 612. The ESP user may search for a user name or user handle, a device identifier (e.g., IMEI number, IP address), a phone number, etc. The "Load more" 616 button can bring up historical emergencies.

In some embodiments, the processed emergency feed comprises near real-time data that is less than 15 minutes old. In some embodiments, the processed.

In some embodiments, the processed emergency feed comprises recent dynamic data comprising location data and sensor data. As dynamic data changes faster than static data (e.g., user data, demographics, etc.). Dynamic data that is more than 1 hour old is excluded from the processed emergency feed. In some embodiments, the emergency data set is updated with new or updated web content periodically.

The processed emergency feed is made accessible to and displayed at the particular ESP. For example, the processed emergency feed is displayed on a monitor in a PSAP. PSAP may monitor the feed for patterns and planning of emergency response.

Emergency Hotspots

In some embodiments, the map visualization of the processed emergency feed can be used for early detection of mass emergencies or natural disasters. In some embodiments, after a mass emergency is identified, the map visualization is used for determining the affected area. For example, a real-time or near real-time processed emergency feed could be used for early detection and impact area for an earthquake.

In some embodiments, the EAS may make special provisions for contacting appropriate ESPs when mass emergencies are triggered by natural disasters and man-made crisis hit throughout the globe. During mass emergencies, alternative communication pathways available through the EAS can save lives and increase efficiency of the emergency response. In addition to notifying users who may be in the affected area (sometimes, including a buffer region), the EAS may identify one or more appropriate ESPs for responding to the emergency and provide a processed emergency feed as shown in FIG. 6A to those ESP.

During a disaster, there may be several ESPs (agencies/organizations, ad hoc volunteers, etc.) responding to the emergency. Allowing plurality of ESPs involved in disaster relief with access to the "controlling" or "authoritative" processed emergency feed can be very helpful. In some embodiments, ESP personnel can mark of emergencies that have been responded to and keep other ESPs updated.

Figure 6B:
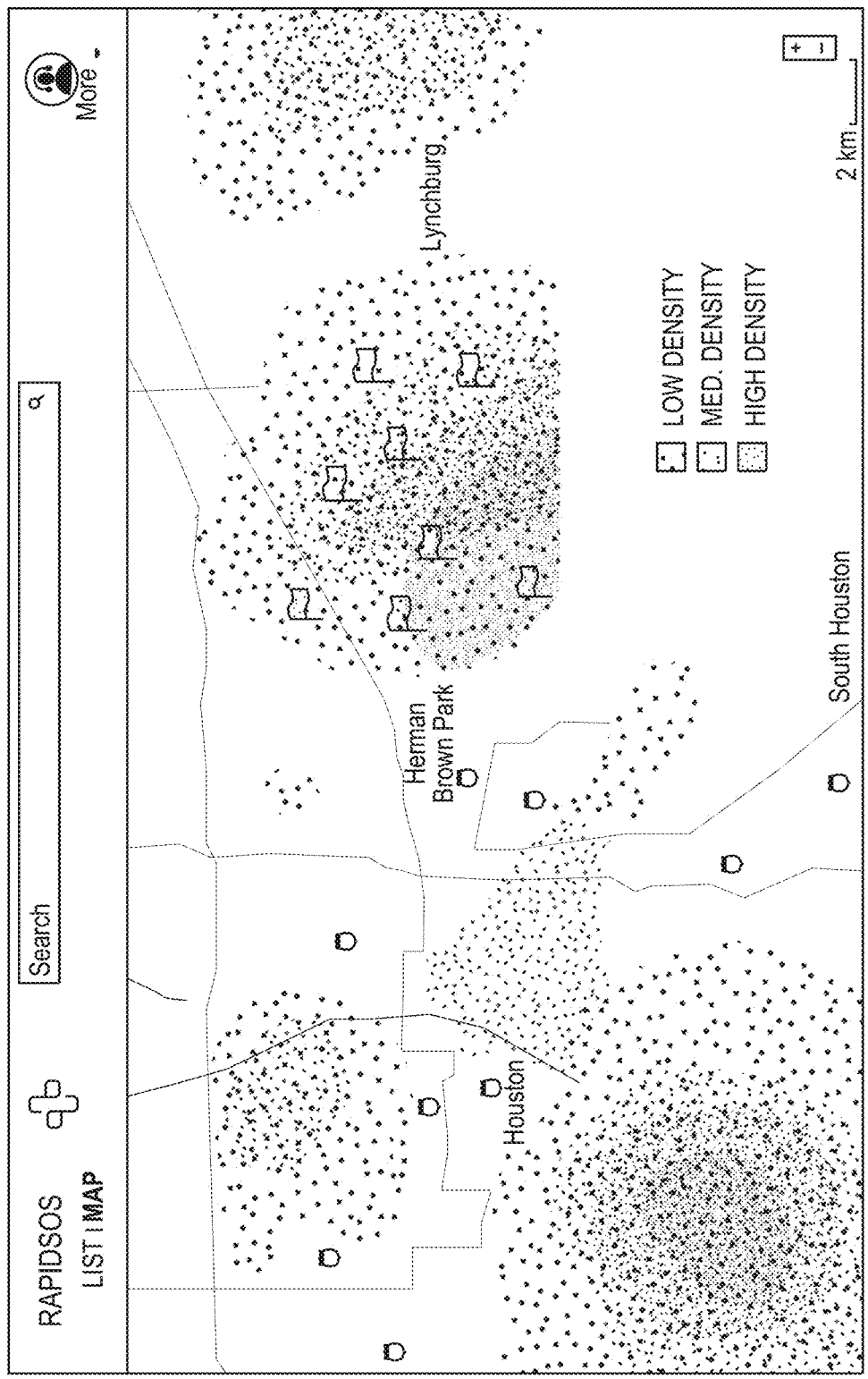
FIG. 6B depicts an exemplary screenshot of on-going emergencies on a geographical map.

In some embodiments, mass emergencies can lead to emergency hotspots that can be visualized as shown in FIG. 6B. In emergency hotspots, emergency resources can be diverted based on priority and updated processed emergency feed can be used for coordinating relief efforts. For example, many people may be stranded during severe flooding and relief efforts may be air dropping supplies like drinking water. If an accurate map of the area generated from the processed emergency feed is available, relief efforts available resources can be allocated based on priority level and type of emergency.

FIG. 6B depicts an exemplary screenshot of on-going emergencies on a geographical map. In some embodiments, the geographical map shows emergencies within the geofence of the viewing ESP. In other embodiments, the geographical map shows emergencies within the geofence and buffer of the viewing ESP to capture emergencies that are occurring on the boundaries. In some embodiments, the map may cover jurisdiction of several ESPs to capture a large-scale disasters or emergencies spread over various jurisdictions.

Although not shown, an ESP user can click on an emergency (marked by flag symbols) and view an inset with detailed information about the emergency (as shown in 629 in FIG. 6A).

In some embodiments, the emergency entries are displayed as a heat map, where emergencies may be depicted in different color based on priority or urgency).

As shown, the flags mark the exact location of the emergency and may have different colors based on the urgency ((High-Med-Low). The shading pattern may correspond with the density of emergencies in an area and may be designated by different colors. In some embodiments, different types of emergencies (fire, medical, police, etc.) may be designated by different colors.

In some embodiments, the map is updated in real-time or near real-time (e.g., every minute, every 10 minutes, every 30 minutes). As described above, the map may aid in early detection of mass emergencies, determining the affected area and allocation of emergency resources.

FIG. 7A illustrates an exemplary EDC (e.g. public-safety answering point (PSAP)) call-taking display 602, in accordance with an exemplary embodiment of the present disclosure. In some embodiments, a public-safety answering point (PSAP), sometimes called "public-safety access point", is a call center responsible for answering calls to an emergency telephone number for police, firefighting, and ambulance services.

As shown in FIG. 7A, the EDC display 602 may include various components such as call/audio controls 607 (e.g., ready 611-1, release 611-2, drop 611-3, hold 611-4, assign 611-5, and redial 611-6, ALI display 610), other tools 606, enhanced data 614 (in various tabs), and a list of recent calls 616.

In an embodiment, the PSAP comprises a user interface/display (GUI) 602 that graphically displays the emergency data that is provided to the EDC.

Apart from caller information in tab 618-1, the EDC display 602 can also include emergency data in additional tabs such as, location information 618-2 (for detailed location information), services 618-3, and social media 618-4 (exemplary data depicted). In some embodiments, the social media tab comprises a user profile, profile picture, a user name or handle, a social media network identifier, and last status update. It is understood that the EDC display interface 602 may be vary between various jurisdictions and meant to be exemplary, and not exhaustive.

Weblinks for Location Data & Additional Data

In some embodiments, ESPs (emergency dispatch centers and/or emergency responders) may access additional information pertaining to an emergency by copying and pasting or typing a web link provided by the system into a standard web browser. For example, a member of an ESP can navigate to a web site associated with the web link where additional information regarding the pertaining to the emergency is displayed. In some embodiments, the web link is provided by the system to a PSAP through a standardized Automatic Location Information (ALI) display integrated into the preexisting PSAP communication system. In such an embodiment, the web link may be provided using a portion of the limited number of characters (e.g., 512 characters in many ALI displays) contained in the ALI display. The additional information may include but is not limited to: device-based location, sensor based location, location coordinates, WiFi access points, GPS coordinates, cell tower triangulation, barometric pressure, radio frequency signals, real-time sensor data, demographic data, pre-existing health information, emergency contacts, multimedia, social media information, weather data, and environmental data. The additional information may pertain to an individual emergency call or a large-scale emergency event.

In some embodiments, the system generates a web link in a standardized format that may make the URL shorter in order to encompass less characters, easier to memorize, or simpler to type. For example, in some embodiments, the system may generate a web link that includes the name or phone number of the PSAP to which the web link will be provided (e.g., www.CollierCounty911.515-340-2225.org). In some embodiments, the web link may include the phone number of the PSAP to which the web link will be provided without characters in between the digits of the phone number (e.g., www.CollierCounty911.5153402225.org). In some embodiments, the web link may include the phone number of a person who has dialed an emergency number (e.g., 9-1-1) and been directed a PSAP (in many cases, the number of the person who has dialed 9-1-1 is already included in an ALI display). Because the ALI system display is only capable of displaying a limited amount of information regarding an emergency, the web link (and associated website) can serve as a valuable source of additional information that may aid an emergency responder in responding to an emergency.

In some embodiments, the weblink is provided to the dispatch center or PSAP through a website or web application accessed through a PSAP device. In some embodiments, the weblink is provided to the dispatch center or PSAP through a computer aided dispatch (CAD) system installed on a PSAP device. For example, the weblink may be a clickable link or embedded into a button presented through the website, web application, or CAD system. In some embodiments, wherein the weblink is provided a dispatch center or PSAP through a website or a web application, the selection of the web link by a PSAP personnel opens a new website in a new window or new tab of an internet browser installed on a PSAP device. In one illustrative example, a witness of a car accident calls 9-1-1 and concurrently begins recording a video of the car accident on their mobile phone. The EAS subsequently receives the video from the mobile phone. A 9-1-1 call taker at a PSAP receives the call from the witness through a call handling application installed on the call taker's PSAP computing device. The PSAP computing device then transmits an identifier of the call (e.g., the phone number associated with the witness' mobile phone) to the EAS. The EAS identifies the video of the car accident as being associated with the identifier of the call and, in response, presents a button within a web application or CAD system running on the call taker's PSAP device that the call taker can select to access the video of the car accident. The button is embedded with a web link that directs to a website where the video of the car accident is hosted. The call taker can then select the button and access the video of the car accident, thereby receiving additional information pertinent to the car accident that the call taker can use to more effectively respond to the emergency.

In some embodiments, a web link provided by the system is disabled, or the website to which the web link directs is deleted, after a threshold period of time from which the web link was generated or delivered to its intended recipient. For example, referring again to the car accident example described above, the website hosting the video may expire after a predetermined period of time (e.g., 24 hours). In some embodiments, the web link, or the website to which the web link is directed, expires for security or privacy purposes. In some embodiments, a web link provided by the system may additionally or alternatively be delivered to an electronic device associated with an emergency responder through a radio text message, an SMS message, a data message, or voice communication.

With respect to live video feeds, advances in telecommunications (e.g., 5G cellular data connections) are allowing real-time streaming and processing of video feeds. In some embodiments, the weblink comprises a link to live video feed. In some embodiments, the weblink comprises a link to a historical video feed.

In some embodiments, the processed emergency feed (depicted in FIGS. 6A & 6B) and the ESP displays (depicted in FIGS. 7A &7B) comprises one or more weblinks. In some embodiments, the weblink is a link to an expiring audio or video feed. There are several advantages for providing additional data via a weblink. In some embodiments, the audio or video feed may be live or historical.

There are several advantages for providing additional data via a weblink. The weblink can link to a secure third-party server where the audio, image or video data is saved. In some embodiments, the audio or video feed expires within a particular time after which it will be deleted. In some embodiments, the audio or video feed expires within 5 minutes to 24 hours. In some embodiments, the live feed expires within 30 minutes.

Using the weblink, the ESP user is not overwhelmed with extraneous data and can decide to view the data if they think it will be helpful for the response. In some cases, some additional data (e.g., images of the fire) may be helpful for emergency responders and not for ESP call takers. In some embodiments, the video feeds are summarized with a narrative and key frames to aid the ESP user to make a determination regarding its relevance. In some embodiments, audio feeds are summarized with a narrative and key In one illustrative example, when a likely emergency is detected, the EAS may generate a web link for location data (including historical locations) or to additional information (e.g., info about the victims, video feed from the location, medical data, etc.) may be inserted in an emergency response communication to a dispatch center or PSAP. The web link may be a web address link (or IP address) in the ALI. In some embodiments, the EAS may send a text message to a digital radio so that an officer could use their personal device to go to a web address to access the information. In some embodiments, intelligent algorithms could weigh the quality of the additional data and the communication means available for a given agency, and determine if, when & how to transmit web links to additional data.

FIG. 7B illustrates a screenshot of an exemplary mapping interface of social media alerts at an ESP. In some embodiments, the present disclosure enables to provide a user interface which displays emergency alerts based on social media web content with other proximal emergency alerts. As shown, each emergency alert 768-1, 768-2, 768-3, 768-4, 768-5 are shown on a geographical map.

In some embodiments, a social media search box 734 enables to search for the location of a user who has posted a content indicative of emergency on the social media or indicated that they need help (e.g. pressed a panic button) on a social media site. It is contemplated that a user names or handles, user's name, phone number, etc., can be used in the search box 734. Once an ESP personnel/user clicks on a particular emergency alert, detailed information is displayed in box 732.

As depicted, the emergency alert can be viewed (e.g., social media source, user identifier/handle, time stamp, nature/type of emergency, last location). In some embodiments, the emergency data comprises emergency type, emergency status, identifying information about one or more persons requiring emergency assistance, medical information, contact information, social media activity, an image from the emergency, an audio from the emergency, a video feed from the emergency, location co-ordinates for the emergency, or any combination thereof.

In some embodiments, the interface may display images such as the profile picture on the social media network, which may be downloaded or viewed. As depicted, a weblink to a live video feed is also available for the ESP user to click on.

Redundancy Rules

In some embodiments, emergency alerts obtained from social media web content are processed to remove redundancy by using one or more rules. An exemplary rule is that fire emergencies are usually reported by multiple users, which may be approximated by using a multiplier. In some embodiments, the multiplier is between 2-30. In some embodiments, the multiplier is between 2-10. In some embodiments, the multiplier is 3. In some embodiments, the multiplier may vary depending on the population density (e.g., urban, sub-urban or rural). In some embodiments, the multiplier may be higher when it is on a roadway as compared to on a non-roadway. In some embodiments, a redundancy rule is used to flag two or more reports of an emergency (e.g., user reported emergency found in web content posts on social media, emergency calls, etc.). In some embodiments, the redundant content or posts are consolidated and/or removed when they are flagged by a redundancy rule. An example of a redundancy rule is one that flags posts or alerts that (1) share a minimum number of emergency indicators (e.g., "fire" and "help" keywords found in the same post/content may be a set of keywords associated with a fire emergency), (2) are posted/reported in proximity based on location, (3) are posted/reported in proximity based on time, (4) are made by the device or person (e.g., same person uses two different devices that both are determined to belong to him/her), (5) or any combination thereof. For example, posts/alerts may be flagged as redundant if they are made within 10 minutes of each other and the devices used to make the posts/alerts are determined to be located within 500 yards of each other and/or the emergency location).

As shown, an emergency alert 768-5 may be viewed in relation to proximal emergency alerts 768-1, 768-2, 768-3, 768-4. As alert 768-5 is a fire emergency, a multiplier of 3 is used for removing redundancy in a less densely populated area. As a result, proximal alerts 768-3 and 768-4 may be designated as duplicates and merged into one emergency entry into a processed emergency feed as depicted in FIG. 6A. In a highly populated area, a multiplier of 5 or more is used for removing redundancy, in which case alerts 768-1 and 768-2 are also designated as duplicates. It is possible that users travelling on the highway 730 were able to see the fire and also reported it.

Accessing images and video feed from the fire may be particularly helpful for responders as they respond to the emergency. In some embodiments, a responder device (e.g. device 366 in FIG. 3) may include a mapping interface similar to the one depicted in FIG. 7B. In some embodiments, a responder may be able to use the search feature to search for emergencies near her location. In some embodiments, the responder can use his or her device to access the emergency registry for a specific emergency (e.g. a particular hurricane). In some embodiments, the responder can access detailed information by clicking on specific emergencies. In some embodiments, the responder can mark the response status of a specific emergency as "Dispatched", "Emergency Assistance Provided", "Cancel Emergency", "Emergency Status Changed", "Persons Rescued", "One person has been taken to a shelter, but the pet has to be rescued", etc.

Emergency Planning & Resource Management

In some embodiments, emergency planning may be done on a city or state-wide area composed of several PSAP areas. In many cases, a PSAP may not be in communication with other PSAPs about on-going emergencies and management of resources on a real-time basis. A map-view with several PSAP areas could be generated to be able to monitor emergencies in other areas in real time in order to better plan and anticipate emergencies within a specific area or jurisdictions. For example, the impact of the storm may give a sense of the severity of emergency situations that may occur within the area that is on the path of the storm. In some embodiments, emergency resources such as ambulances, fire trucks from one PSAP area could be redirected to another PSAP area, which has been severely affected. Also, emergency calls could be re-directed in a real-time basis when the phone lines are down or busy for a particular PSAP.
Emergency Registry In some embodiments, the EAS may create a list of people implicated in the same emergency situation (e.g., a shooting, an earthquake, a hurricane, a wildfire, etc.). The list (also referred to as an "Emergency Registry" or "registry") could be specific to a natural disaster, to an area (PSAP, county, city, state, nation) or even a particular type of emergency (e.g., Zika virus), etc. The Emergency Registry may include names, numbers, current locations, personal emergency levels (e.g., stuck on a roof being medium vs. cardiac arrest being high), how many people they're with, etc.). In some embodiments, the Emergency Registry is contemplated to be a centralized location for anyone (e.g., emergency responders, local volunteer responders, family members) to find people in danger.

During natural disasters, the emergency services may be over-subscribed and it may be difficult for people in an emergency to get help through normal channels (e.g., 911 calls). This problem may be exacerbated by bad cellular connections experienced by some areas. In such situations, the Emergency Registry may allow people who need emergency assistance may reach out for help through social media or other channels. In some embodiments, the Emergency Registry could be used by others (e.g., loved ones) to check on people who may be affected by the emergency. In some embodiments, users may be given access to privileged or limited information based on their authorization level. Thus, the Emergency Registry could give differential access to information depending on the authorization level of the user who is viewing.

In some embodiments, the Emergency Registry could be used for early detection or determining an impact area for a natural disaster or epidemic through use of a mapping interface. In some embodiments, the Emergency Registry could be used for Emergency Resource Management.

In some embodiments, when an emergency hashtag is determined, whoever uses the hashtag on a social media app is prompted by the social media app to register on the Emergency Registry and also register anyone they might be with (e.g., a child, a pet, etc.). In some embodiments, when a social media platform prompts a user to mark themselves as safe, the social media platform also prompts the user to register on the Emergency Registry. In some embodiments, a social media app may automatically populate the Emergency Registry with a user's information, such as name, number, location (if provided by phone) after the user selects to register. In some embodiments, the use of a hashtag associated with an emergency by a user may give permission for the location and other personal information of the user to be accessed by the social media platform and be shared with ESPs. In some embodiments, users can navigate to the registry using a URL and input info manually. In some embodiments, the Emergency Registry can be delivered to PSAPs or emergency responders' devices (e.g., an "Emergency Registry" tab in a PSAP display as shown in FIG. 6). In some embodiments, entries into the Emergency Registry are listed in a distilled emergency feed provided to emergency service providers, as depicted in FIG. 6A. In some embodiments, when a user registers on the Emergency Registry after being prompted by a social media platform, the source of the entry displayed in the distilled emergency feed is the social media platform. In some embodiments, when a user registers on the Emergency Registry directly (e.g., without being prompted by a social media platform, such as by accessing the Emergency Registry through a mobile application or a web browser), the source of the entry displayed in the distilled emergency feed is the Emergency Registry, as depicted in FIG. 6A.

In some embodiments, the Emergency Registry can take locations and emergency levels to create "hotspots" (also referred to as "prioritized zones")—locations with a high number of people with high personal emergency levels. In this way, the EAS or the emergency dispatch centers may prioritize and plan the emergency response. In some embodiments, the Emergency Registry may be integrated into other emergency services, such as a government provided emergency network (e.g., FirstNet). In some embodiments, the Emergency Registry may be integrated with a Social Media Operations Center. In some embodiments, users can also upload image or video to the Emergency Registry.

For example, Person A cannot contact their grandmother, who's trapped at the grocery store. Person B is at the grocery store with grandma and registers her as safe. Person A searches for grandmother in the registry, sees that she's safe, and sends a confirmation that delivers a notification to Person B's phone. Person B can tell grandma that Person A knows she's safe.

As depicted in Table 1, in some embodiments, after parsing and analyzing one or more social media posts and determining that an emergency event has occurred, the system can generate an emergency registry for the determined emergency event. In some embodiments, the emergency registry consists of a list or ledger of persons implicated in an emergency event, as depicted below in Table 1. The emergency registry may include a series of entries, wherein each entry includes information pertaining to one individual person implicated in the emergency event. In some embodiments, the information may include, but is not limited to: the first and last name of the individual, the middle name of the individual, a phone number associated with the individual, a location associated with the individual, whether the individual registered themselves or if the individual was registered by another, who registered the individual (if applicable), the type of device used to register, and an emergency level of the individual. In some embodiments, the emergency registry may be accessed through a social media platform, via a URL in a web browser, or through a separate mobile application installed on an electronic device (e.g., a mobile phone), as described below.

In some embodiments, after determining that an emergency event has occurred and generating an emergency registry for the determined emergency event, the system can prompt one or persons to register on the emergency registry. For example, in some embodiments, as discussed above, the system can automatically determine that an emergency event has occurred by parsing and analyzing one or more social media posts posted by one or more users of a social media platform. In this example, after determining that an emergency event has occurred and generating an emergency registry for the emergency event, the system can deliver a prompt to register to the one or more users of the social media platform who posted the one or more social media posts. In some embodiments, the system can determine a location for one or more of the one or more users of the social media platform (e.g., the social media platform records a location of a user when the user publishes a post) and a location radius of the emergency event. The system can then determine which of the one or more users of the social media platform are located within the location radius of the emergency event and deliver prompts to register to only those users. In some embodiments, the system can identify one or more additional users of a social media platform who did not post the one or more social media posts who may be implicated in the emergency event. For example, the system may identify one or more additional users of the social media platform who have listed their current city, state, or country as the city, state or country in which the emergency event has occurred. For another example, the system may identify one or more additional users of the social media platform whose current locations fall within the location radius of the emergency event (e.g., the social media platform has received current locations from those users). The system can then deliver prompts to register to the one or more additional users of the social media platform. In some embodiments, the system can access a mobile application installed on an electronic device associated with a user to determine a location of the user. If the location of the user falls within the location radius of the emergency event, the system can deliver a prompt to register to the user through the mobile application.

Figure 8A:
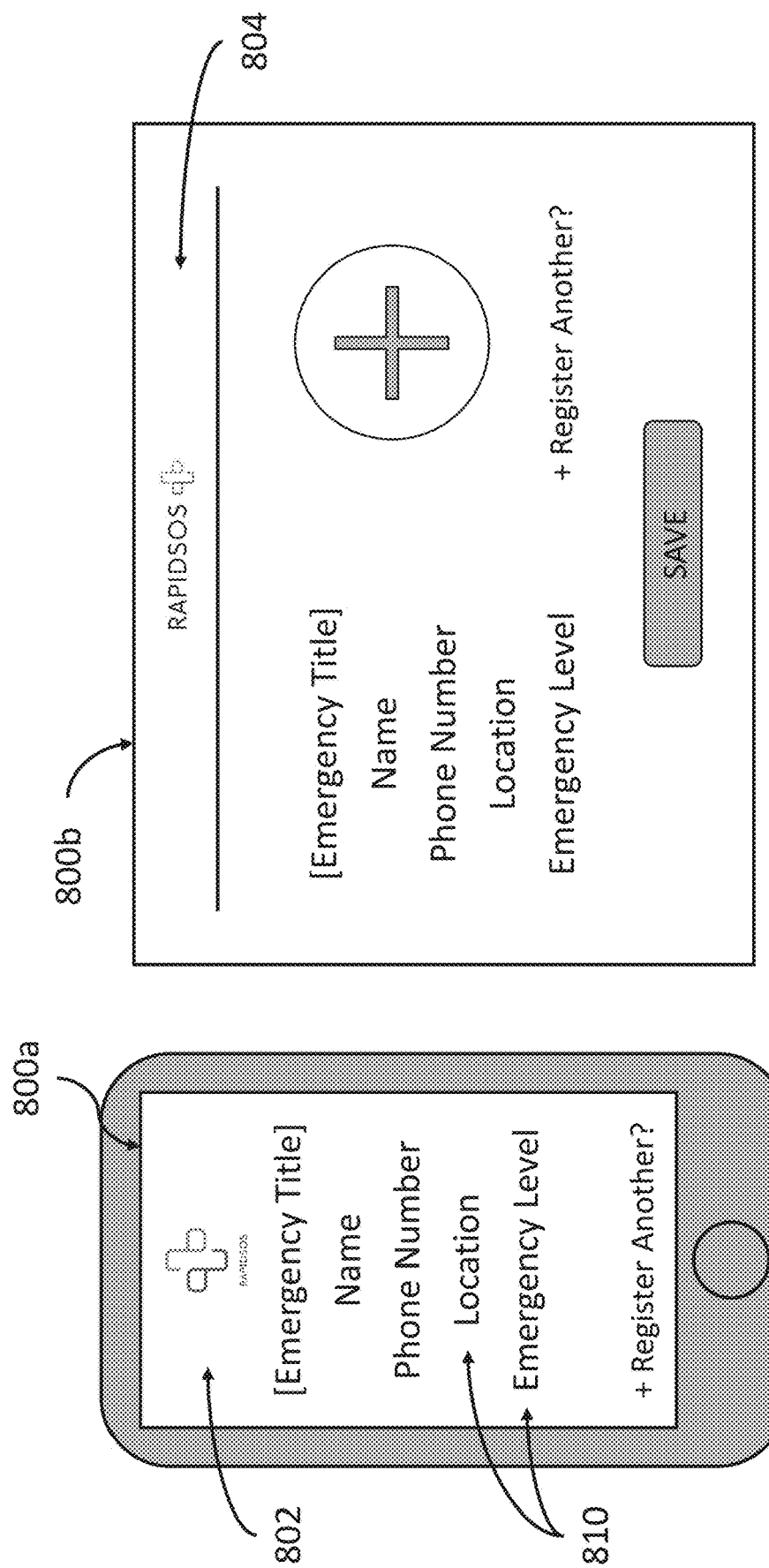
FIGS. 8A & 8B illustrate embodiments of the emergency registry.
Figure 8B:
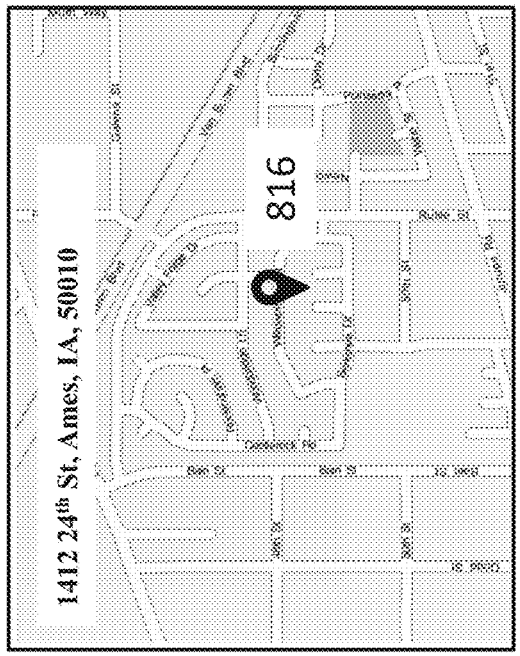

FIGS. 8A and 8B depict exemplary embodiments of an emergency registry application 800 that can be used to register in an emergency registry, in accordance with some embodiments of the present invention. In some embodiments, the emergency registry application presents a graphical user interface (GUI) through which a user can register themselves or another in an emergency registry. In some embodiments, if a user selects to accept a prompt to register, the user may be routed directly to the emergency registry application. In some embodiments, a user may access the emergency registry directly (i.e., without receiving or accepting a prompt to register) by navigating to the emergency registry application 800 via a URL in a web browser 804 (as depicted by emergency registry application 800b) or through a separate mobile application 802 installed on an electronic device (as depicted by emergency registry application 800a). In some embodiments, as depicted by FIG. 8B, the GUI of the emergency registry application 800c includes entry fields 810 through which users can submit information regarding their emergency. The information can include, but is not limited to, any of name, emergency type, phone number, email, location, location description, emergency description, and additional comments. In some embodiments, the GUI of the emergency registry application includes a map 806 that depicts the user's location 816, as depicted by FIG. 8B. In some embodiments, the GUI of the emergency registry includes a submit emergency button 814 that a user can select to submit their registration on the emergency registry after inputting information regarding their emergency.

In some embodiments, after accessing the emergency registry, the user may register by creating an entry in the emergency registry and providing the necessary information pertaining to the person implicated in the emergency event, as described above. For example, a user may register by inputting their first and last name, their phone number, their current location, and their emergency level (e.g., if they are safe, or if they are in low danger, medium danger, or high danger), as depicted in the Table 1. The system may automatically record the time that the user registered or accessed the emergency registry. In some embodiments, the system may automatically create a new entry when a user accesses the emergency registry. In some embodiments, some or all of the information pertaining to the person implicated in the emergency event may be automatically populated by the system. For example, in some embodiments, if a user accesses the emergency registry through a social media platform (e.g., the system delivers a prompt to register to the user through the social media platform and the user accepts the prompt to register and is subsequently routed directly to the emergency registry), the system may extract the name, phone number, and location of the user from the social media platform and automatically populate those fields in the emergency registry entry. In another example, in some embodiments, if a user accesses the emergency registry through a mobile application installed on an electronic device, the user may have previously entered their information into the mobile application or the electronic device, and the system may extract the information from the mobile application or the electronic device. In some embodiments, the system may only allow a user to manually input a subset of the information pertaining to the person implicated in the emergency event, while the rest of the information is automatically populated. For example, in some embodiments, the system may only allow a user to manually input their emergency level. By restricting the information that a user may manually input, the system can ensure that fake, incorrect, or otherwise misleading information is not recorded in the emergency registry.

TABLE 1

Exemplary Emergency Registry

| Reg. No. | Time/Day | First | Last | Phone No. | Location | E. Level |
|---|---|---|---|---|---|---|
| 1 | 11-30-17 15:06:43 | Jane | Doe | (111) 222-3333 | 345 Green Ave, Brooklyn, NY | Low |
| 2 | 11-30-17 15:06:43 | John | Doe | (111) 222-3434 | 345 Green Ave, Brooklyn, NY | Low |
| 3 | 11-30-17 15:12:23 | William | Carter | (121) 444-5555 | 122 Forest St, Brooklyn, NY | Safe |
| 4 | 11-30-17 15:16:48 | Rebecca | Williams | (121) 333-4444 | 389 Broad St, Brooklyn, NY | High |
| 5 | 11-30-17 15:25:18 | Jessica | Williamson | (111) 212-1212 | 122 Forest St, Brooklyn, NY | High |
| 6 | 11-30-17 15:27:21 | Martin | Green | (111) 123-4567 | 491 Grand St, Brooklyn, NY | High |

In some embodiments, the system may allow a single user to register multiple persons in the emergency registry. For example, in some embodiments, a woman implicated in an emergency event may register on behalf of both her and her husband, and her and her dog. For another example, if an earthquake strikes a city and a man with a smartphone and an unrelated elderly woman without a smartphone are trapped in an elevator of a building, the man may register on behalf of himself and the elderly woman on his smartphone. In some embodiments, the system may allow multiple persons to be registered in a single entry. In some embodiments, the system may require that a single entry include only a single person implicated in an emergency event. In some embodiments, when a user registers multiple persons in a single entry, the system may automatically create a separate entry for each of the persons registers in the single entry. In some embodiments, after a user completes an entry in the emergency registry, the system may prompt the user to create an entry for another person implicated in the emergency event.

Figure 9:
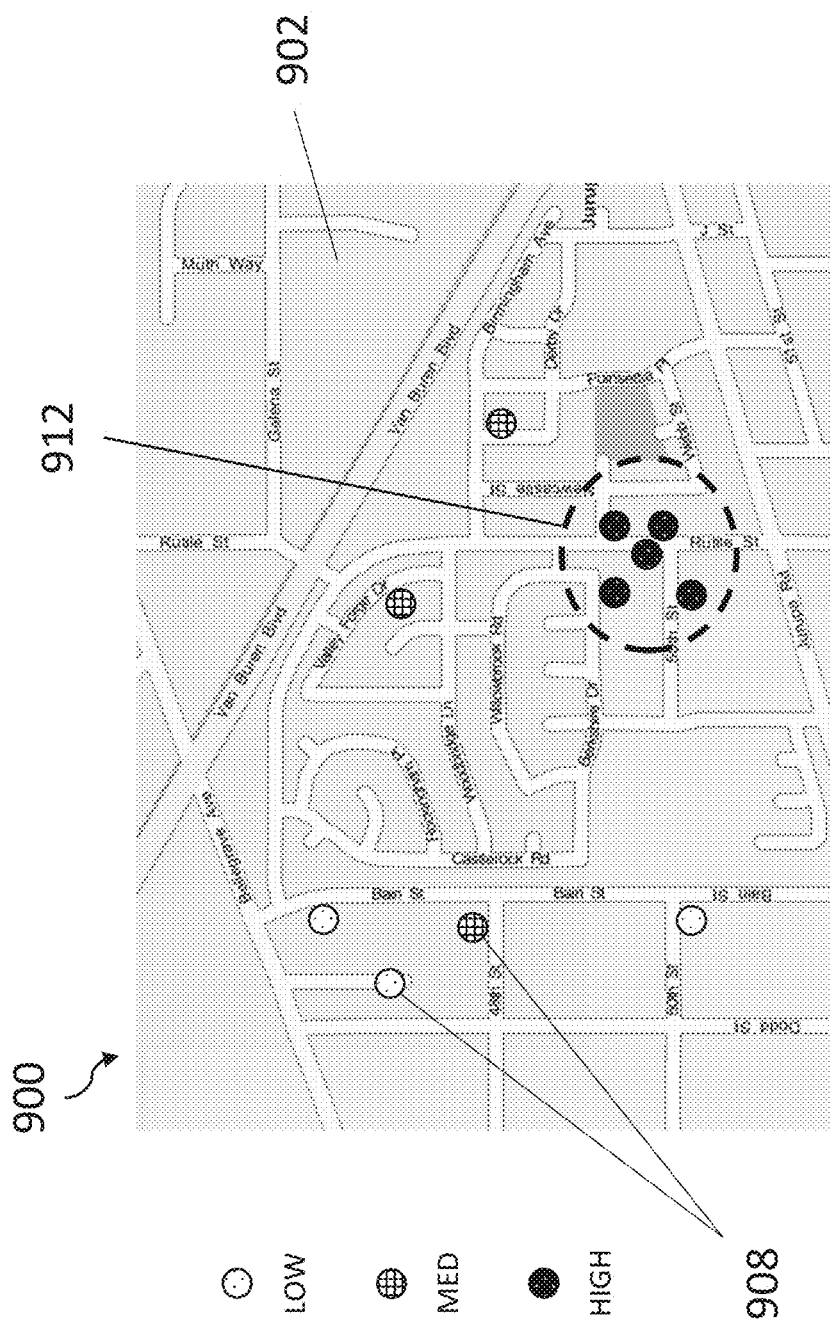
FIG. 9 illustrates a dynamic and real-time emergency map of an emergency event from an emergency registry generated for the emergency event.

As depicted in FIG. 9, in some embodiments, the system may generate a dynamic and real-time emergency map 900 of an emergency event from an emergency registry generated for the emergency event. For example, in some embodiments, the system may create an emergency map by overlaying an indicator 908 of the location each of the entries recorded in an emergency registry atop a map 902 encompassing the location radius of the emergency event for which the emergency registry was created. The system may dynamically update an emergency map 900 with new indicators as new entries are recorded in an associated emergency registry in real-time. In some embodiments, in addition to indicating the location of an entry, the indicator may also indicate the emergency level of the entry. For example, an indicator may be colored according to the emergency level of the entry the indicator represents (e.g., green for safe, yellow for low danger, orange for medium, and red for high). In some embodiments, the system may identify priority zones 912 on the emergency map. Priority zones 912 may be areas within a location radius of an emergency event with relatively higher concentrations of entries with relatively higher emergency levels. An emergency map 900 may be accessible to emergency responders.

In some embodiments, an emergency registry may be accessible by various parties (e.g., the public or emergency responders) with differential levels of access. In some embodiments, in addition to being able to access an emergency registry to register, members of the public may be able to access the emergency registry to search for individuals registered in the emergency registry. For example, in some embodiments, a user may access the emergency registry and search for another user by inputting a name (e.g., first name and last name) or a phone number. If the query matches one of the entries in the emergency registry, the system may display the information pertaining to the person implicated in the associated emergency event recorded in the entry. In some embodiments, the system may limit the access of members of the general public to a limited view of information pertaining to persons implicated in an emergency event recorded in the emergency registry. For example, in some embodiments, if a query by a member of the general public matches an entry in an emergency registry, the system may display a last name and nature of emergency person implicated in the associated emergency event for which the entry was recorded and withhold access to additional information such as the location and phone number. In some embodiments, an anonymized version of the emergency registry is accessible (e.g., a location and nature of emergency is visible without identifying details).

In some embodiments, the system may only provide full access to information recorded in an emergency registry to authorized emergency responders. The system may check credentials of the requesting party (e.g., provided during log-in, registration or a verification process) and return data based on validity of the credentials, level of access granted, etc. In some embodiments, the requesting party is prompted to verify his or her identity before emergency data is available. For example, a two-step verification (use of a temporary code) can verify the identity of the requesting party.

The system may determine an authorization level of a user who accesses an emergency registry before returning any information recorded in the emergency registry in response to a query from the user. In some embodiments, an emergency responder may access an emergency registry by selecting a web link provided to a PSAP, as discussed above. In some embodiments, emergency responder who accesses an emergency registry using a web link provided to a PSAP may be automatically authorized and granted full access to information recorded in the emergency registry by virtue of having accessed the emergency registry via the web link.

FIG. 10 illustrates an exemplary user interface for reporting an emergency using an alternate pathway to an ESP (e.g., a PSAP). In some cases, a user of a social media network may wish to report an emergency to an EDC based on another user's post regarding an emergency situation (e.g. a fire in a building). In this case, Michael Miller is reporting the emergency on behalf of John Doe (Twitter username handle @johndoe77). As shown, user interface 1066 can be used to report emergency data to ESP systems by entering information in section 1040. In this example, the emergency data may be viewed through ALI as simulated in section 1050. In some embodiments, the emergency data may be reported through alternate pathways by provisioning in ALI, NG911 or other emergency databases. As discussed above, an alternate pathway to report an emergency to an ESP provides an alternative to traditional emergency lines (e.g., 911, 112).

Some inputs may be required for activating the alternative pathway for reporting emergencies. In some embodiments, some inputs in 1040 may be required to for the alternate pathway for reporting emergencies. In some embodiments, location of the emergency is required for the alternative pathway. In some embodiments, location of the emergency, name of person in the emergency, nature of the emergency may be required. The location may be submitted as lat-long coordinates.

In some embodiments, the user interface 1066 provide a plurality of options for the user that may include but are not limited to reporting a new emergency 1022 (tab content is shown), updating an existing emergency 1024 and checking status of the emergency 1026. The selection of the new emergency enables the user to provide details of any emergency situation around to the appropriate ESP along with details associated with the emergency. The selection of the update an existing emergency enables the user to update the details associated with the existing emergency situation along with the details associated with the changes in the existing situation of the emergency. The selection of the checking status of the emergency enables the user to check the current status of the emergency either posted by him or by any other user, which may include response updates.

In some embodiments, two or more participants may be added to an emergency conference call on the emergency conference bridge. A customer service representative at an organization's operations center is contacted first and added to the communication bridge. Then, the "emergency contact" or "associated contact" is called and if they choose to connect to an EDC, an ESP personnel is called and connected to the communication bridge.

In some embodiments, the participants in an emergency call are selected from a user, an associated contact, an emergency contact, a organizational representative, a customer service representative, an ESP personnel. In some embodiments, the emergency conference session is a three-way conference call including a user, a corporate representative and a PSAP operator.

When network trouble begins, the two-way audio for the emergency session may get disrupted. Then, the EMS 404 may maintain the link with the EDC 450 in a one-way audio session (link 426) in order to continue the current emergency session. In many cases, if a new session is started, the user 408 may be connected with another ESP personnel, who will have to be brought up to speed regarding the emergency losing precious minutes. However, in this way, the specific ESP personnel may be informed to stay on the line using a text-to-speech message, while the EMS 404 attempts to reconnect with the user 408.

Although the proposed system has been elaborated as above to include all the main modules, it is completely possible that actual implementations may include only a part of the proposed modules or a combination of those or a division of those into sub-modules in various combinations across multiple devices that can be operatively coupled with each other, including in the cloud. Further the modules can be configured in any sequence to achieve objectives elaborated. Also, it can be appreciated that proposed system can be configured in a computing device or across a plurality of computing devices operatively connected with each other, wherein the computing devices can be any of a computer, a laptop, a smartphone, an Internet enabled mobile device and the like. All such modifications and embodiments are completely within the scope of the present disclosure.

As used herein, and unless the context dictates otherwise, the term "coupled to" is intended to include both direct coupling (in which two elements that are coupled to each other or in contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

While some embodiments of the present disclosure have been illustrated and described, those are completely exemplary in nature. The disclosure is not limited to the embodiments as elaborated herein only and it would be apparent to those skilled in the art that numerous modifications besides those already described are possible without departing from the inventive concepts herein. All such modifications, changes, variations, substitutions, and equivalents are completely within the scope of the present disclosure. The inventive subject matter, therefore, is not to be restricted.

Certain Terminologies

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Geofence approximations that may be submitted as an "authoritative jurisdiction" for an ESP. One or more geofences enclose the geofenced region which is under the authoritative jurisdiction of an ESP. In some cases, the geofenced region may be a complex polygon, but it may be approximated using an appropriate shape. For example, a rectangle (A), two disjointed rectangles (B, B'), a polygon with several sides (C) and a triangle (D), may represent different geofenced regions (defined by one or more geofences).

As used herein, a "user" refers to one or more person or persons associated with a system, server, or device (e.g., electronic device, communication device, mobile phone, smartphone, computer, etc.). In some embodiments, a device associated with a user is a device carried or worn on the person of the user (e.g., a phone or wearable device). In some embodiments, a device associated with a user is not carried or worn on the person of the user (e.g., a home security sensor or camera installed in the home of the user, a vehicle tracking system installed in a vehicle of the user, etc.).

As used herein, an "account" refers to contact information for a user, including emergency contacts of the user. In some embodiments, the account is registered by the user to include a list of contact information for the user such as, for example, a list of associated devices. Examples of contact information on an account include phone number, email address, home address, work address, emergency contacts (e.g., name, phone number, email, etc.), and associated devices (e.g., other communication devices of the user aside from the device or triggering device sending an emergency alert). In some embodiments, the account includes contact information for organizational representatives. For example, in some cases, a social media application installed on the user's electronic device is used to send an emergency alert. The communication session can be established with the user/user device, emergency service provider personnel, and an organizational representative for the social media entity. This scenario can occur when analysis of the user's social media activity indicates a possible emergency situation such as, for example, a suicide attempt by the user. In response, the social media application on the user device sends an emergency alert to an emergency management system. Since the user did not choose to request help, a representative of the social media entity is connected to the 3-way communication session to help explain the emergency situation to the emergency service provider.

As used herein, an "electronic device" or "computing device" is a digital processing device designed with one or more functionalities such as, for example, a communication device. A "producing device" refers to an electronic device with a communication component, which will allow it to send and receive information over a wireless channel, a wired channel, or any combination thereof (e.g., sending/receiving information over the Internet). Exemplary producing devices include a mobile phone (e.g., a smartphone), a laptop, a desktop, a tablet, a radio (e.g., a two-way radio), and a vehicular communication system. In some embodiments, a producing device includes a car security system (e.g., OnStar®), a home security system, or a home control system (e.g., a networked control system for providing network controlled and/or smart temperature control such as a Wi-Fi smart thermostat, lighting, entertainment, and/or door control, such as Nest®). In some embodiments, a producing device is an Internet of Things (IoT) device. In some embodiments, the producing device is a sensor for sensing environmental or health indicators. In some embodiments, the sensor includes a sensing component and a communication component. In some embodiments, the producing device is a sensor in a sensor network or a device that controls a sensor network. In some embodiments, the producing device is a physical panic button or software "panic" button.

In some embodiments, a producing device is a wearable device (e.g., a communication device worn by a user, such as an Apple Watch). In some embodiments, a producing device (e.g., a wearable device) comprises one or more sensors. The one or more sensors optionally include, but are not limited to: a gyroscope, an accelerometer, a thermometer, a heart rate sensor, a barometer, or a hematology analyzer. As used herein, a "mobile wireless device" refers to a device that is portable and communicates wirelessly. In some embodiments, a user wears or carries the mobile wireless device on the user's person or in the user's vehicle. Exemplary mobile wireless devices include mobile or cellular phones, wearable devices (e.g., smart watch, fitness tracker, wearable sensor, smart glasses, etc.).

As used herein, a "querying device" refers to a communication device that is querying for the emergency data (e.g. by allowing a user to send an emergency data request). In some embodiments, the querying device is a computing device within an ESP computer system, PSAP computer system, or PSS computer system. For example, the querying device may be a stationary terminal at a PSAP or a PSS (e.g. a police station, a command center), a responder device (e.g. a police radio, a vehicle console in an ambulance, etc.).

As used herein, a "consuming device" refers to a communication device that is receiving the emergency data for servicing the emergency. In many cases, the consuming device is the same as the querying device. In some embodiments, the consuming device may be different from the querying device (e.g. an ESP administrator could dispatch a private individual and entity to respond to an emergency and provide the emergency location).

As used herein, an "emergency service provider (ESP)" refers to any individual, agency, or institution (public or private) that provides emergency services. ESPs include, but are not limited to PSSs, as described above, emergency dispatch centers (e.g. PSAPs), private entities (e.g. tow truck operators/agencies, etc.). The ESP agency refers to the entity or organization, which typically has one or more administrators. In addition, the ESP may include one or more staff members. In some embodiments, emergency responders may be members of the ESP.

Each type of ESP agency (PSS, PSAP, private entities) may have an identifier to identify the agency. The ESP identifier may be the ESP organization name, ESP organization ID, FCC identifier and IP address, or another identifier, etc. In a similar way, the PSS and PSAP may have a PSS identifier and a PSAP identifier.

As used herein, an "emergency responder" refers to any person or persons responsible for addressing an emergency situation. A first responder is a specific type of emergency responder. In some embodiments, a first responder refers to government personnel responsible for addressing an emergency situation. In some embodiments, an emergency responder is responsible for a particular jurisdiction (e.g., a municipality, a township, a county, etc.), also referred to as its authoritative jurisdiction. In some embodiments, an emergency responder is assigned to an emergency by an emergency dispatch center (hereinafter, "EDC") or an emergency service provider (ESP), such as a PSS or a PSAP. In some embodiments, an emergency responder responds to a request for emergency assistance placed by a user via a communication device. In some embodiments, an emergency responder includes one or more firefighters, police officers, emergency medical personnel, community volunteers, private security, security personnel at a university, or other persons employed to protect and serve the public and/or certain subsets of the population.

In many cases, the emergency responder communicates with the dispatching organization (e.g. a PSS or PSAP) through a responder device. In many cases, the responder device is a mobile device that the responder carries (e.g. smartphone, tablet, radios, walkie talkies, or travels with (e.g. vehicular console), etc. In some embodiments, the responder devices are configured to receive and update emergency data through secure and encrypted pathways. In addition, the responder devices may include security and privacy measures to protect emergency information.

As used herein, a public safety answering point (PSAP) refers to a call center responsible for answering calls to an emergency telephone number for police, firefighting, and ambulance services. Trained telephone operators (also referred to as call-takers) are also usually responsible for dispatching these emergency services. The Federal Communications Commission (FCC) of the United States government maintains a PSAP registry. The registry lists PSAPs by an FCC assigned identification number, PSAP Name, State, County, City, and provides information on any type of record change and the reason for updating the record. The FCC updates the registry periodically as it receives additional information.

As used herein, a "recipient" refers to one or more persons, services, or systems that receive a request for assistance (e.g., an emergency alert). The recipient varies depending on the type of request. In some embodiments, a recipient is an emergency service. In some embodiments, a recipient is an emergency service when the request for assistance pertains to an emergency (e.g., a tier 2 emergency). In some embodiments, a recipient is an emergency management system. In some embodiments, a recipient is an emergency dispatch center (e.g., a public safety answering point or PSAP). In some embodiments, a recipient is an emergency dispatch center, wherein the request is first routed through an emergency management system (e.g., request is sent to the EMS, but ultimately is sent to an EDC). In some embodiments, a recipient is a dispatcher or call taker associated with a particular ESP, such as a PSAP. In some embodiments, the recipient is located on-site at the ESP (e.g., PSAP station) or is working remotely (e.g., at home). In some embodiments, a recipient is an emergency responder (e.g., a communication device of a first responder). In some embodiments, a recipient is an associated device of a user or an account associated with the user. In some embodiments, a recipient is a non-emergency service or personnel, for example, a relative or friend. In such situations, a user of a communication device (or member device or second device) does not require emergency assistance but does need help.

As used herein, "data" refers to a collection of information about one or more entities (e.g., user of a user communication device) and/or an environment that pertains to characteristics of the one or more entities. In some embodiments, an entity is a person such as a user. In some embodiments, an entity is a thing (e.g., a house). For example, in some embodiments, data comprises sensor data from home sensors associated with a house. In this example, the data is also associated with one or more persons (e.g., the homeowner(s) and/or inhabitant(s)). In some embodiments, data refers to meta-data. In some embodiments, data comprises health information about the user of a communication device. In some embodiments, data comprises information about the surrounding environment of the user of the user communication device (e.g., surrounding temperature, location, elevation, barometric pressure, ambient noise level, ambient light level, surrounding geography, etc.). In some embodiments, data comprises information about other users that is pre-stored in a device or in a database (e.g., a database within a group of devices who are related to the user of the user communication device as predefined by the user). In some embodiments, the data set comprises information from two or more users of user communication devices, wherein each user is affected by an emergency situation. As an example, two unrelated users are involved in a vehicular collision, and each user sends a separate emergency alert (for traffic accident) using his/her communication device. In this example, the separate emergency alerts are associated (e.g., by an emergency assistance system and/or emergency dispatch center) with the same emergency based on the proximity of time, location, and emergency indication of the emergency requests. As a result, the data set for this accident comprises information from both user communication devices. In this example, the data comprises location data from both devices (e.g., GPS coordinates), biosensor data for one or both devices (e.g., biosensor data such as heart rate and blood pressure can be important in case of injury), and information about the vehicle driven by each user (e.g., make, model, and year of manufacture information stored on the device).

In some embodiments, data comprises current data. In further embodiments, current data comprises information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old, including increments therein. In further embodiments, current data comprises information that equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, data comprises historical data. In further embodiments, historical data comprises information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old, including increments therein. In further embodiments, historical data comprises information that equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, the age of information is calculated from the date the information is first collected (e.g., when a sensor first detects a sensed parameter such as, for example, heart rate).

As used herein, "health data" refers to medical information associated with a user of a device. In some embodiments, health data comprises medical history such as, for example, past illnesses, surgery, food and/or drug allergies, diseases, disorders, medical diagnostic information (e.g., genetic profile screen), or any combination thereof. In some embodiments, health data comprises family medical history (e.g., family history of breast cancer). In some embodiments, health data comprises current health information such as, for example, current symptoms, current medications, and/or current illnesses or diseases. In some embodiments, health data comprises user age, height, weight, blood type, and/or other biometrics. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old. In some embodiments, current health information comprises information that is equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, current health information comprises medical information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old.

As used herein, "user data" refers to general information associated with a user of a device. In some embodiments, user data comprises user identity, user name, height, weight, eye color, hair color, ethnicity, national origin, religion, language(s) spoken, vision (e.g., whether user needs corrective lenses), home address, work address, occupation, family information, user contact information, emergency contact information, social security number, alien registration number, driver's license number, vehicle VIN, organ donor (e.g., whether user is an organ donor), or any combination thereof. In some embodiments, user data is obtained via user input.

As used herein, "sensor data" refers to information obtained or provided by one or more sensors. In some instances, a sensor is associated with a device (e.g., user has a communication device with a data link via Bluetooth with a wearable sensor, such as, for example, a heart rate monitor or a pedometer). Accordingly, in some embodiments, the device obtains sensor data from the sensor (e.g., heart rate from the heart rate monitor or distance traveled from the pedometer). In some instances, the sensor data is relevant to an emergency situation (e.g., heart rate during a cardiac emergency event). In some embodiments, a sensor and/or sensor device comprises an acoustic sensor, a breathalyzer, a carbon dioxide sensor, a carbon monoxide sensor, an infrared sensor, an oxygen sensor, an ozone monitor, a pH sensor, a smoke detector, a current sensor (e.g., detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g., on a football helmet to measure impact), a barometer, a pressure gauge, a thermometer, a proximity sensor, a motion detector (e.g., in a home security system), an occupancy sensor, or any combination thereof, and in some embodiments, sensor data comprises information obtained from any of the preceding sensors. In some embodiments, one or more sensors are physically separate from a user device. In further embodiments, the one or more sensors authorize the user device to obtain sensor data. In further embodiments, the one or more sensors provide or send sensor data to the user device autonomously. In some embodiments, the user device and the one or more sensors belong to the same group of devices, wherein member devices are authorized to share data. In some embodiments, a user device comprises one or more sensors (e.g., user device is a wearable device having a sensor or sensing component).

In some embodiments, the emergency data may designate data from a source (referred to as "source info"). The source info may refer to a public or private organization. In some embodiments, the organization provides a transportation service (e.g., taxi company, ride-sharing company, shipping company, railroad company, etc.). In some embodiments, a user utilizes a producing device to send an emergency alert or request for assistance and produces emergency data. In some embodiments, a user refers to one or more persons who are paid subscribers of a network access service, for example, cellular service subscribers. In some embodiments, a user refers to anyone who gains access to a network via a router, for example, a Wi-Fi router, and is not a paid subscriber of any access service. In some embodiments, a device associated with a user is a device carried or worn on the person of the user (e.g., a phone or wearable device). In some embodiments, a device associated with a user is not carried or worn on the person of the user (e.g., a home security sensor or camera installed in the home of the user, a vehicle tracking system installed in a vehicle of the user, etc.). In some embodiments, the emergency data comprises the social media network and user name associated with the data (e.g., user5455 on Facebook, user3212 on Twitter, etc.).

As used herein, "web content" refers to content (e.g., text, audio, image, video) that is or was available on the World Wide Web or Internet. In some cases, the "web content" is available after user verification (e.g., a log-in, and password). In some cases, the web content may be available in the form of an RSS feed. For example, the web content may be a post on a social media feed or it may be weather information that a hurricane is approaching a certain region or area.

As used herein, "social media" refers web content generated and shared by users in online communities (e.g. online forums, microblogging, social networks, social bookmarking, social curation and wikis). Users can publish social media web content on various social media networks. Exemplary social media networks include Facebook, Twitter, Google Plus, YouTube, Pinterest, Instagram, Tumblr, Flickr, Reddit, Snapchat, Whatsapp, Viber, IMO, WeChat, Quora, Spoke, NextDoor, LinkedIn, Vine, Periscope, BizSugar, StumbleUpon, Delicious, Digg, etc.

As used herein "alternative communication pathway" refers to an alternative communication method for reporting an emergency and requesting emergency assistance as compared to designated emergency phone numbers. Traditionally, each jurisdiction has designated emergency numbers (e.g. 911, 112, etc.) for reporting emergencies. In some embodiments, using the designated emergency numbers to report an emergency is referred to as the "standard communication pathway."

Sometimes, traditional emergency phone numbers are unavailable due to various reasons such as downed lines, technical problems, lines are busy with other callers, emergency response resources are overwhelmed due to a mass emergency, etc. In additional, traditional emergency phone numbers have limitation and do not allow callers to send rich data (e.g. device-based location, social media content, image, video files). Sometimes, the traditional emergency phone numbers are routed to the wrong PSAP and have to be manually re-routed to the right PSAP. For various reasons, alternative communication pathways can play an important role in reducing inefficiencies and enhancing effectiveness of emergency response resources (e.g. responders).

The emergency assistance system (EAS) provides alternative communication pathways for reporting emergencies. In some embodiments, the alternative communication pathway is not a phone number. Non-exhaustive exemplary alternative communication pathways include generating emergency alerts based on emergency posts published on social media networks, provisioning emergency data in an emergency clearinghouse, making emergency data comprising social media content available through ALI or NG911 databases, using social media to proactively reach out to potential users who are affected by an emergency, providing a processed emergency feed comprising web content to an ESP (e.g. a PSAP), and providing a means for users to report emergencies into an emergency registry. In some embodiments, the alternate communication pathway are alternate phone numbers for a third-party such as a call center that you can call instead of the designated emergency numbers. In some embodiments, the EAS may provide a messaging service for emergency communication, e.g, a ChatBot, a messaging app, a walkie-talkie service, etc.

As referenced herein, the "processed emergency feed" references a list of emergencies that are occurring or have occurred within a specific area to be provided to the appropriate ESP. In some embodiments, the processed emergency feed is updated in real-time or near real-time (e.g., every minute, every 15 minutes, every 30 minutes, every hour, etc.). In some embodiments, emergency data in the emergency entries are updated periodically, every minute, every 10 minutes, every 30 minutes, etc.). In some embodiments, dynamic emergency data such as location data, sensor data, video feed, etc. are updated more frequently than static data (e.g. user name, demographic data, etc.).

Emergency alerts from various sources including social media networks (e.g., Facebook, Twitter) and other sources (e.g., emergency registry) can be incorporated as entries in the processed emergency feed. Processing may refer to removing emergency entries that are outside the geofence of the ESP, removing redundant emergency entries from the feed, removing emergency entries that have been canceled, removing emergency entries that have been responded to, removing emergency entries for re-routing to appropriate ESP, removing emergency entries that have expired (e.g. after 30 minutes, 1 hour, 2 hours, 1 day, etc.)

As used herein, "geofence" corresponds to the administrative or authoritative region of an ESP. In many cases, the ESP is a public entity such as a public safety answering points ("PSAP), a PSS (e.g. a police department, a fire department, a federal disaster management agency, national highway police, etc.), which has jurisdiction over a designated area (sometimes, overlapping areas). In some cases, geofence can be an administrative region or service area defined as a result of practical considerations, e.g., a proximal distance from the ESP facility. Geofences are used to define the jurisdictional authority by various methods and in various Geographic Information System (GIS) formats.

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device. In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In some embodiments, the non-volatile memory comprises magnetoresistive random-access memory (MRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a subject. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the digital processing device includes an input device to receive information from a subject. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, subject, or network information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony PSP™ browser.

NUMBERED EMBODIMENTS

The following embodiments recite nonlimiting permutations of combinations of features disclosed herein. Other permutations of combinations of features are also contemplated. 1. A method for providing access to emergency data by an emergency assistance system (EAS), the method comprising: a) receiving, by one or more processors of said emergency assistance system (EAS), one or more web content published on a social media network by one or more users, said one or more web content comprising an emergency indication; b) distilling, by the one or more processors, the information into an emergency data set associated with the emergency indication, wherein the emergency data set comprises a user identifier and a current location of a person requiring emergency assistance; c) receiving, by the one or more processors, a data request from an emergency service provider (ESP); and d) transmitting, by the one or more processors, return data comprising the emergency data associated with the emergency to the ESP through secure pathways. 2. The method of claim 1, wherein the ESP is a public safety answering point (PSAP) that has received an emergency call for reporting emergency assistance. 3. The method of claim 1, wherein the emergency data set is provisioned in one or more clearinghouse databases and accessible using the user identifier. 4. The method of claim 3, further comprising provisioning the emergency data that was gathered from the one or more web content using the user identifier. 5. The method of claim 4, wherein the provisioned emergency data is available through ALI, NENA, EENA or NG911 databases. 6. The method of claim 1, wherein the user identifier comprises a timestamp, a username, a phone number, an account name, an email address, a device number, an IP address of an access device, a social media network identifier, or any combination thereof 7. The method of claim 1, further comprising sending an emergency alert to the ESP through an alternative communication pathway that is not a phone line. 8. The method of claim 7, wherein the emergency alert is sent to the ESP through the alternative communication pathway using an email address, a chat window, a social media post, or an emergency registry. 9. The method of claim 1, wherein the emergency data comprises identifying information for a reporting user that is different from the person requiring emergency assistance. 10. The method of claim 9, further comprising connecting the reporting user to an ESP through an emergency communication session to facilitate provisioning of emergency assistance. 11. The method of claim 1, further comprising generating a processed emergency feed in real-time or near real-time comprising a plurality of emergencies within a defined geographical area. 12. The method of claim 11, further comprising displaying the processed emergency feed on a PSAP display, wherein the processed emergency feed comprises two or more emergency entries. 13. The method of claim 11, wherein the processed emergency feed comprises an incident identifier associated with an emergency incident, wherein multiple reports of the emergency incident are consolidated into one emergency entry. 14. The method of claim 11, wherein emergency entries within the processed emergency feed are prioritized based on urgency or severity of each emergency entry. 15. The method of claim 14, further comprising displaying the prioritized emergency entries as a heat map. 16. The method of claim 11, wherein the processed emergency feed comprises a last current status for an emergency response to the emergency incident. 17. The method of claim 11, wherein the processed emergency feed comprises a verified emergency location comprising a current device-based location of an access device used for reporting the emergency incident. 18. The method of claim 11, further comprising displaying the plurality of emergencies on a geographical map as interactive graphical elements that provide detailed information upon user selection. 19. The method of claim 1, further comprising generating the processed emergency feed within a defined time window and displaying the processed emergency feed on an ESP display. 20. The method of claim 1, further comprising initiating an emergency flow when an indication of emergency is detected in step (a), wherein the emergency flow comprises a sequence of emergency communication steps comprising contacting one or more emergency contacts and/or corporate representatives. 21. The method of claim 1, further comprising connecting two or more users to an ESP in a three-way conference bridge for the purpose of requesting emergency assistance. 22. The method of claim 1, wherein current location is obtained within the last 10 seconds to 4 hours. 23. A method for providing an alternate communication pathway for emergency data to an emergency service provider (ESP), the method comprising: a) gathering, by one or more processors of said emergency assistance system (EAS), one or more web content published on a social media network by one or more users, wherein said one or more web content comprising an emergency indication comprises the emergency data; b) distilling, by the one or more processors, the emergency data into an emergency data set associated with at least one emergency, wherein the emergency data set comprises at least one location of the at least one emergency; c) retrieving, by the one or more processors, at least one geofence associated with the ESP from one or more geofence databases, wherein the at least one geofence encloses one or more geographical regions within the jurisdiction of the ESP; and d) generating, by the one or more processors, a processed emergency feed comprising two or more emergency entries, wherein each emergency entry comprises at least a subset of the emergency data set associated with the at least one emergency having a location within the at least one geofence; e) providing, by the one or more processors, the ESP with access to the processed emergency feed comprising the two or more emergency entries. 24. The method of claim 23, wherein the ESP is a 911 authority having the jurisdiction defined by the at least one geofence. 25. The method of claim 23, wherein the processed emergency feed comprises near real-time data that is less than 15 minutes old. 26. The method of claim 23, wherein the processed emergency feed comprises near real-time data that is less than 30 minutes old. 27. The method of claim 23, wherein the processed emergency feed comprises recent dynamic data comprising location data and sensor data. 28. The method of claim 23, wherein data that is more than 1 hour old is excluded from the processed emergency feed. 29. The method of claim 23, wherein the emergency data set is updated with new or updated web content periodically. 30. The method of claim 23, wherein the step of generating the processed emergency feed in (c) comprises using an algorithm to identify duplicate emergency entries and consolidating the duplicate emergency entries within the processed emergency feed using a set of redundancy rules. 31. The method of claim 23, further comprising prompting an ESP user to mark non-unique emergency entries in the processed emergency feed as duplicates. 32. The method of claim 23, further comprising displaying the processed emergency feed on a PSAP personnel display. 33. The method of claim 23, wherein the processed emergency feed displays the two or more entries according to priority based on urgency or severity of each entry. 34. The method of claim 23, wherein the processed emergency feed comprises response status for an emergency response for the two or more entries. 35. The method of claim 34, further comprising displaying the two or more entries as a heat map. 36. The method of claim 23, wherein the processed emergency feed comprises a verified emergency location that is a current device-based location of an access device used for reporting the emergency. 37. The method of claim 23, further comprising displaying the at least one emergency on an interactive geographical map, wherein each emergency entry is configured to display detailed information and emergency response actions upon user selection. 38. The method of claim 23, wherein the processed emergency feed is converted to a historical emergency feed by restricting emergency entries within a specific time window and displayed processed emergency feed at an ESP user display. 39. The method of claim 23, wherein the emergency data set comprises a reporting user that is different from the one or more users who published the one or more web content on the social media network. 40. A method for reporting emergencies through an alternative communication pathway by an emergency assistance system (EAS), the method comprising: a) receiving, by one or more processors of said emergency assistance system (EAS), an indication of an emergency from a user on a social media network; b) identifying, by the one or more processors, one or more web content that is published on the social media network and associated with the emergency, wherein the one or web content comprises the emergency data; c) distilling, by the one or more processors, the emergency data from the one or more web content into a data set associated with the emergency, wherein the data set comprises a location of (i) the emergency or (ii) one or more persons requiring emergency assistance; d) determining, by the one or more processors, an appropriate emergency service provider (ESP); and e) providing, by one or more processors, the appropriate ESP with access to the data set associated with the emergency through an alternative communication pathway that is different from a standard communication pathway for reporting emergencies in the jurisdiction of the ESP. 41. The method of claim 40, wherein the alternative communication pathway comprises an alternate phone line, an email address, a chat window, a social media post, or an emergency registry. 42. The method of claim 40, wherein the alternative communication pathway comprises posting on social media with a specific tag. 43. The method of claim 40, wherein the alternative communication pathway allows the user to report an emergency on behalf of the one or more persons requiring emergency assistance. 44. The method of claim 40, wherein the alternative communication pathway provides access to the location of the one or more persons requiring emergency assistance directly with an emergency responder responding to the emergency. 45. The method of claim 40, wherein the alternative communication pathway establishes an emergency communication session directly between the user and an emergency responder responding to the emergency. 46. The method of claim 40, further comprising assessing strength of cellular connectivity. 47. The method of claim 40, further comprising identifying alternate channels for reporting the emergency when the strength of the cellular connectivity is poor. 48. The method of claim 47, wherein the alternate channels comprise Wi-fi connections, Bluetooth connections, short-wave radio connections, intermediate or routing devices, and other communication devices. 49. A method for providing an alternative communication pathway for reporting emergencies by an emergency assistance system (EAS), the method comprising: a) detecting one or more social media posts indicative of an emergency; b) determining an affected area for the emergency based on the one or more social media posts; c) identifying a user potentially located within the affected area; d) transmitting an emergency response message to a communication device associated with the user; e) receiving confirmation of the emergency response message; and f) in response to receiving confirmation of the emergency response message, initiating an autonomous communication session with the user through the communication device. 50. The method of claim 49, further comprising: a) extracting emergency information from the autonomous communication session; and b) transmitting the emergency information to an ESP. 51. The method of claim 50, wherein the emergency information comprises one or more messages received from the user through the autonomous communication session. 52. The method of claim 51, wherein extracting emergency information from the autonomous communication session comprises parsing messages submitted by the user through the autonomous communication session. 53. The method of claim 49, further comprising: a) receiving a location from the communication device; b) confirming that the location is within the affected area; and c) transmitting the emergency response message to the communication device in response to confirming that the location is within the affected area. 54. The method of claim 49, wherein initiating the autonomous communication session with the user comprises transmitting one or more SMS text messages to the communication device. 55. The method of claim 54, wherein the one or more SMS text messages are transmitted to the communication device according to an emergency flow script. 56. The method of claim 55, further comprising adapting the emergency flow script during the autonomous communication session according to responses from the user. 57. The method of claim 49: a) wherein the emergency response message comprises a first SMS text message; and b) wherein confirmation of the emergency response message comprises a second SMS text message received from the user in response to the first SMS text message. 58. The method of claim 49: a) wherein the emergency response message comprises a push notification; and b) wherein confirmation of the emergency response message comprises user selection of the push notification. 59. A method for sending a request for emergency assistance by an emergency assistance system (EAS), the method comprising: a) detecting, by one or more processors of said emergency assistance system (EAS), one or more web content published on a social media network by one or more users, said one or more web content comprising at least a term indicative of an emergency; b) determining, by the one or more processors, if the one or more web content constitute an emergency; c) retrieving, by the one or more processors, information associated with the emergency from a plurality of sources comprising the one or more web content; d) distilling, by the one or more processors, the information into a data set associated with the emergency, wherein the data set comprises a location of (i) the emergency or (ii) one or more persons requiring emergency assistance; e) determining, by the one or more processors, an appropriate emergency service provider (ESP) for responding to the emergency; f) providing access, by one or more processors, to the data set associated with the emergency to the appropriate ESP; and g) establishing an emergency communication session, by the one or more processors, between the one or more persons and the appropriate ESP, thereby enabling the one or more persons to request emergency assistance. 60. The method of claim 59, wherein the information further comprises emergency type, emergency status, identifying information about one or more persons requiring emergency assistance, medical information, contact information, social media activity, an image from the emergency, an audio from the emergency, a video feed from the emergency, location co-ordinates for the emergency, or any combination thereof 61. The method of claim 59, further comprising: providing at least an updated information associated with the emergency, wherein the updated information comprises an updated web content published on a social media network, a change in emergency conditions, an emergency response status, an updated type of emergency, an updated status of emergency, an updated location of emergency, an updated identifying information about one or more persons requiring emergency assistance, an updated medical information, an updated contact information, an updated last social media activity, an updated images from the emergency, an updated audio from the emergency, an updated video feed from the emergency, an updated GPS co-ordinates from the emergency, or any combination thereof 62. The method of claim 59, further comprising providing updated location data of the one or more persons requiring the emergency assistance to the ESP. 63. The method of claim 59, further comprising transmitting the emergency alert and the current location of the one or more persons requiring the emergency assistance to at least one volunteer responder. 64. The method of claim 63, wherein the volunteer responders are selected based on a location of the emergency, a location of the volunteer responders, a type of emergency, skills and qualification of the volunteer responders from one or more databases, or any combination thereof. 65. The method of claim 59, further comprising: distilling the information into additional data set comprising user data, sensor data, health data, and environmental data about the emergency. 66. The method of claim 59, further comprising generating an additional data set comprising image(s), audio, video feed, or any combination thereof from the emergency location. 67. The method of claim 66, wherein the additional data set further comprises a weblink, hyperlink or URL link containing information about the emergency to the ESPs. 68. The method of claim 66, wherein the additional data set further comprises a weblink, hyperlink or URL link containing an emergency registry associated with the emergency to the ESPs. 69. The method of claim 59, further comprising curating the data set for presenting on a display of a public-safety answering point (PSAP). 70. The method of claim 59, further comprising curating and distilling the data set for display on a monitor of a public-safety answering point (PSAP) personnel, wherein the PSAP personnel is a call taker, a dispatcher, a manager, or a communication specialist. 71. The method of claim 59, further comprising curating and distilling the data set for display on an emergency responder's device. 72. The method of claim 59, further comprising curating and distilling the data set for display to a PSAP personnel. 73. The method of claim 59, further comprising curating and distilling the data set as an emergency overlay on a map displayed to an emergency resource planner or emergency responder. 74. The method of claim 59, wherein the one or more persons comprises a person, an animal or pet, an article, a house, an item, a device, a gadget, an entity, a vehicle, a watercraft or an aircraft. 75. The method of claim 59, wherein the step of detecting in (a) comprises receiving an emergency request sent by a user through an emergency reporting user interface. 76. The method of claim 75, wherein the emergency request is sent by a user upon a user interaction with one or more emergency or panic buttons on the social media user interface. 77. The method of claim 59, wherein the step of determining in (b) comprises reviewing social media posts for hashtags or keywords indicative of the emergency. 78. The method of claim 59, wherein the plurality of sources comprises an RSS feed of a web site, a third-party database, a news or weather site, a social networking site, a messaging site, a disaster management site, a government site, a maps or navigation site, a directory, a search site, or any combination thereof. 79. The method of claim 78, wherein the keywords are selected from any or combination of "shooter", "fire", "flood", "gun", "violence", "help", "911", "112", "999", "000", "emergency", "protest", "punch", "assault", "heart attack", "medical", "broken", "explosion", "trapped", "sinking", "hurt", "pain", "suffering", "storm", "lighting", "gas", "attack", "poison", "lost", "fell", "fallen", "smashed", "mangled", "earthquake", "tsunami", "ambulance", "police", "EMT", "failure", "FEMA", and "disaster". 80. The method of claim 59, wherein the step of detecting in (a) comprises identifying and removing duplicate requests for assistance associated with the emergency. 81. The method of claim 59, wherein the step of detecting in (a) comprises evaluating a likelihood of an emergency by evaluating information associated with the one or more web content from the plurality of sources. 82. The method of claim 81, wherein the likelihood is evaluated based on updated social media content based on pre-defined keywords indicative of a high likelihood of the emergency. 83. The method of claim 59, wherein the step of detecting in (a) comprises crawling content sources comprising social networking sites, broadcasting sites, RSS feeds, geographical data, maps, news and weather sites, directories, or any combination hereof 84. The method of claim 59, wherein said ESP is selected based on the location of the emergency, type of emergency, and the available resources at said ESP. 85. The method of claim 59, wherein the one or more web content are detected on an electronic device associated with the one or more users. 86. The method of claim 59, wherein the one or more web content are posted by the one or more users, or forwarded by the one or more users. 87. The method of claim 59, wherein the information associated with the emergency comprises photo(s), video feed, audio, latitude-longitude co-ordinates, physical address, chat message(s), SMS message(s), status update(s), or any combination thereof 88. The method of claim 59, wherein the data set is transmitted to the ESP if said one or more web content satisfies at least one criterion associated with the emergency, and wherein the at least one criterion comprises a verification of the emergency. 89. The method of claim 88, wherein the at least one criterion comprises matching an IP address of one or more mobile device transmitting one or more emergency signals with the emergency received from said one or more users. 90. The method of claim 59, further comprising evaluating an authenticity or veracity of said one or more web content. 91. The method of claim 59, wherein the ESP is selected from one or more regional or national emergency resource coordinators that is a federal emergency management agency or state-wide or city-wide disaster management agency. 92. The method of claim 59, wherein the EAS comprises one or more databases storing information relating to emergencies occurring as a result of a natural disaster. 93. The method of claim 92, wherein a response status for the emergencies occurring is updated based on information from at least one source comprising social media updates, responder or dispatcher updates, or any combination thereof. 94. The method of claim 59, further comprising transmitting an acknowledgement to the one or more users reporting the emergency or the one or persons requiring emergency assistance, wherein the acknowledge indicates that an emergency alert has or will be transmitted to the ESP. 95. The method of claim 94, wherein the acknowledgement gives the one or more users an option to connect, upon selection of the option, with a 911 authority serving the location of the emergency. 96. The method of claim 59, further comprising detecting a mass emergency based on trending topics or hashtags, volume of social media content, severity of key word sentiment, or any combination thereof 97. The method of claim 59, further comprising determining one or more locations of the one or more users to determine an affected area of the emergency. 98. The method of claim 59, further comprising determining that there is a mass emergency affecting a group of users within an affected area. 99. The method of claim 98, further comprising dynamically updating the affected area of the emergency based on new social media posts related to the one or more web content published on the social media network. 100. The method of claim 59, further comprising determining whether one or more other users are present in a vicinity of the emergency location and notifying the one or more other users about said emergency in their vicinity when the one or more users are present. 101. The method of claim 100, further comprising linking the one or more other users to the one or more web content published on said social media network. 102. The method of claim 59, further comprising obtaining a phone number for a user of the one or more users and delivering an interactive call to said user enabling to connect with a 911 authority serving the emergency location. 103. The method of claim 59, wherein the one or more web content are grouped together based on the location, a time of posting, a content of post, a hashtag, or any combination thereof 104. The method of claim 59, further comprising receiving a notification from said ESP that the emergency has been verified, and notifying, upon receipt of said notification, one or more other ESPs that said ESP is responding to the emergency. 105. The method of claim 104, wherein the one or more other ESPs are determined based at least on the location or the type of emergency. 106. The method of claim 59, further comprising generating an emergency registry for the emergency. 107. The method of claim 106, further comprising delivering an accessible link to the emergency registry to at least one user of the one or more web content published on said social media network. 108. The method of claim 106, further comprising generating a social media post including an accessible link to the emergency registry and delivering the social media post to at least one user of the one or more web content published on said social media network to share on social media. 109. The method of claim 106, further comprising delivering the emergency registry to an emergency responder. 110. The method of claim 59, wherein the step of determining that the one or more web content constitute an emergency in (b) initiates an emergency flow that notifies one or more emergency contacts, corporate representatives, or both. 111. An emergency assistance system (EAS) configured to send a request for emergency assistance, the system comprising at least one processor, an operating system configured to perform executable instructions, a memory unit, and a computer program including instructions executable by the at least one processor to create an application comprising: a) an emergency detection module configured to detect one or more web content published on a social media network by one or more users, said one or more web content comprising at least a term indicative of an emergency; b) an emergency determination module configured to determine if the one or more web content constitute an emergency; c) an information gathering module configured to retrieve information associated with the emergency from a plurality of sources comprising at least the one or more web content; d) a location determination module configured to obtain a location associated with the one or more persons requiring the emergency assistance from the information retrieved; e) an ESP determining module configured to determine one or more appropriate emergency service providers (ESPs) comprising emergency dispatch centers (EDCs) and responders for responding to the emergency; and f) an emergency transmission module configured to transmit a request for the emergency assistance to the ESPs, wherein the request comprises a data set associated with the emergency. 112. An access device comprising at least one processor, a memory, a network element, and a computer program including instructions executable by the at least one processor to create an emergency alert application comprising: a) a social media monitoring module configured to detect one or more web content by one or more users, said one or more web content comprising at least a term indicative of an emergency; b) a location detection module configured to obtain current location data associated with the one or more persons requiring the emergency assistance from the information retrieved; and c) an emergency communication module configured to transmit an emergency alert comprising a data set associated with the emergency and the current location data to an emergency assistance system (EAS) for transmission to one or more appropriate recipients for providing emergency assistance.

EXAMPLES

The following illustrative example is representative of embodiments of the inventions described herein and is not meant to be limiting in any way.

Example 1—Social Media and Emergency Registry

John, an elderly man in a wheelchair, lives in Green Valley nursing home in the southwest side of City A, which falls within the jurisdiction of an Emergency Dispatch Center, i.e. PSAP-1. The National Weather Service forecasts that Hurricane Humphrey will make landfall and produce significant rainfall and high winds in several counties in City A tonight around 9 PM. John's daughter, Mary, lives in another state and calls to check on her father before the storm hits. John tells her everything is fine and he will call her at 9:30 pm (after the storm) to confirm that he is fine.

Around 9:05 PM, Hurricane Humphrey reaches City A and the rain begins. The dispatchers and manager in PSAP-1 are monitoring the map-view of the PSAP-1 and nearby areas to assess where to prepare and plan for the response. By 9:15 PM, all dispatch lines are busy responding to calls from various residents in the area including reports of patchy cellular phone coverage. From the map-view PSAP display, which includes information from emergencies reported on social media, the PSAP-1 manager can see that there are clusters of calls coming from the southwestern areas of City A. By clicking on one or two specific emergencies, the manager reviews information about the emergencies. Several users have reported that they do not have cellular phone service in the area and cannot call 911. Some users on social media were reporting that lines are busy, and they are unable to get through to a dispatcher, but were posting updates about flooding conditions in their area. Reviewing the data, the PSAP-1 manager detects that the impact area of the Hurricane Humphrey is concentrated in the south-west areas of the city. He gives instructions to police, fire, hospital contacts that they should prepare to receive a large number of calls from those areas and to move assets (squad cars, fire engines, ambulances) closer to that area. He also coordinates with city, state and national emergency resources (e.g. City A's emergency management department, FEMA, etc.). He also posts a message on the emergency website that emergency dispatch lines are busy dealing with immediate aftermath of Hurricane Humphrey and suggests that people should report emergencies to the "Emergency Registry for Hurricane Humphrey" even if they cannot reach 911.

At 10:00 PM, Mary has heard news reports about the Hurricane and still has not heard from Joe. She suspects that he is in need of help, but his phone is going directly to voicemail. She knows that Joe must still be in his room as he had said that he planned to ride out the storm there. She posts a message on a popular social media platform (User Name: mary.doe.7099): "@911—John Doe, elderly man in wheelchair stuck in Hurricane Humphrey at Green Valley Nursing Home (1234 W. Hill Drive, Tower A, Third Floor, Suite 45). Please help!"

The social media company has access to an Emergency Assistance System or EAS for monitoring member activity for detecting posts that include an indication of an on-going emergency situation. Because this post included keywords 911, help, hurricane, etc., it is picked up as a post depicting an emergency or potential emergency. In particular, Mary's post included the terms "Hurricane Humphrey" indicating the natural disaster associated with this emergency. As a result, the EAS adds John Doe's emergency as an entry in the Emergency Registry for Hurricane Humphrey.

Mary's friend, Vicky notices Mary's post in her Facebook feed and uses a web-portal (e.g. Reporting UI) for registering the "Emergency Registry for Hurricane Humphrey", which is a consolidated list of emergencies reported on social media related to the hurricane and related flooding. The EAS detects that there is a duplicate entry for the same emergency situation affecting John Doe and consolidates the data into one entry. Vicky receives a message that the emergency has been reported. Vicky sends a link to the "limited version" of the Emergency Registry to Mary who can see her father's name and realizes it may take time for emergency rescuers to reach him.

At 11 PM, the PSAP-1 manager is sent a web-link (with authorization) to a "privileged view" the Emergency Registry with emergencies reported on social media. She prioritizes emergencies based on type of emergency and severity. Although John Doe is on the list, responders are not expected to reach him until the next morning because of limited resources and road conditions.

Ricky is a volunteer firefighter who lives near the Green Valley Nursing Home. After getting his family to a shelter using his boat, he goes back to the area around midnight. He has a smartphone with an application where he can access the Emergency Registry. He also can access a map-view of emergencies in the area. When he reaches the area, he sees a cluster of emergencies on a nearby street and realizes that there may be several elderly people who may need help in the nursing home. He heads there and finds a few staff and many elderly residents without power in 2 inches of water. He takes about 6 residents on his boat and heads to a shelter. He looks for their names in the Emergency Registry and ticks off that they have received help. He finds John Doe in his suite, but realizes that he cannot load the wheelchair onto his boat. In the "John Doe" entry, he notes that he needs rescue boat with a wheelchair ramp. He also adds other emergency entries for people with special needs.

Dispatchers and emergency responders at PSAP-1 work through the night to rescue people and respond to emergencies. At 10 AM, a dispatcher reaches John Doe's entry in the Emergency Registry and realize that they will need specialized equipment to rescue him. He searches for a boat with a wheelchair ramp. Micky, a resident of the City A, has registered his boat with a wheelchair ramp as an emergency response resource with the city. Mickey gets a call about whether he can carry out a rescue from Green Valley Nursing Home. He agrees and is dispatched to rescue John Doe. When he reaches John Doe, John has been awake all night and without his daily medications. Mickey updates the Emergency Registry with: "J. Doe rescued and taken to emergency shelter in the stadium." Mary is so relieved when she sees this message and requests her friend Vicky to check on her father at the shelter.

Example 2—Social Media Suicide Prevention

Jane, a freshman as a top tier university, is finishing up her first semester. Jane has been struggling to fit in socially on-campus and is experiencing problems with her roommate. Moreover, Jane is double majoring in analytical chemistry and computer science and is feeling overwhelmed by the course load. For the past month, Jane has fallen into a deep depression as finals week approached. Jane is not alone, and there are thousands of people who are active on social media who struggle with depression. In response, a social media network, "StudentNet (SN)" has launched a digital campaign to detect and head off mental health crises. SN has created an "operations center" to monitor activity on its platform for early detection of mental health crises such as suicide attempts. In addition, SN has identified local suicide prevention organizations that can provide support for these individuals using suicide hotlines. In this case, mental health crises are detected by dynamic web analysis of user postings for users using keywords indicative of suicidal thoughts or tendencies.

Jane posts on SN that she is saying farewell to her friends and is ready to end it all tonight. Her post is analyzed by an Emergency Assistance System (EAS) by remote access and leads to detection of web content indicating an emergency or a potential emergency. Once the post is flagged, information from various sources is obtained about Jane to make a determination about whether a request for emergency assistance is warranted. Here, the system looks at Jane's prior activity on SN and other platforms, her university's calendar (for final examination dates) and finds that Jane is susceptible to depression and that an emergency alert should be sent.

For sending the request for emergency assistance, the system gathers information about the emergency including Jane's current location. Since her last SN activity, was in the last 15 minutes, the system identifies her current location as the one saved by the SN website when she posted her status using her phone (device-based hybrid location). Using this location, the system identifies the PSAP serving her area (PSAP-2), a "campus emergency center" and the residential monitor in her dorm and sends a request for emergency assistance with Jane's name, location & social media status.

The system recognized that a human caller is needed for making an emergency call to PSAP-1. The system tries to reach Jane's phone, but she has turned it off. Then, the system reaches Jane's emergency contact, her dad, who makes the emergency call to PSAP-2. When the call comes in to the PSAP-2, the display includes a "social media tab" where her activity on social media is shown including her post and the alerts based on social media sent to the resident monitor and campus emergency center. Before sending emergency help, the dispatcher calls the campus emergency center and finds out that they are handling the emergency.

The residential monitor receives the alert and goes to Jane's room and finds her locked in the bathroom. While she tries to convince Jane to open the door, a counselor and a medical representative from the campus emergency center arrives. They are able to convince Jane to open the door and get help.

Example 3—Processed Feed

Eric, a sophomore at B. R. Johnson High School, is sitting in English class when he hears a succession of gunshots fired nearby. Eric runs to the nearest window just in time to see a black car slowly driving by Eric's high school playground. A backseat window rolls down and a masked man emerges from the car brandishing a weapon. In a flurry, the masked man then opens fire on another man running down the sidewalk adjacent to playground. Eric watches the masked man retreats into the black car as the vehicle speeds away. The target stumbles for a few steps before collapsing on the ground.

The rest of Eric's classmates flock to the windows to see what's happening outside but their teacher instructs them to back away from the windows and return to their seats immediately. A few seconds later, an alarm sounds throughout the school, alerting the students and teachers that the school is initiating a temporary lockdown to ensure the safety of the students. Likewise, classes are temporarily postponed until the lockdown situation is resolved. With class temporarily postponed, Eric and his classmates return to their seats and take out their mobile phones to share the news of what had happened. Cathy, one of Eric's close friends opens a social media app on her phone and posts a status saying (1) "here we go, shots fired at our high school playground, what is my life" followed by a series of emoticons ("emojis"). Eric opens the same social media app and posts a status saying (2) "Wow, can't believe what I just saw—a drive-by shooting right outside of BR Johnson. Man shot and downed by shooter in a black sedan." Jack, Eric's best friend, opens a different social media app and posts a picture of himself (a "selfie") with the caption (3) "shots fired at BRJ! we locked down!" Five minutes later, two other members of Eric's class post statuses on a third social media app that read (4) "drive-by shooting at school has us on lockdown" and (5) "lord help us lol."

In this example, an to an emergency assistant system (EAS).=identifies all five of the aforementioned social media posts posted by Eric and his classmates as indicative of potential emergencies based on content. For example, the social media platforms recognize key words indicative of potential emergencies in each of the posts: (1) "shots" and "fired;" (2) "drive-by", "shooting", "shot," and "shooter;" (3) "shots" and "fired;" (4) "drive-by" and "shooting;" (5) "help."

After detecting emergency posts, the EAS extracts relevant and available emergency data from the social media posts, such as name of the poster, profile picture of the poster, location tagged to or associated with the post, urgency or severity of the potential emergency, type of emergency, etc. In this example, the EAS then determines that the five social media posts are all pertinent to the same emergency based on content and proximity. For example, the EAS identifies that some of the social media posts are tagged with locations at or near B.R. Johnson High School, that some of the social media posts include the word "school," that some of the social media posts include the word "drive-by," and that the five social media posts were all posted within ten minutes of each other, thereby linking all of five social media posts as probably related to the same emergency. The EAS then distills the emergency data extracted from the social media posts into an emergency data set. Next, the EAS references a database of geofences associated with a plurality of emergency service providers (ESPs). The EAS finds an ESP with a geofence that encompasses locations associated with one or more of the social media posts (i.e., the social media post was posted from a location within an authoritative or administrative jurisdiction of the ESP), the EAS generates a processed emergency feed using the emergency data set distilled from the five social media posts and provides the processed emergency to the ESP. In this example, the EAS identifies a public safety answering point (PSAP) with an authoritative jurisdiction that encompasses the location of B.R. Johnson High School and provides the processed emergency feed to the ESP.

In this example, the processed emergency feed initially contains entries for only social media posts 1, 2, and 3. However, the EAS is configured to dynamically update the processed emergency feed as additional social media posts pertinent to the same emergency (i.e., the drive-by shooting) are received from social media platforms. Accordingly, ten minutes after the first three social media posts were received from the social media platforms and distilled into an emergency data set, the EAS receives social media posts 4 and 5 and, distills them into the emergency data set, and updates the processed emergency feed. In this example, however, no new entries are generated for the updated processed emergency feed, as the EAS uses redundancy rules to determine that social media posts 4 and 5 are effectively duplicates of social media posts earlier received from the social media platforms and do not provide any new or additional information pertinent to the emergency. The EAS removes duplicates from the processed emergency feed in order to prevent the processed emergency feed from becoming inundated with excess or extraneous information. After receiving the processed emergency feed from the EAS, a PSAP personnel generates an incident in CAD and dispatches police officers and emergency medical services directly to the B.R. Johnson High School playground. As responders are approaching the school, they see a link to a live feed in the processed emergency feed. After clicking on the web-link a video opens in a new window showing with the victim bleeding near the south-west corner. The responders arrive on the scene and treat the victim.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for providing emergency assistance by an emergency assistance system (EAS), the method comprising:
   detecting an emergency potentially affecting a group of people within an area;
   providing a web interface for submitting registration entries regarding the emergency;
   receiving, through the web interface, a plurality of registration entries regarding the emergency from a plurality of users, wherein each registration entry comprises emergency data about a person potentially affected by the emergency and a user identifier;
   generating, using the plurality of registration entries received from the plurality of users, an emergency registry specific to the emergency;
   receiving a query comprising a first user identifier associated with a first registration entry submitted by a user from the plurality of users from a device associated with an emergency service provider; and
   in response to receiving the query comprising the first user identifier, returning the emergency data about the person potentially affected by the emergency from the first registration entry to the device associated with the emergency service provider,
   wherein each registration entry comprises an emergency level depicted on an interactive map provided to the emergency service provider wherein the interactive map is updated in real-time as new registration entries are received, and wherein the interactive map shows priority zones with higher concentration of entries.

2. The method of claim 1, wherein the emergency service provider is an emergency responder responding to a mass emergency.

3. The method of claim 1, wherein the emergency data about the person potentially affected by the emergency from the first registration entry comprises current health information comprising current symptoms, current medications, current illness or disease, or any combination thereof.

4. The method of claim 1, wherein the emergency data about the person potentially affected by the emergency from the first registration entry comprises medical data including allergies, medical conditions, illnesses, medications, disabilities, blood type, medical notes, or any combination thereof.

5. The method of claim 4, wherein all or a portion of the medical data is encrypted.

6. The method of claim 1, wherein access to the emergency registry is available to authorized emergency responders after checking credentials or verification, and wherein the emergency registry provides differential access to emergency responders and a public.

7. The method of claim 1, wherein an anonymized version of the emergency registry is displayed.

8. The method of claim 1, further comprising allowing the user to report, through the web interface, a new emergency, update an existing emergency, or check a status of the existing emergency.

9. The method of claim 1, further comprising providing an emergency conference bridge for two or more participants.

10. The method of claim 9, wherein the two or more participants are selected from the group consisting of the user, an associated contact of the user, an emergency contact of the user, an organizational representative, a customer service representative, and an ESP personnel.

11. The method of claim 10, wherein the two or more participants comprise the user and the ESP personnel.

12. The method of claim 1, wherein the emergency data about the person potentially affected by the emergency from the first registration entry comprises biometric information.

13. The method of claim 1, wherein returning the emergency data about the user potentially affected by the emergency from the first registration entry to the device associated with the emergency service provider comprises providing a weblink, hyperlink or URL link for the emergency registry to the device associated with the emergency service provider.

14. The method of claim 1, wherein the emergency potentially affecting the group of people is a natural disaster or medical emergency.

15. The method of claim 1, wherein the user is prompted on social media to register on the emergency registry.

16. The method of claim 1, wherein the emergency registry is configured to be accessible through a social media platform, a URL in a web browser, or a mobile application installed on an electronic device.

17. The method of claim 1, wherein the emergency data about the person potentially affected by the emergency from the first registration entry comprises an image or video uploaded to the emergency registry by the user.

18. The method of claim 1, further comprising providing the emergency registry to an emergency contact or associated contact of the user, wherein the emergency registry is searchable.

* * * * *